(12) United States Patent
Onishi et al.

(10) Patent No.: US 12,307,296 B2
(45) Date of Patent: May 20, 2025

(54) COMPUTER-READABLE RECORDING MEDIUM STORING DATA PROCESSING PROGRAM, DATA PROCESSING METHOD, AND DATA PROCESSING SYSTEM

(71) Applicant: FUJITSU LIMITED, Kawasaki (JP)

(72) Inventors: Takafumi Onishi, Kawasaki (JP); Yasuhiko Kanemasa, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 788 days.

(21) Appl. No.: 17/531,396

(22) Filed: Nov. 19, 2021

(65) Prior Publication Data
US 2022/0269545 A1  Aug. 25, 2022

(30) Foreign Application Priority Data
Feb. 25, 2021 (JP) .................. 2021-029184

(51) Int. Cl.
G06F 9/50 (2006.01)
G06F 11/07 (2006.01)

(52) U.S. Cl.
CPC .......... *G06F 9/5033* (2013.01); *G06F 9/5038* (2013.01); *G06F 11/0772* (2013.01); *G06F 2201/84* (2013.01)

(58) Field of Classification Search
CPC ........ G06F 9/5033; G06F 9/5038; G06F 9/52; G06F 11/0772; G06F 2201/84
See application file for complete search history.

(56) References Cited

U.S. PATENT DOCUMENTS

| | | | | |
|---|---|---|---|---|
| 11,614,962 B2* | 3/2023 | Liu | .............. | G06F 9/5038 718/102 |
| 2007/0195756 A1 | 8/2007 | Komiya et al. | | |
| 2013/0227122 A1 | 8/2013 | Gao et al. | | |
| 2019/0087238 A1 | 3/2019 | Pu et al. | | |
| 2019/0391845 A1* | 12/2019 | Gasser | .............. | G06F 9/4887 |
| 2020/0019445 A1* | 1/2020 | Altintas | .............. | G06F 9/5038 |
| 2021/0303328 A1* | 9/2021 | Soppin | .............. | G06F 9/5005 |
| 2022/0050712 A1* | 2/2022 | Oliveirinha | .......... | G06Q 20/123 |

FOREIGN PATENT DOCUMENTS

| | | |
|---|---|---|
| JP | 2004-350237 | 12/2004 |
| JP | 2007-228573 | 9/2007 |

OTHER PUBLICATIONS

European Search Report dated May 3, 2022, in European Application No. 21209532.7.

\* cited by examiner

*Primary Examiner* — Jacob D Dascomb
(74) *Attorney, Agent, or Firm* — STAAS & HALSEY LLP

(57) ABSTRACT

A data processing system configured to perform processing including: each time when data that includes time information is received, inputting the received data to each of a first processing system of a switching source and a second processing system of a switching destination; comparing the time information of the data with a switching time set as a time to switch a processing system in the first processing system; outputting a processing result of processing that uses the data from the first processing system in a case where a time indicated by the time information is before the switching time; comparing the time information of the data with the switching time in the second processing system; and outputting the processing result of processing that uses the data from the second processing system in a case where the time indicated by the time information is the switching time or time after the switching time.

9 Claims, 51 Drawing Sheets

COMPUTER-READABLE RECORDING MEDIUM STORING DATA PROCESSING PROGRAM, DATA PROCESSING METHOD, AND DATA PROCESSING SYSTEM

CROSS-REFERENCE TO RELATED APPLICATION

This application is based upon and claims the benefit of priority of the prior Japanese Patent Application No. 2021-29184, filed on Feb. 25, 2021, the entire contents of which are incorporated herein by reference.

FIELD

The embodiment(s) discussed herein is(are) related to a non-transitory computer-readable storage medium storing a data processing program, a data processing method, and a data processing system.

BACKGROUND

There is a distributed stream processing execution platform as a data processing platform that processes a large amount of and high-frequency Internet of Things (IoT) data sent from IoT devices with low latency. The IoT data includes an ID, time information (time stamp), and arbitrary data generated for an object (object) having a unique ID.

The distributed stream processing platform performs distributed processing for a large amount of IoT data, which is stream data, in real time, using a stream processing execution platform (hereinafter also referred to as a processing system) that performs stream data processing. The stream data is data having a time stamp, which is continuously generated.

In the stream data processing, there are some cases where the processing system that performs output is switched between two processing systems being executed. For example, there is a case where a newly started processing system is desired to be used as a main processing system instead of an operating main processing system. The processing system is switched for various purposes such as scaling out processing performance by switching the processing systems having different numbers of configurations, or changing a business logic by updating a part of a processing program.

As a technique of switching the processing system, for example, a stream switching device that correctly switches a plurality of data streams having different arrival times transmitted via a network on time has been proposed. In addition, a terminal switching technique has also been proposed, which seamlessly switches streaming sessions between terminals. Moreover, an increment workflow execution technique for improving workflow efficiency in a distributed system has been proposed. A technique related to timing of switching expressions in a dynamic adaptive streaming over hyper text transfer protocol (HTTP) (DASH) client has also been proposed.

Examples of the related art include as follows: Japanese Laid-open Patent Publication No. 2004-350237; Japanese Laid-open Patent Publication No. 2007-228573; U.S. Patent Application Publication No. 2019/0087238; and U.S. Patent Application Publication No. 2013/0227122.

SUMMARY

According to an aspect of the embodiments, there is provided a data processing system including: a memory; and processor circuitry coupled to the memory, the processor circuitry being configured to perform processing. In an example, the processing includes: each time when data that includes time information is received, inputting the received data to each of a first processing system of a switching source and a second processing system of a switching destination; comparing the time information of the data with switching time set as a time to switch a processing system in the first processing system; outputting a processing result of processing that uses the data from the first processing system in a case where a time indicated by the time information is before the switching time; comparing the time information of the data with the switching time in the second processing system; and outputting the processing result of processing that uses the data from the second processing system in a case where the time indicated by the time information is the switching time or time after the switching time.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In the case of switching the processing system, for example, the same data is input to the operating processing system (switching source) and the new processing system (switching destination) and the processing is executed in parallel. Before the switching time of the processing system, only the processing system of the switching source outputs a processing result. Then, when the switching time of the processing system comes, the processing system of the switching source stops the output of the processing result, and the processing system of the switching destination starts output of a processing result.

However, since data positions processed by the two processing systems are different at a certain moment, there is a possibility that the processing results are duplicated or omitted when the processing systems are switched, and the consistency of the processing results is deteriorated. For example, when the processing system of the switching source has processed data and the processing system of the switching destination has unprocessed data, and when switching is executed at that moment, the processing result already output from the processing system of the switching source is also output from the processing system of the switching destination after the switching is executed. That is, duplicate output of the same processing result occurs. Furthermore, when the processing system of the switching source has not processed data and the processing system of the switching destination has processed data, and when switching is executed at that moment, the processing result of the data is not output from any of the processing systems. That is, omission of the processing result occurs.

In one aspect, the present case aims at suppressing deterioration of consistency of the processing results due to switching of the processing systems.

Hereinafter, the present embodiments will be described with reference to the drawings. Note that each of the embodiments may be implemented in combination with at least one of the other embodiments as long as no contradiction arises.

First Embodiment

A first embodiment is a data processing method that enables switching of a processing system for processing stream data that is continuous data including time information while maintaining consistency of processing results.

Figure 1:
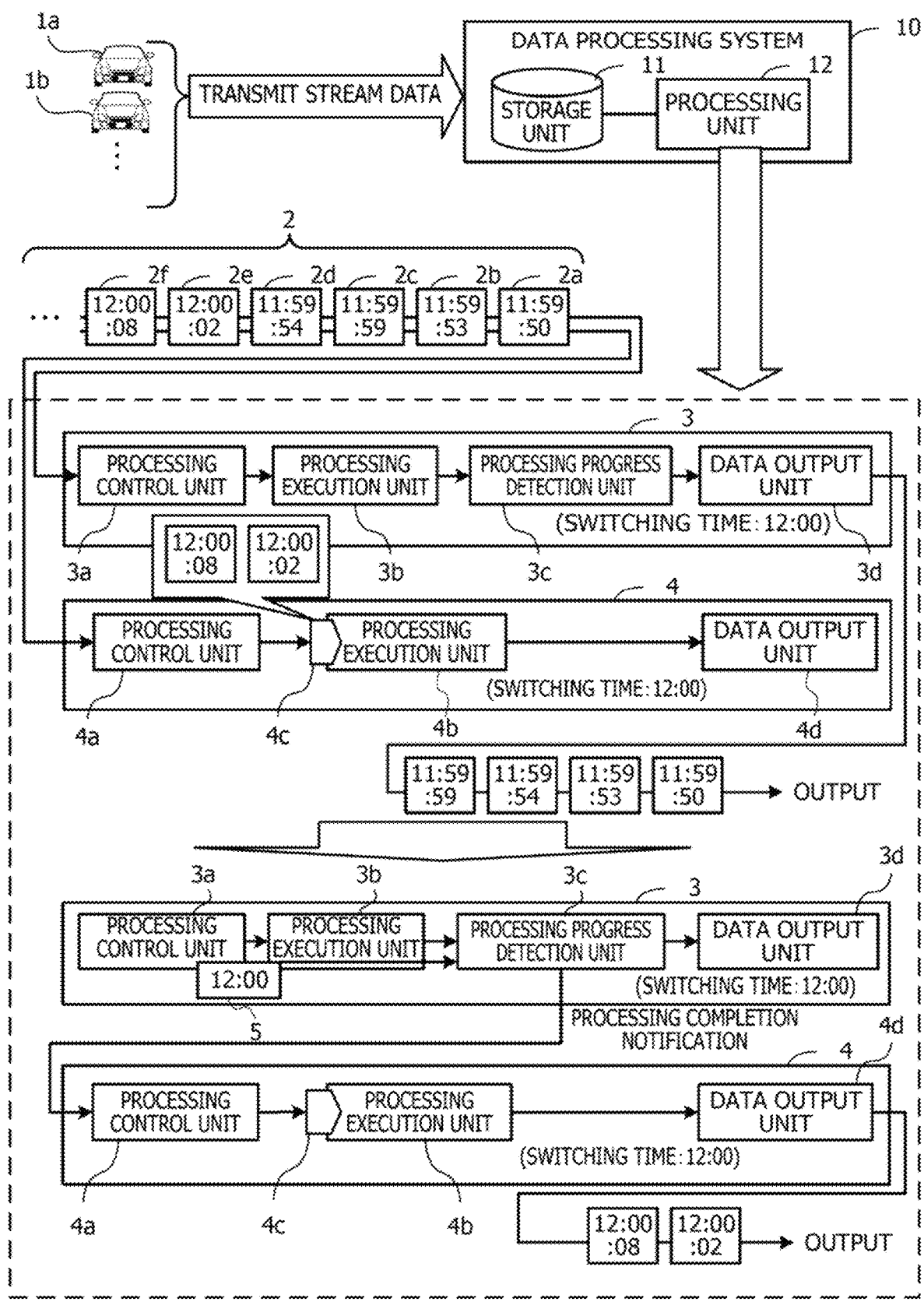
FIG. 1 is a diagram illustrating an example of a data processing method according to a first embodiment.

FIG. 1 is a diagram illustrating an example of a data processing method according to a first embodiment. FIG. 1 illustrates a data processing system 10 that implements the data processing method. The data processing system 10 has one or more computers, and can implement the data processing method by, for example, the computer executing a data processing program in which a predetermined processing procedure is described.

The data processing system 10 has a storage unit 11 and a processing unit 12. The storage unit 11 is, for example, a memory or a storage device included in the data processing system 10. The processing unit 12 is, for example, a processor or an arithmetic circuit included in the data processing system 10.

The data processing system 10 receives stream data 2 transmitted from a plurality of IoT devices 1a, 1b, and the like, and executes processing using the stream data 2 in real time. The stream data 2 includes data 2a, 2b, 2c, 2d, 2e, 2f, and the like, each having time information (time stamp).

The storage unit 11 temporarily stores the stream data 2. Furthermore, the storage unit 11 can also store information indicating an internal state of a processing system executed by the processing unit 12. The information indicating an internal state includes a time (switching time) at which the processing system is switched.

The processing unit 12 has a plurality of processing systems for processing the stream data 2. Then, when a first processing system 3 is executing the processing for the stream data 2, the processing unit 12 can switch the processing for the stream data 2 to a second processing system 4.

The first processing system 3 of a switching source has a processing control unit 3a, a processing execution unit 3b, a processing progress detection unit 3c, and a data output unit 3d. The processing control unit 3a controls progress of the processing in the first processing system 3. For example, the processing control unit 3a sets the switching time in each unit in the first processing system 3 according to an input for designating the switching time. Furthermore, the processing control unit 3a determines whether a determination condition that first data including time information indicating a time before the switching time is not to be received from there onward is satisfied, and transmits control data 5 indicating satisfaction of the determination condition in a case where the determination condition is satisfied.

The processing execution unit 3b executes real time processing using the stream data 2. The processing progress detection unit 3c detects completion of the processing for the data including the time information indicating the time before the switching time. The data output unit 3d outputs a processing result of the processing using the data including the time information indicating the time before the switching time.

The second processing system 4 of the switching destination has a processing control unit 4a, a processing execution unit 4b, a buffer unit 4c, and a data output unit 4d. The processing control unit 4a sets, for example, the switching time in each unit in the second processing system 4 according to the input for designating the switching time.

The processing execution unit 4b executes processing using the input data. The buffer unit 4c holds data including time information indicating a time of or after the switching time until receiving a processing completion notification. The data output unit 4d outputs a processing result of the processing using the data including the time information indicating the time of or after the switching time.

The processing unit 12 controls the first processing system 3 and the second processing system 4, and switches the processing system according to the following procedure.

Each time when each of the data 2a, 2b, 2c, 2d, 2e, 2f, and the like of the stream data 2 is received, the processing unit 12 inputs the received data to the first processing system 3 of the switching source and the second processing system 4 of the switching destination, respectively. For example, the processing unit 12 copies the data each time receiving the data 2a, 2b, 2c, 2d, 2e, 2f, and the like, and inputs one to the first processing system 3 and inputs the other to the second processing system 4.

The processing unit 12 compares the time information of the data with the switching time set as the time for switching the processing system in the data output unit 3d of the first processing system 3. In the case where the time indicated by the time information is before the switching time, the processing unit 12 executes the processing using the data in the first processing system 3 and outputs the processing result. For example, in the case where the switching time is "12:00", the first processing system 3 outputs the processing result of the processing using the data 2a, 2b, 2c, and 2d including the time information indicating the time before "12:00".

Furthermore, the processing unit 12 compares the time information of the data with the switching time in the data output unit 4d of the second processing system 4. In the case where the time indicated by the time information is the switching time or time after the switching time, the processing unit 12 executes the processing using the data in the second processing system 4 and outputs the processing result. For example, in the case where the switching time is "12:00", the second processing system 4 outputs the processing result of the processing using the data 2e, 2f, and the like including the time information indicating the time of or after "12:00".

By inputting data to both of the plurality of processing systems in this way and determining the presence or absence of the output of the processing result by each processing system according to the comparison result of the time information of each data with the switching time, the consistency of the processing results is maintained even if the processing system is switched. That is, the processing results of the data at the same time are not output in duplicate, and the processing result of some data is not omitted.

Note that the time information of the data 2a, 2b, 2c, 2d, 2e, 2f, and the like of the stream data 2 is given by each of the plurality of IoT devices 1a, 1b, and the like. Furthermore, a delay time of transmission from each of the plurality of IoT devices 1a, 1b, and the like to the data processing system 10 varies. Therefore, the stream data 2 received by the data processing system 10 does not arrive in order of earlier set time information.

In the meantime, the processing result output from the data processing system 10 may be required to be output in time series. In this case, the first processing system 3 and the second processing system 4 output the processing results in order of the time information included in the processed data. For example, even if receiving the data 2*d* including the time information indicating the time before the data 2*c* after the data 2*c*, the first processing system 3 outputs the processing result of the data 2*c* after outputting the processing result of the data 2*d*.

To maintain the data output in time series even when such processing system is switched, the processing unit 12 can perform the following processing.

When the determination condition that the first data including time information indicating a time before the switching time is not to be received from there onward is satisfied, and the processing for each of the received first data has been completed, in the first processing system 3, the processing unit 12 outputs the processing completion notification. For example, in the case where the time information of the received data satisfies the determination condition that the first data is not to be received from there onward, the processing control unit 3*a* transmits the control data 5 indicating that the first data is not to be received from there onward to a processing route of the data. In a case where there is a plurality of processing routes, the control data 5 is transmitted to all the routes. The case of satisfying the determination condition that the first data is not to be received from there onward is a case where the time information of the received data indicates a time after the switching time by a predetermined time, for example.

The processing execution unit 3*b* that has received the control data 5 executes all pieces of the processing using the data including the time information of or before the switching time, outputs the processing results, and transmits the control data 5 to the downstream processing route. The control data 5 is transferred to the processing progress detection unit 3*c* via the processing execution unit 3*b*. The processing progress detection unit 3*c* located on an output side of the data processing result in the processing execution unit 3*b* outputs the processing completion notification when detecting the control data 5.

Moreover, the processing unit 12 stops output of the processing result of the processing using second data including the time information indicating a time of or after the switching time in the second processing system 4 until the processing completion notification is output from the first processing system 3. For example, the buffer unit 4*c* of the second processing system 4 stores the second data received before the processing completion notification is output in the storage unit 11. Then, the processing execution unit 3*b* reads the second data from the storage unit 11 and executes the processing using the second data after the processing completion notification is output.

By stopping the processing for the data including the time information indicating the time of or after the switching time until receiving the processing completion notification in the second processing system 4 of the switching destination in this way, the outputs of the time-series processing results can be maintained even if the processing system is switched.

Note that, when receiving an input for designating the switching time, the processing unit 12 can suppress the switching of the processing system in a case where a grace time to the switching time is too short. In that case, the processing unit 12 calculates the grace time from the current time to the switching time in response to the input for designating the switching time in each of the first processing system 3 and the second processing system 4. Then, the first processing system 3 and the second processing system 4 set the designated switching time as the time for switching the processing system in the case where the grace time is equal to or larger than a predetermined value. Furthermore, the first processing system 3 and the second processing system 4 outputs a setting failure notification without setting the switching time in the case where the grace time is less than a predetermined value (including a case where the switching time is before the current time).

In the case where the grace time is too short, implementation of the switching processing for the processing system is suppressed in this way. Thereby, a situation in which, for example, the processing result of the data of the switching time or time after the switching time has already been output when an operation to switch the processing system is started because of too short switching time can be avoided.

Furthermore, in the case of receiving the setting of the switching time only in one processing system but failing in the setting in the other processing system, the processing unit 12 may cause the processing system of which the setting of the switching time is received to cancel the switching of the processing system. For example, in the case where the setting failure notification is output from one processing system of the first processing system 3 and the second processing system 4, the processing unit 12 transmits a switching cancellation instruction to the other processing system. In the case of receiving the switching cancellation instruction after setting the switching time, the processing unit 12 deletes the set switching time in the first processing system 3 and the second processing system 4.

Thereby, implementation of the operation to switch the processing system only in one processing system and occurrence of inconsistency in the processing results can be suppressed.

Moreover, the processing unit 12 may save snapshots of states of the first processing system 3 of the switching source and the second processing system 4 of the switching destination immediately after setting the switching time, assuming that a failure occurs after setting the switching time and the inconsistent is caused in the operation to switch the processing system. For example, the processing unit 12 first instructs the second processing system 4 to set the switching time. The processing unit 12 saves the snapshot including the switching time in the storage unit 11 after the setting of the switching time is completed in the second processing system 4. Next, after checking that the snapshot is saved in the second processing system 4, the processing unit 12 instructs the first processing system 3 to set the switching time. In the first processing system 3, the snapshot including the switching time is saved in the storage unit 11 after the setting of the switching time is completed. The first processing system 3 determines that the switching time setting instruction to the switching source is completed by checking the save of the second snapshot, and outputs a message of switching time setting completion.

After saving the snapshot of the state of after the switching time is set in the second processing system 4 of the switching destination, then instructing the first processing system 3 to set the switching time, and saving the snapshot of the state of after the switching time is set in the first processing system 3 in this way, the state is not returned to the state of before the switching time is set even if a failure occurs in the first processing system 3 or the second processing system 4 afterward. That is, if the second processing system 4 returns to the state of before the switching time is set due to occurrence of a failure, the grace time is too short at the point of time of subsequent resetting the switching time and the setting may fail. If the second processing system 4 is returned to the state of after the switching time is set by using the snapshot, it is not needed to reset the switching time, and the situation of failing in the switching time at the switching destination can be avoided. The same similarly applies to the occurrence of a failure in the first processing system 3.

Furthermore, since the switching time setting is performed in the first processing system 3 of the switching source after the snapshot is saved in the second processing system 4, occurrence of a state in which the switching time is set only in the switching source and the switching time is not set in the switching destination is suppressed. Thereby, omission of the processing result due to the first processing system 3 of the switching source suppressing the output of the processing result of data of the switching time or time after the switching time on the basis of the setting of the switching time, and the second processing system 4 not starting the output of the processing result of the data is suppressed. Similarly in the first processing system 3, duplicate of the processing results due to the second processing system 4 of the switching destination starting the output of the processing result of data of the switching time or time after the switching time on the basis of the setting of the switching time, and the first processing system 3 not suppressing the processing result of the data is suppressed.

Second Embodiment

Next, a second embodiment will be described. In the second embodiment, IoT data collected from an IoT device is processed in real time in a data center, and a service using a processing result is provided.

Figure 2:
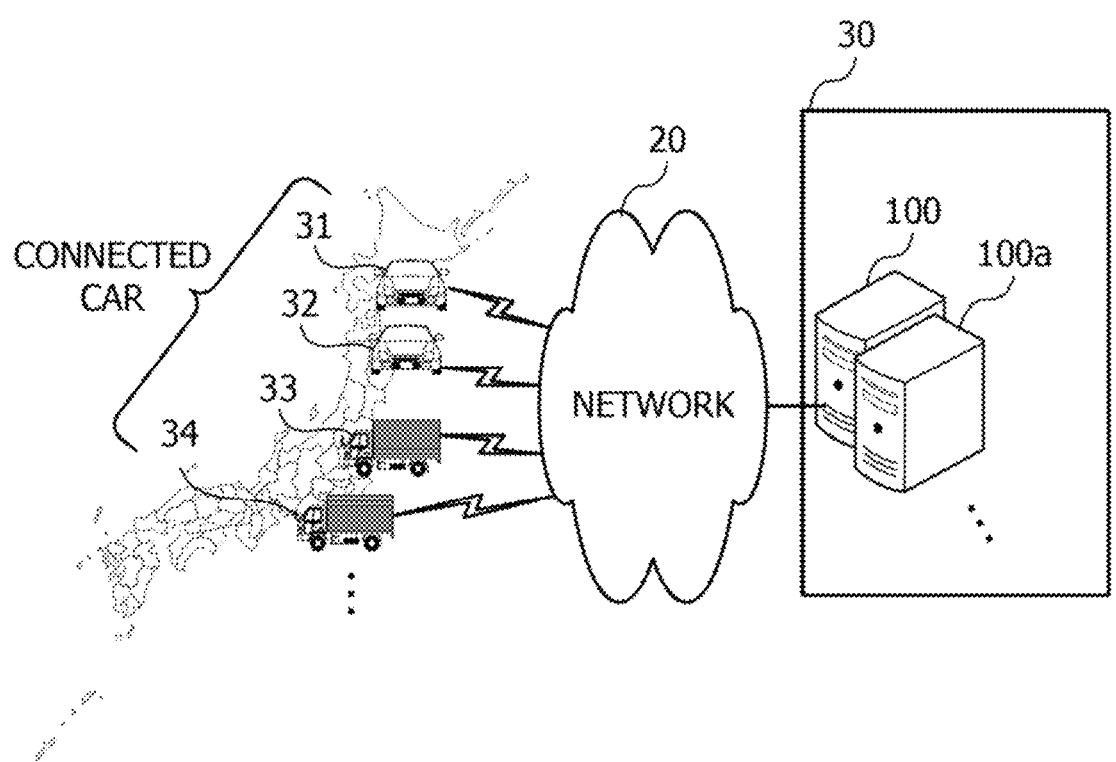
FIG. 2 is a diagram illustrating an example of a system configuration according to a second embodiment.

FIG. 2 is a diagram illustrating an example of a system configuration according to the second embodiment. A plurality of servers 100, 100a, and the like is provided in a data center 30. The plurality of servers 100, 100a, and the like is connected to a network 20, and function as a cloud computing system, for example. For example, connected cars 31, 32, 33, 34, and the like are connected to the network 20 as IoT devices. The data center 30 has a distributed stream processing execution platform, and processes IoT data acquired from the connected cars 31, 32, 33, 34, and the like in a distributed manner.

The connected cars 31, 32, 33, 34, and the like transmit the IoT data including a time stamp indicating an occurrence time at the time when a predetermined event occurs. Note that the time stamp in the second embodiment is an example of the time information in the first embodiment. The event that involves the transmission of the IoT data is a periodic data collection event in which data, for example, position, speed, or the like is collected.

Note that IoT devices are not limited to the connected cars 31, 32, 33, 34, and the like, and the IoT devices include various devices such as portable information terminals.

Figure 3:
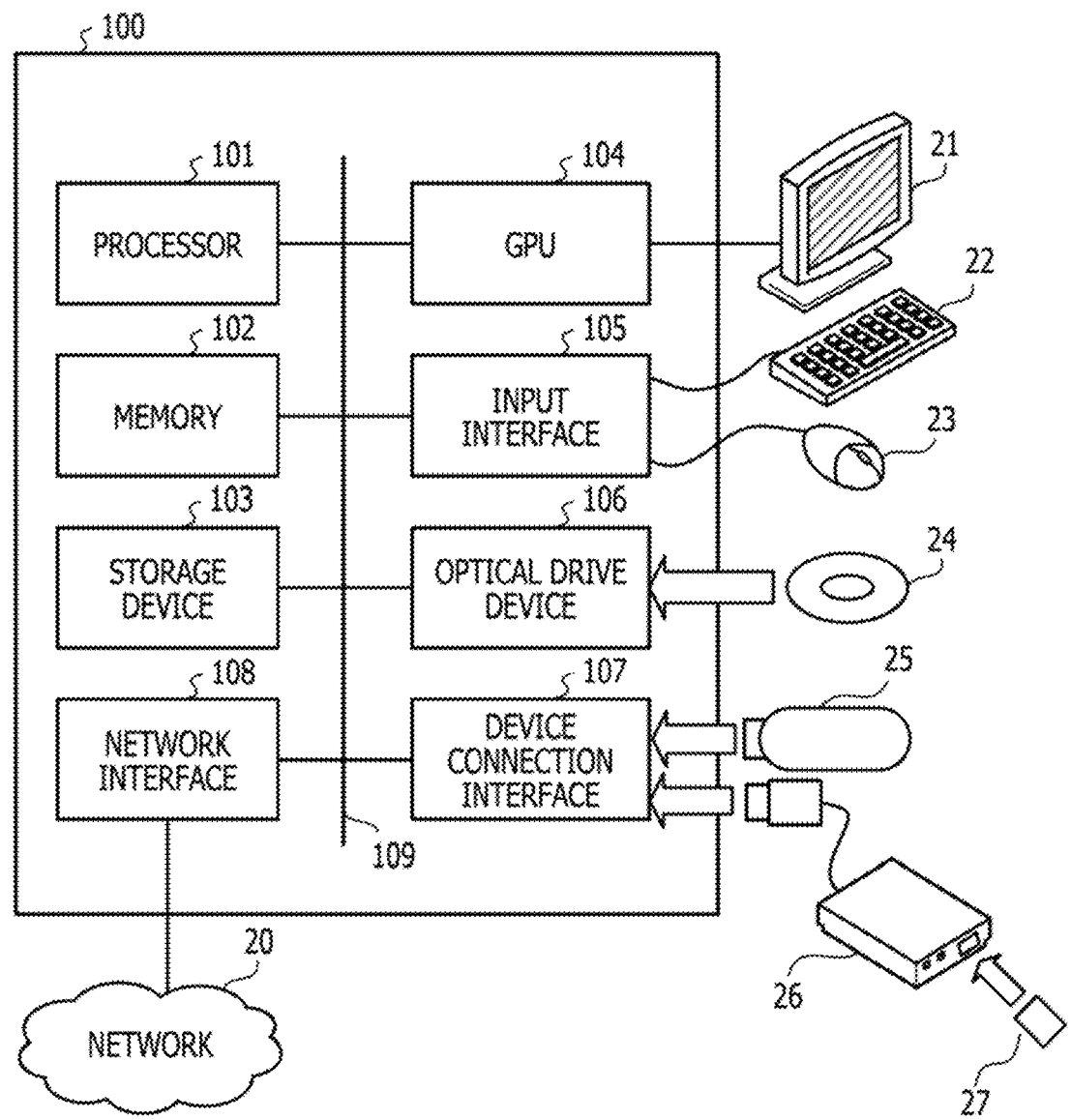
FIG. 3 is a diagram illustrating an example of hardware of a server.

FIG. 3 is a diagram illustrating an example of hardware of a server. The entire server 100 is controlled by a processor 101. To the processor 101, a memory 102 and a plurality of peripheral devices are connected via a bus 109. The processor 101 may be a multiprocessor. The processor 101 is, for example, a central processing unit (CPU), a micro processing unit (MPU), or a digital signal processor (DSP). At least a part of functions implemented by the processor 101 executing a program may be implemented by an electronic circuit such as an application specific integrated circuit (ASIC) and a programmable logic device (PLD).

The memory 102 is used as a main storage device of the server 100. The memory 102 temporarily stores at least a part of an operating system (OS) program and an application program to be executed by the processor 101. Furthermore, the memory 102 stores various types of data used in processing by the processor 101. As the memory 102, for example, a volatile semiconductor storage device such as a random access memory (RAM) is used.

The peripheral devices connected to the bus 109 include a storage device 103, a graphics processing unit (GPU) 104, an input interface 105, an optical drive device 106, a device connection interface 107, and a network interface 108.

The storage device 103 electrically or magnetically writes/reads data in/from a built-in recording medium. The storage device 103 is used as an auxiliary storage device of a computer. The storage device 103 stores an OS program, an application program, and various types of data. Note that, as the storage device 103, for example, a hard disk drive (HDD) or a solid state drive (SSD) may be used.

The GPU 104 is an arithmetic unit that performs image processing, and is also called graphic controller. A monitor 21 is connected to the GPU 104. The GPU 104 displays an image on a screen of the monitor 21 according to an instruction from the processor 101. Examples of the monitor 21 include a display device using an organic electro luminescence (EL), a liquid crystal display device, and the like.

To the input interface 105, a keyboard 22 and a mouse 23 are connected. The input interface 105 transmits signals transmitted from the keyboard 22 and the mouse 23 to the processor 101. Note that the mouse 23 is an example of a pointing device, and other pointing devices may also be used. Other pointing devices include a touch panel, a tablet, a touch pad, a track ball, and the like.

The optical drive device 106 uses laser light or the like to read data recorded on an optical disk 24 or write data to the optical disk 24. The optical disk 24 is a portable recording medium on which data is recorded so as to be readable by reflection of light. Examples of the optical disk 24 include a digital versatile disc (DVD), a DVD-RAM, a compact disc read only memory (CD-ROM), a CD-recordable (R)/rewritable (RW), and the like.

The device connection interface 107 is a communication interface for connecting peripheral devices to the server 100. For example, to the device connection interface 107, a memory device 25 and a memory reader/writer 26 may be connected. The memory device 25 is a recording medium having a communication function with the device connection interface 107. The memory reader/writer 26 is a device that writes data in a memory card 27 or reads data from the memory card 27. The memory card 27 is a card type recording medium.

The network interface 108 is connected to the network 20. The network interface 108 exchanges data with another computer or a communication device via the network 20. The network interface 108 is a wired communication interface that is connected to a wired communication device such as a switch or a router with a cable, for example. Furthermore, the network interface 108 may be a wireless communication interface that is connected to and communicates with a wireless communication device such as a base station or an access point by radio waves.

The server 100 may implement a processing function according to the second embodiment with hardware as described above. The other servers 100a, and the like in the data center 30 also have similar hardware to the server 100. Furthermore, the data processing system 10 illustrated in the first embodiment also has a computer having similar hardware to the server 100.

The server 100 implements the processing function of the second embodiment by executing, for example, a program recorded in a computer-readable recording medium. The program in which processing content to be executed by the server 100 is described may be recorded in various recording media. For example, the program to be executed by the server 100 may be stored in the storage device 103. The processor 101 loads at least one of programs in the storage device 103 on the memory 102 and executes the program. Furthermore, the program to be executed by the server 100 can be recorded in a portable recording medium such as the optical disk 24, the memory device 25, or the memory card 27. The program stored in the portable recording medium may be executed after being installed on the storage device 103, for example, by control of the processor 101. Furthermore, the processor 101 may also read the program directly from the portable recording medium and execute the program.

In the data center 30, the distributed stream processing execution platform is constructed by the plurality of servers 100, 100a, and the like.

Figure 4:
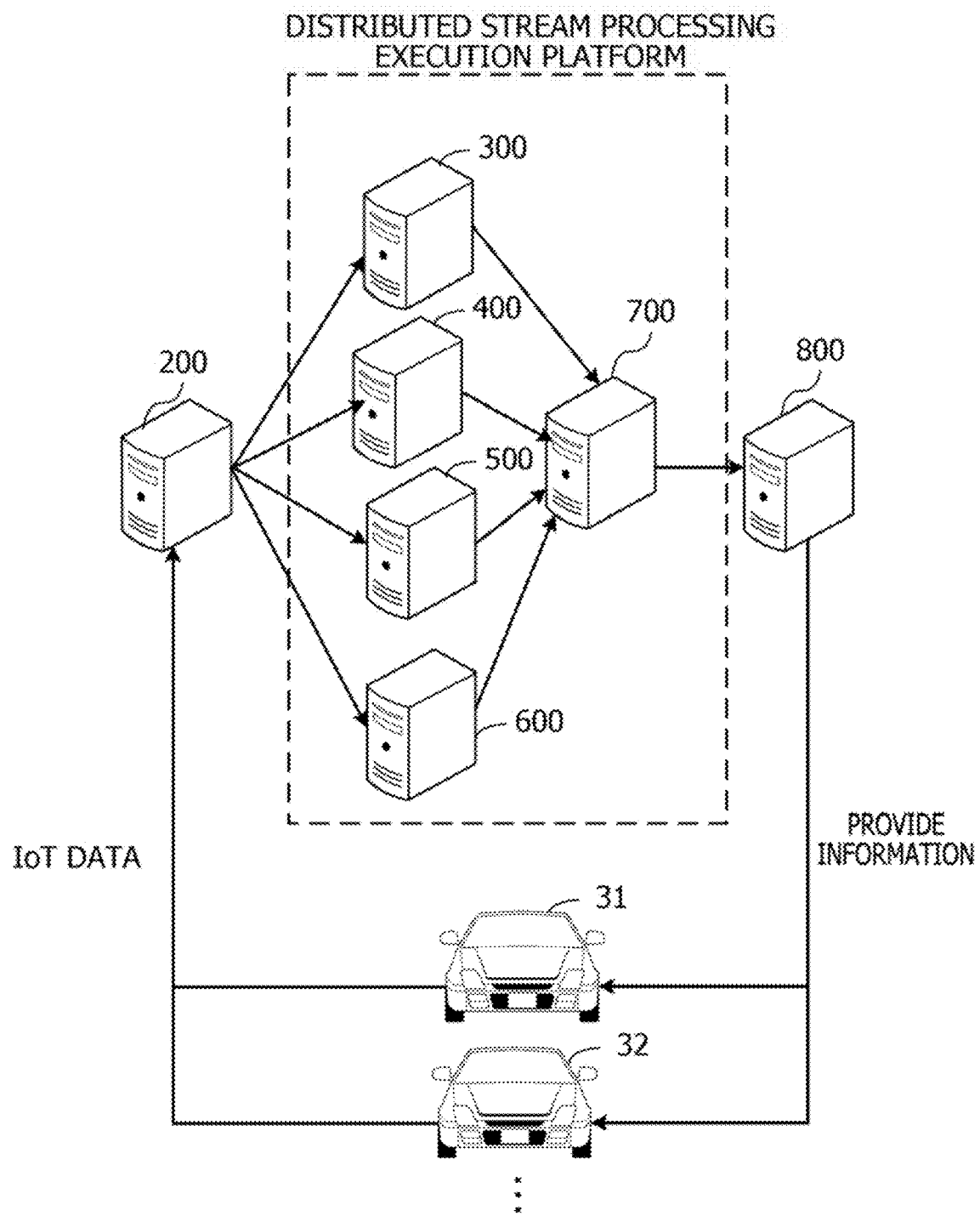
FIG. 4 is a diagram illustrating an example of a distributed stream processing execution platform.

FIG. 4 is a diagram illustrating an example of the distributed stream processing execution platform. The plurality of servers 100, 100a, and the like includes a message queue (MQ) execution server 200 on a data input side, a plurality of stream processing execution servers 300, 400, 500, and 600, an MQ execution server 700 on a data output side, and an information provision server 800. The distributed stream processing execution platform is implemented by the plurality of stream processing execution servers 300, 400, 500, and 600 and the MQ execution server 700. In a flow of stream data processing, the MQ execution server 200 side is an upstream side, and the information provision server 800 side is a downstream side.

The IoT data transmitted from the plurality of connected cars 31, 32, and the like is received by the MQ execution server 200. The MQ execution server 200 transmits the IoT data to at least one of the plurality of stream processing execution servers 300, 400, 500, and 600. The plurality of stream processing execution servers 300, 400, 500, and 600 executes processing using the received IoT data, and transmits output data indicating a processing result to the MQ execution server 700. The MQ execution server 700 transmits the received output data to the information provision server 800. The information provision server 800 provides real time information to the plurality of connected cars 31, 32, and the like on the basis of the output data from the distributed stream platform.

For example, the IoT data sent from the plurality of connected cars 31, 32, and the like includes information such as an ID, a time stamp, a position (latitude/longitude), a speed, and a driving log of the corresponding connected car. In the distributed stream processing execution platform, for example, a name of a road on which the car is traveling can be specified on the basis of position information in the IoT data. Furthermore, in the distributed stream processing execution platform, an average speed within a latest predetermined period can be calculated on the basis of the speed information of the IoT data within the latest predetermined period of the same connected car. Moreover, in the distributed stream processing execution platform, the presence or absence of a traffic jam on the road can be determined on the basis of average speed information of a plurality of connected cars on the same road.

In the case where the presence or absence of a traffic jam is determined for each road, output data indicating the presence or absence of a traffic jam for each road is output from the distributed stream processing execution platform. In a case where a traffic jam occurs, the information provision server 800 notifies, for example, the occurrence of the traffic jam to a connected car in the vicinity of the traffic jam location.

In such a distributed stream processing execution platform, each of the plurality of stream processing execution servers 300, 400, 500, and 600 has one or more stream processing execution platforms for processing stream data. Then, the IoT data to be processed is assigned to each stream processing execution platform, and the MQ execution server 200 transmits the IoT data to the stream processing execution platform of an assigned destination. For example, the stream processing execution platform that processes the IoT data output from the connected car is uniquely determined according to the ID of the connected car.

Here, there are some cases where at least some of the stream processing execution platforms in operation are stopped, and the processing of the IoT data processed by the stream processing execution platforms are taken over to newly launched stream processing execution platforms. In this case, the stream processing execution platforms are switched.

Figure 5:
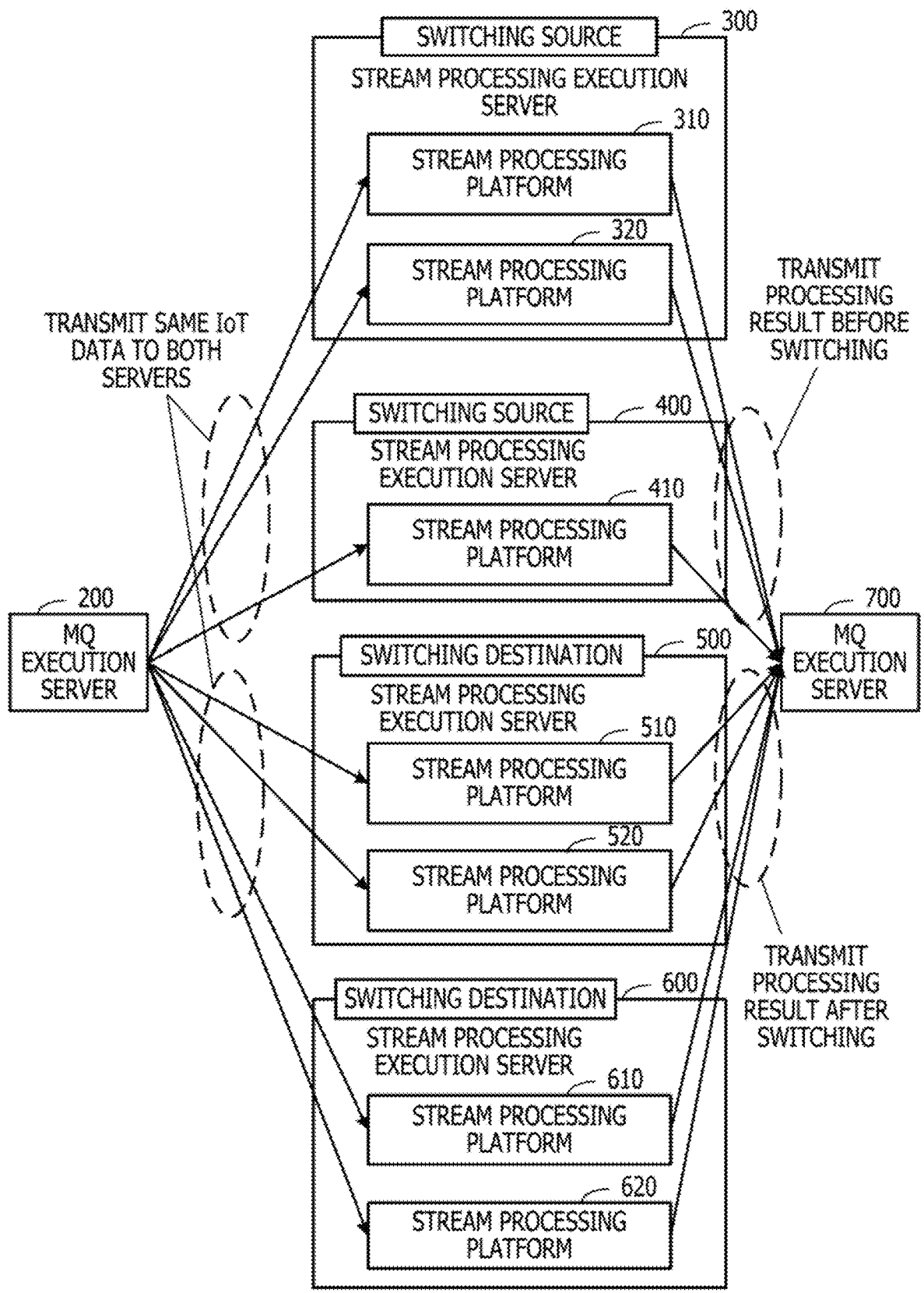
FIG. 5 is a diagram illustrating an example of switching a stream processing execution platform.

FIG. 5 is a diagram illustrating an example of switching a stream processing execution platform. FIG. 5 illustrates an example of switching the stream processing execution platforms for the purpose of scale-out. For example, it is assumed that stream processing execution platforms 310 and 320 in the stream processing execution server 300 and a stream processing execution platform 410 in the stream processing execution server 400 are main processing systems at the point of time before switching. When the processing capacity of this processing system becomes insufficient, the stream processing execution platforms are scaled out.

When performing the scale-out, first, a save point of the stream processing execution platform serving as a switching source is saved using a save point function to be described below. Thereafter, stream processing execution platform 510, 520, 610, and 620 to serve as switching destinations are set up using the save point in the stream processing execution servers 500 and 600. The MQ execution server 200 also transmits the same IoT data that has been transmitted to the main processing systems to the stream processing execution platforms 510, 520, 610, and 620 of transfer destinations.

The stream processing execution platforms 310, 320, and 410 of the switching sources transmit the processing results to the MQ execution server 700 before the switching is performed. The stream processing execution platforms 310, 320, and 410 of the switching sources stop the output of the processing results after the switching is performed, or switches the output destination to an MQ for debug. The stream processing execution platforms 510, 520, 610, and 620 of the transfer destinations do not transmit the processing results to the MQ execution server 700 or sets the output destination to the MQ for debug before the switching is performed. After the switching is performed, the stream processing execution platforms 510, 520, 610, and 620 become the main systems, and the stream processing execution platforms 510, 520, 610, and 620 transmits the processing result to the MQ execution server 700.

Note that intermediate data is transmitted and received between the stream processing execution platforms of the processing systems operating as the main system.

Figure 6:
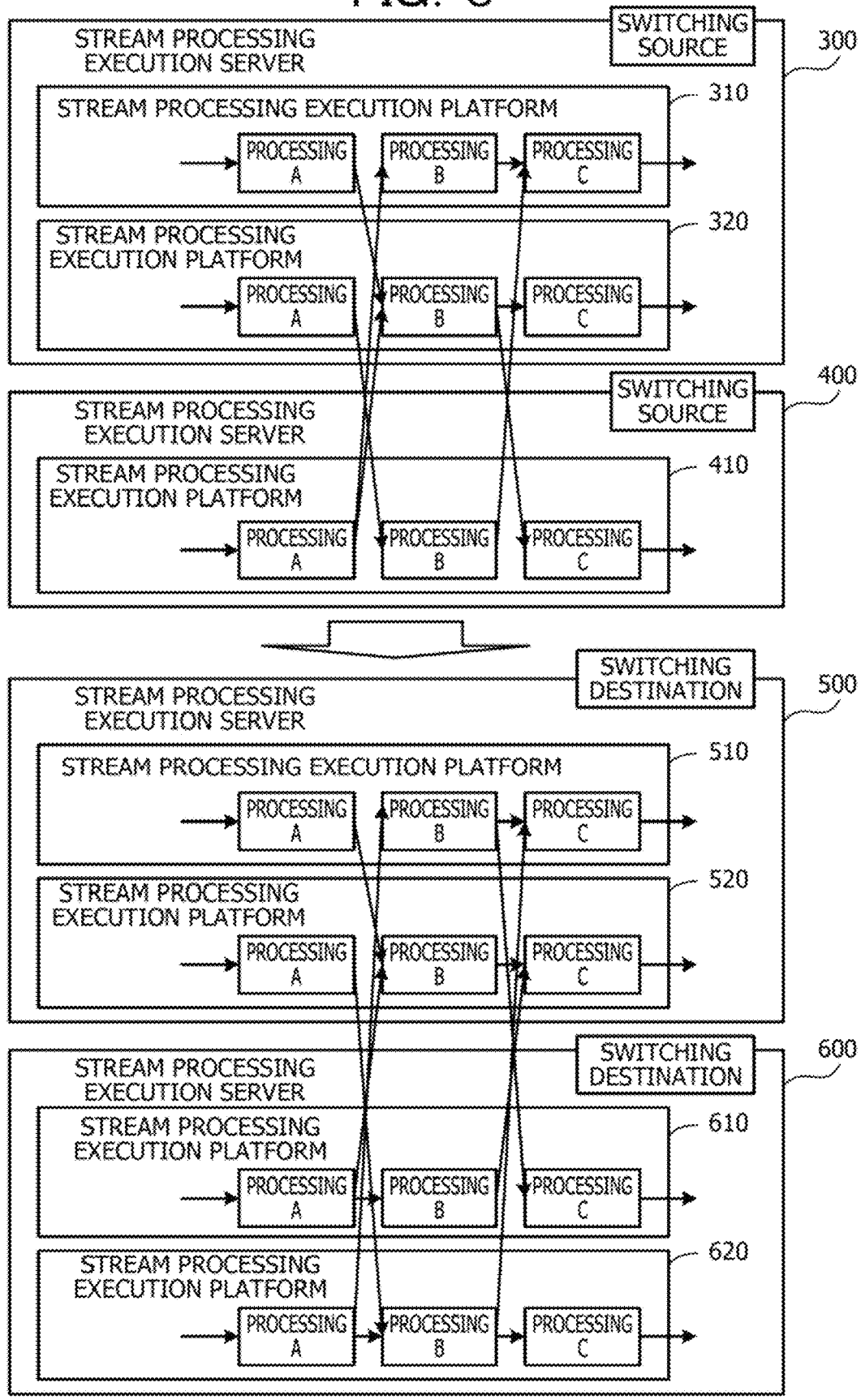
FIG. 6 is a diagram illustrating an example of data transfer between the stream processing execution platforms.

FIG. 6 is a diagram illustrating an example of data transfer between the stream processing execution platforms. In the example of FIG. 6, three pieces of "processing A", "processing B", and "processing C" are performed on the stream processing execution platforms 310, 320, and 410 of the switching sources. In the stream processing execution platforms 310, 320, and 410, the result of "processing A" or "processing B" is transmitted to themselves or other stream processing execution platforms. The stream processing execution platforms 310, 320, and 410 output the processing result of the last "processing C" as the result of stream data processing.

The three pieces of "processing A", "processing B", and "processing C" are performed on the stream processing execution platforms 510, 520, 610, and 620 of the output destinations. Then, the stream processing execution platforms 510, 520, 610, and 620 transmit the result of "processing A" or "processing B" to themselves or other stream processing execution platforms. 510, 520, 610, and 620 output the processing result of the last "processing C" as the result of stream data processing.

By switching the processing systems as illustrated in FIGS. 5 and 6, the number of processing systems is increased from three to four. That is, the scale-out is implemented. Real time performance is required in such switching of the stream data processing system. Furthermore, the IoT data sent from many IoT devices do not reach the distributed stream processing execution platform in time order of time stamps due to variations in data transfer delay time, for example. Therefore, it is not easy to switch the processing system while maintaining consistency of the processing results.

For example, if the real time performance is not required, it is possible to switch the processing system using the save point function. The save point function is a function to save information of an execution state of the processing system.

In the case of switching the processing system using the save point function, the stream processing execution server executing the processing system in operation saves an internal state of the processing system in operation and how much input data has been processed in a database (DB) using the save point function, for example. Next, the stream processing execution server implements various changes (scale-out and program change) for the processing system of the switching destination. Then, the stream processing execution server sets the processing system of the switching destination to the internal state of the switching source saved by the save point function and starts the processing system of the switching destination. The processing system of the switching destination reads subsequent input data of the processed input data saved by the save point function from the MQ execution server 200, and starts stream data processing.

In this way, it is possible to switch the processing system using the save point function, but storage of information such as the internal state in the processing system of the transfer source to the DB and processing of reading the information from the DB and applying the information to the state of the processing system of the transfer destination take time. During that time, the processing result is not output from the distributed stream processing execution platform, and downtime occurs.

Furthermore, if it takes time to switch the processing system, a large amount of unprocessed IoT data is accumulated in the MQ execution server 200 on the upstream side during that time. In the processing system of the switching destination, the IoT data accumulated after the start of operation will be processed with a delay, and it will take time to process the IoT data transmitted from the IoT devices without delay.

Therefore, it is conceivable to input the IoT data to both the processing systems of the switching source and the switching destination to execute processing in parallel, and to stop output of the processing result of the processing system of the switching source and to start output of the processing result of the processing system of the switching destination, at predetermined switching time. However, positions of data that have been able to be processed by switching time are different between the two processing systems of the switching source and the switching destination. Therefore, if processed IoT data is present on the switching source and unprocessed IoT data is present on the switching destination at the switching time, the processing result of the IoT data is output from both the processing system of the switching source and the processing system of the switching destination, and duplicate output of the processing result occurs. On the contrary, if unprocessed IoT data is present on the switching source and processed IoT data is present on the switching destination at the switching time, the processing result of the IoT data is not output from any processing system, and omission of the processing result occurs.

In the case of data transmitted in time series of time stamps, such as streaming processing of moving image data output from one device, the processing system can be switched while maintaining the consistency of the processing results on the basis of the time stamps. For example, the processing result of the processing system of the switching destination may be output from data to which the time stamp next to the time stamp of the last data processed by the switching time by the processing system of the switching source.

However, the transmission delay times of the IoT data sent from many IoT devices vary. Furthermore, an internal clock of the IoT device has an error. Therefore, the IoT data that arrives at the distributed stream processing execution platform does not arrive in the time order of the time stamp. Therefore, for example, there is a possibility that the IoT data with the time stamp of the time before the time stamp of the last data processed by the switching by the processing system of the switching source reaches the distributed stream processing execution platform after the processing system is switched. At this time, if the processing system of the switching destination processes only the IoT data with the time stamp of the time after the time stamp of the last data processed by the switching by the processing system of the switching source, data omission occurs.

Therefore, in the system illustrated in the second embodiment, control using a watermark is performed in the distributed stream processing execution platform in order to implement switching of the processing system that maintains the consistency even in the case where the data does not arrive in the time order indicated by the time stamp.

The watermark is control data representing "a time stamp value of data that has finished flowing in stream processing" serving as a reference when processing is performed on the basis of the time stamp of data in the stream data processing. The watermark is comprehensively transmitted to all of routes from an uppermost stream of the route of processing execution. By using the watermark, the time stamp value of the IoT data that has been processed by the processing system of the switching source becomes clear, and the processing system of the switching destination can process only the unprocessed IoT data in the processing system before switching without omission.

Figure 7:
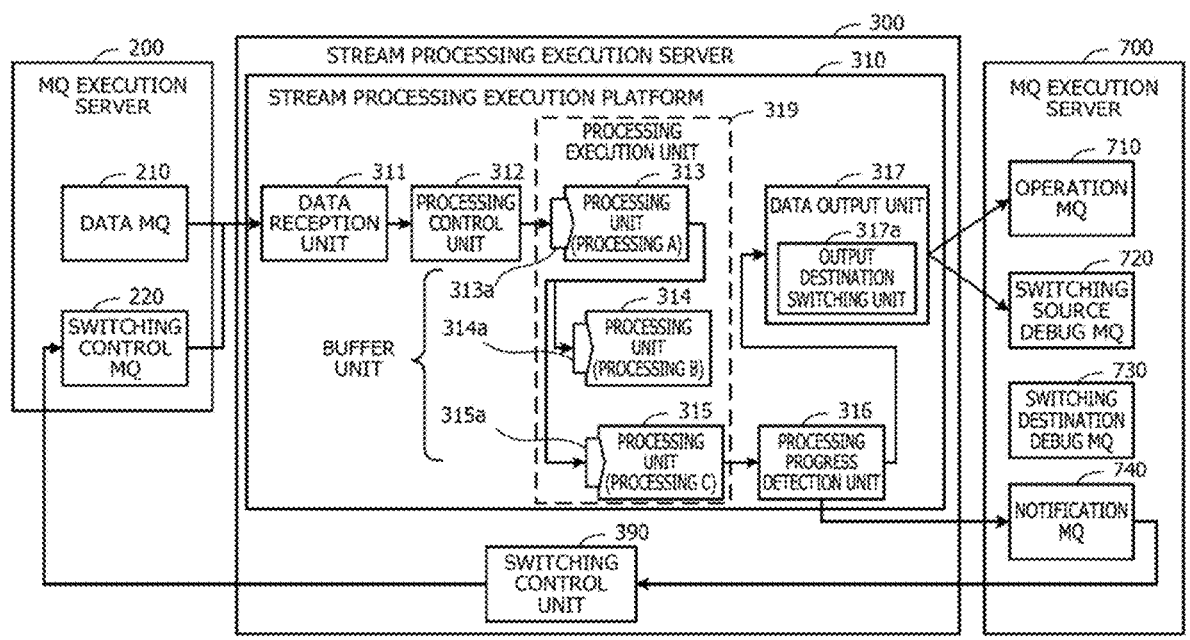
FIG. 7 is a block diagram illustrating an example of functions of each of servers in the second embodiment.

FIG. 7 is a block diagram illustrating an example of the functions of each of the servers in the second embodiment. The MQ execution server 200 on the upstream side has a data MQ 210 and a switching control MQ 220. The data MQ 210 is a queue that stores a message including the received IoT data. The switching control MQ 220 is a queue that stores a message including control data for controlling switching of the processing system.

The stream processing execution platform 310 in the stream processing execution server 300 includes a data reception unit 311, a processing control unit 312, a processing execution unit 319 including a plurality of processing units 313 to 315, a processing progress detection unit 316, and a data output unit 317.

The data reception unit 311 receives the message stored in the data MQ 210 or the switching control MQ 220 from the MQ execution server 200. The data reception unit 311 transmits the data (IoT data or control data) in the received message to the processing control unit 312.

The processing control unit 312 controls the progress of the stream data processing in the processing execution unit 319, using the watermark. The watermark output by the processing control unit 312 flows through all the processing routes from the uppermost stream in the stream processing execution platform 310. Each of the processing units 313 to 315 at which the watermark has arrived can be determined that the processing has been completed for all the data having the time stamp up to the watermark.

For example, in the case where the watermark of "12:00" has arrived at the processing unit 313, the processing unit 313 recognizes that the data up to "12:00" have passed through the processing unit 313, and outputs the processing result of aggregation of data in a predetermined period (for example, one minute) up to that time.

When the watermark of "12:00" has arrived at the processing progress detection unit 316 located at the downmost stream of the stream data processing, the processing progress detection unit 316 can determine that the processing for data having the time stamp up to "12:00" has been completed. In the case where a plurality of processing routes of the stream data is present, when the watermark of "12:00" has arrived from all the processing routes, the processing progress detection unit 316 determines that the processing for data up to "12:00" has been completed.

Each of the processing units 313 to 315 in the processing execution unit 319 performs data processing based on the IoT data. The processing units 313 to 315 have buffer units 313*a*, 314*a*, and 315*a*, respectively. The buffer units 313*a*, 314*a*, and 315*a* are buffers that store, without processing, the IoT data with the time stamp of the switching time or time after the switching time until a processing restart instruction is given in the case where the stream processing execution platform 310 becomes the switching destination of the processing system.

The processing progress detection unit 316 is located at the downmost stream (immediately before the output unit to the outside) of the processing by the processing units 313 to 315, and detects completion of the processing for the data up to the switching time in the switching of the processing system on the basis of the watermark. In the case of detecting completion of the processing for the data up to the switching time, the processing progress detection unit 316 stores a message indicating the processing completion notification in a notification MQ 740 in the MQ execution server 700.

The data output unit 317 stores a message indicating the processing result in one of the message queues in the MQ execution server 700. The data output unit 317 has an output destination switching unit 317*a* that determines a distribution destination (message queue) of the output destination of the processing result on the basis of the time stamp of the input data. The data output unit 317 stores the message indicating the processing result in the distribution destination determined by the output destination switching unit 317*a*.

The stream processing execution server 300 further includes a switching control unit 390. The switching control unit 390 controls switching of the processing system from outside the distributed stream processing execution platform. For example, the switching control unit 390 stores a message indicating the switching time of the processing system in the switching control MQ 220 of the MQ execution server 200 in response to an instruction from the user. Furthermore, the switching control unit 390 stores a message indicating a processing restart instruction for the processing system of the switching destination in the switching control MQ 220 of the MQ execution server 200 when the processing up to the switching time is completed in the processing system of the switching source.

Note that, lines connecting the respective elements illustrated in FIG. 7 indicate a part of communication paths, and a communication path other than the illustrated communication path may also be set. For example, the processing result of the processing unit 313 or the processing unit 314 may be output as output data. In this case, the processing result is transmitted from the processing unit 313 or the processing unit 314 to the processing progress detection unit 316. Furthermore, the function of each element illustrated in FIG. 7 can be realized, for example, by allowing the computer to execute a program module corresponding to the element.

Although FIG. 7 illustrates the functions in the stream processing execution platform 310, other stream processing execution platforms also have the similar functions. Furthermore, although the switching control unit 390 is provided in the stream processing execution server 300, the switching control unit 390 may exist in another server.

Next, a processing system switching procedure will be described with reference to FIGS. 8 to 12.

Figure 8:
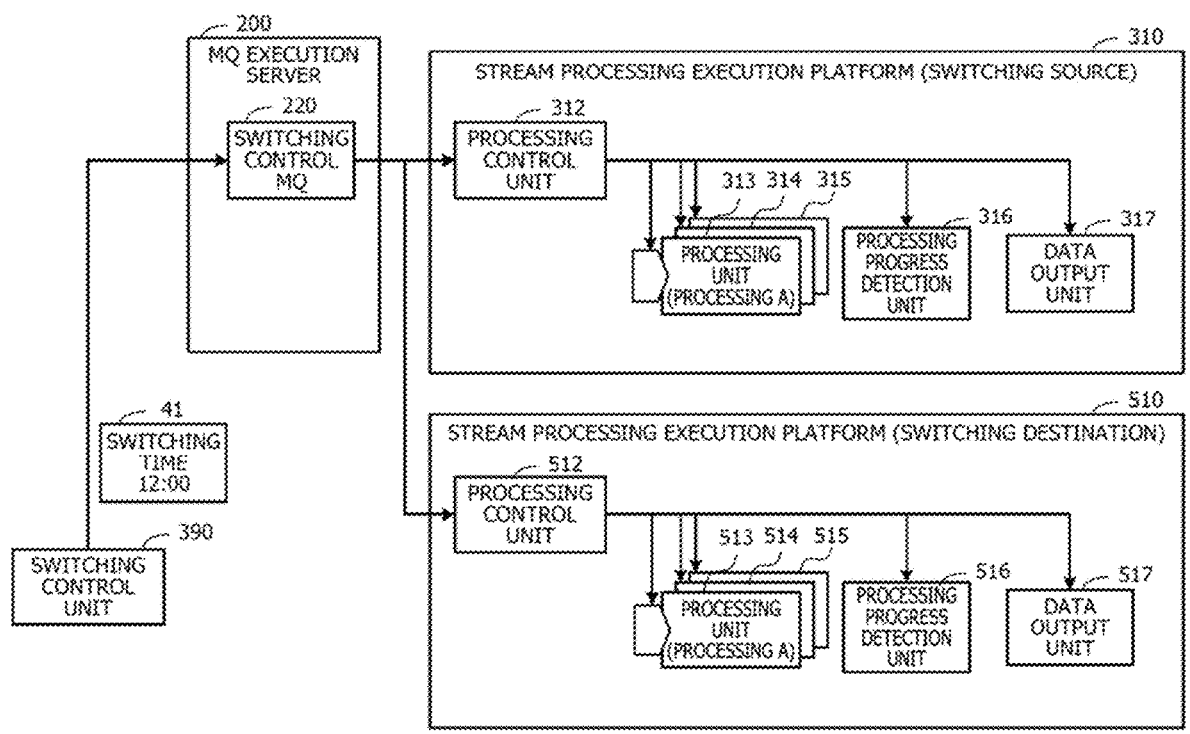
FIG. 8 is a diagram (⅕) illustrating an example of processing system switching processing.

FIG. 8 is a diagram (⅕) illustrating an example of processing system switching processing. When the user inputs a switching start instruction to the switching control unit 390, the processing system switching processing is started. In the example of FIG. 8, it is assumed that the switching control unit 390 determines the switching time "12:00", the stream processing execution platform 310 as the switching source, and the stream processing execution platform 510 as the switching destination, according to the input of the switching start instruction of the user.

The switching control unit 390 transmits a control message 41 for designating the switching time to the MQ execution server 200. The MQ execution server 200 stores the received control message 41 in the switching control MQ 220.

The processing control unit 312 of the stream processing execution platform 310 of the switching source reads the control message 41 that designates the switching time from the switching control MQ 220. Then, the processing control unit 312 transmits a switching time designation instruction to the buffer units of the respective processing units 313 to 315, the processing progress detection unit 316, and the output destination switching unit in the data output unit 317.

The processing control unit 512 of the stream processing execution platform 510 of the switching destination reads the control message 41 that designates the switching time from the switching control MQ 220. Then, the processing control unit 512 transmits a switching time designation instruction to the buffer units of the respective processing units 513 to 515, the processing progress detection unit 516, and the output destination switching unit in the data output unit 517.

Figure 9:
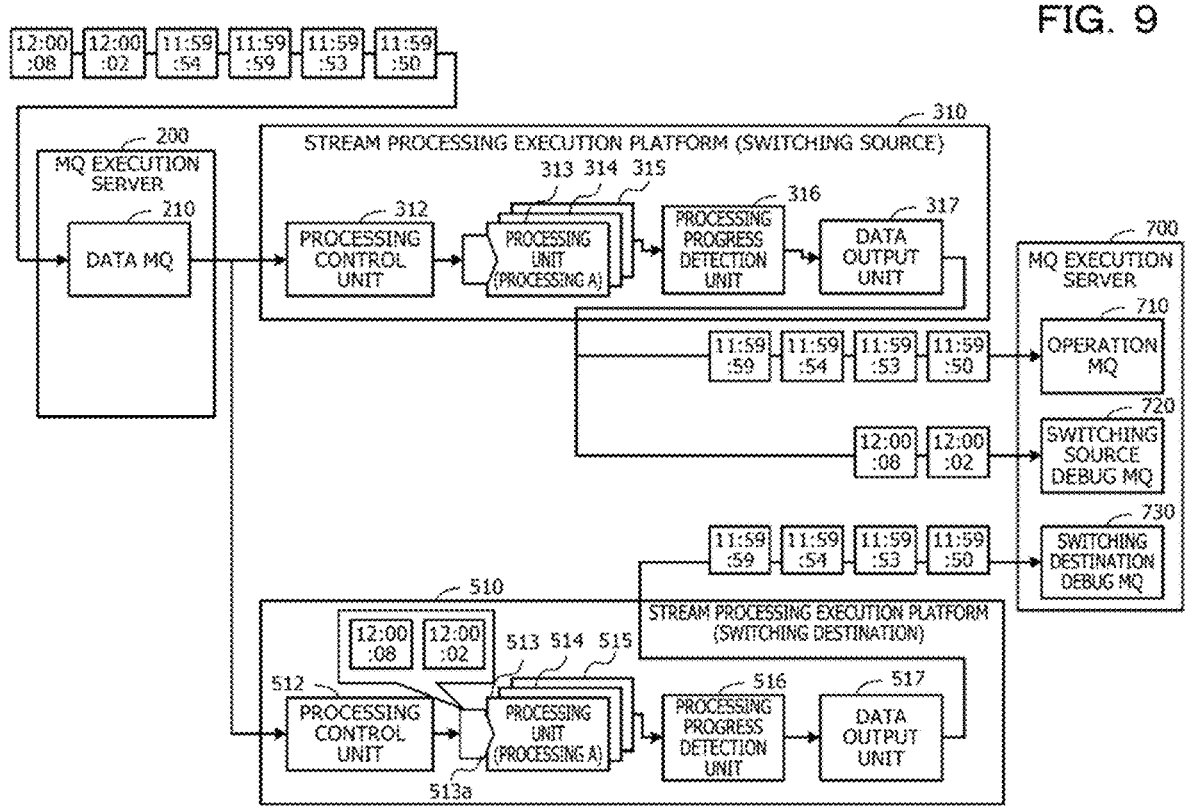
FIG. 9 is a diagram (⅖) illustrating an example of the processing system switching processing.

FIG. 9 is a diagram (2/5) illustrating an example of the processing system switching processing. In the data output unit 317 that has received the switching start instruction in the stream processing execution platform 310 of the switching source, the output destination switching unit 317a (see FIG. 7) compares the time stamp given to the processing result of the IoT data with the switching time. For example, the processing result is given a time stamp of the latest time of the IoT data used to obtain the processing result. The output destination switching unit 317a determines whether the time stamp is before or after the switching time for each processing result of the IoT data. The data output unit 317 distributes the processing result of the IoT data to an operation MQ 710 and a switching source debug MQ 720 according to a determination result of the output destination switching unit 317a.

For example, in the case where the switching time is "12:00", the data output unit 317 stores a message indicating the processing result of the IoT data of the time stamp before "12:00" in the operation MQ 710. Furthermore, the data output unit 317 stores a message indicating the processing result of the IoT data of the time stamp of or after "12:00" in the switching source debug MQ 720.

In the stream processing execution platform 510 of the switching destination, in the processing unit 513 on the uppermost stream side that has received the switching start instruction, the buffer unit 513a in the processing unit 513 compares the time stamp of data given to each IoT data and the switching time. The buffer unit 513a determines whether the time stamp is before or after the switching time for each IoT data. Then, the buffer unit 513a holds the IoT data with the time stamp of or after the switching time in the buffer, and inputs the IoT data with the time stamp before the switching time to the processing unit 513.

The IoT data input to the processing unit 513 is processed by the processing units 513 to 515, and the processing result is transmitted to the data output unit 517. The data output unit 517 stores the message indicating the processing result of IoT data with the time stamp that is before the switching time in a switching destination debug MQ 730.

Figure 10:
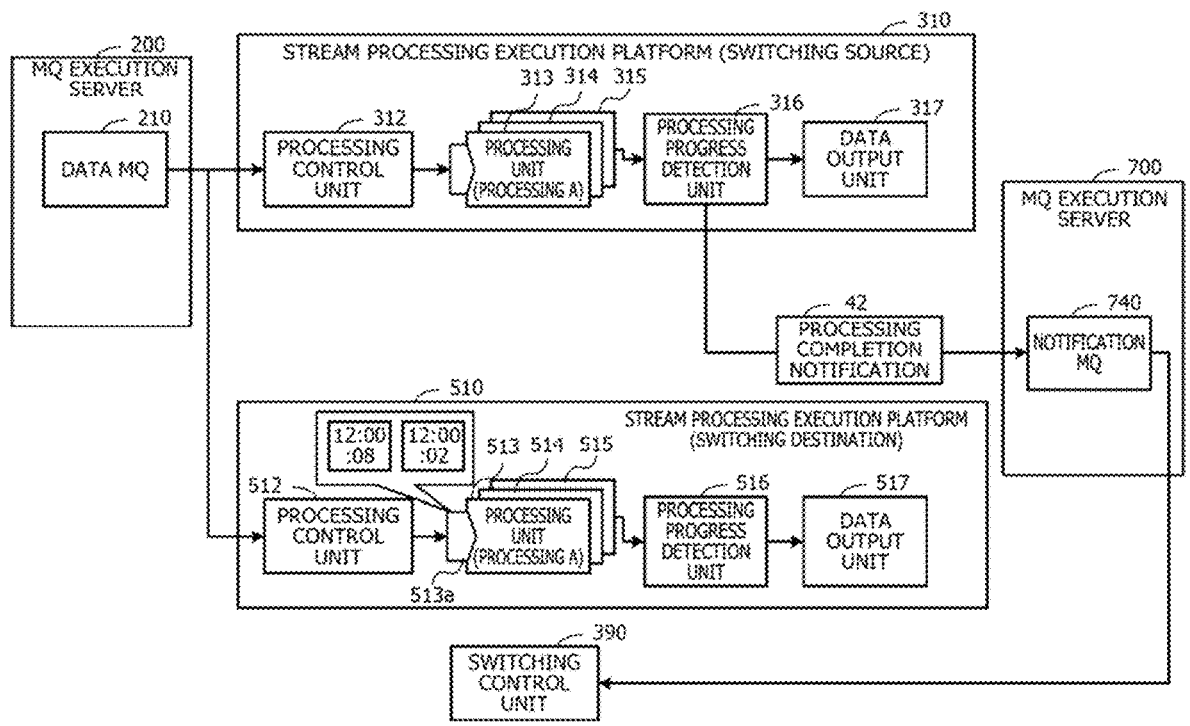
FIG. 10 is a diagram (⅗) illustrating an example of the processing system switching processing.

FIG. 10 is a diagram (3/5) illustrating an example of the processing system switching processing. When determining completion of the input of the IoT data up to the switching time, the processing control unit 312 of the switching source transmits the watermark of the switching time. For example, in a case where it can be statistically determined that the input of the IoT data up to the switching time "12:00" has been completed, the processing control unit 312 transmits the watermark indicating "12:00".

The watermark is continuously transferred in the stream processing execution platform 310, following the IoT data input before that. When the watermark indicating the switching time reaches the processing progress detection unit 316, the processing progress detection unit 316 detects completion of the data processing up to the switching time on the switching source. Then, the processing progress detection unit 316 stores a control message 42 indicating the processing completion notification in the notification MQ 740. The control message 42 stored in the notification MQ 740 is transmitted by the MQ execution server 700 to the switching control unit 390.

Figure 11:
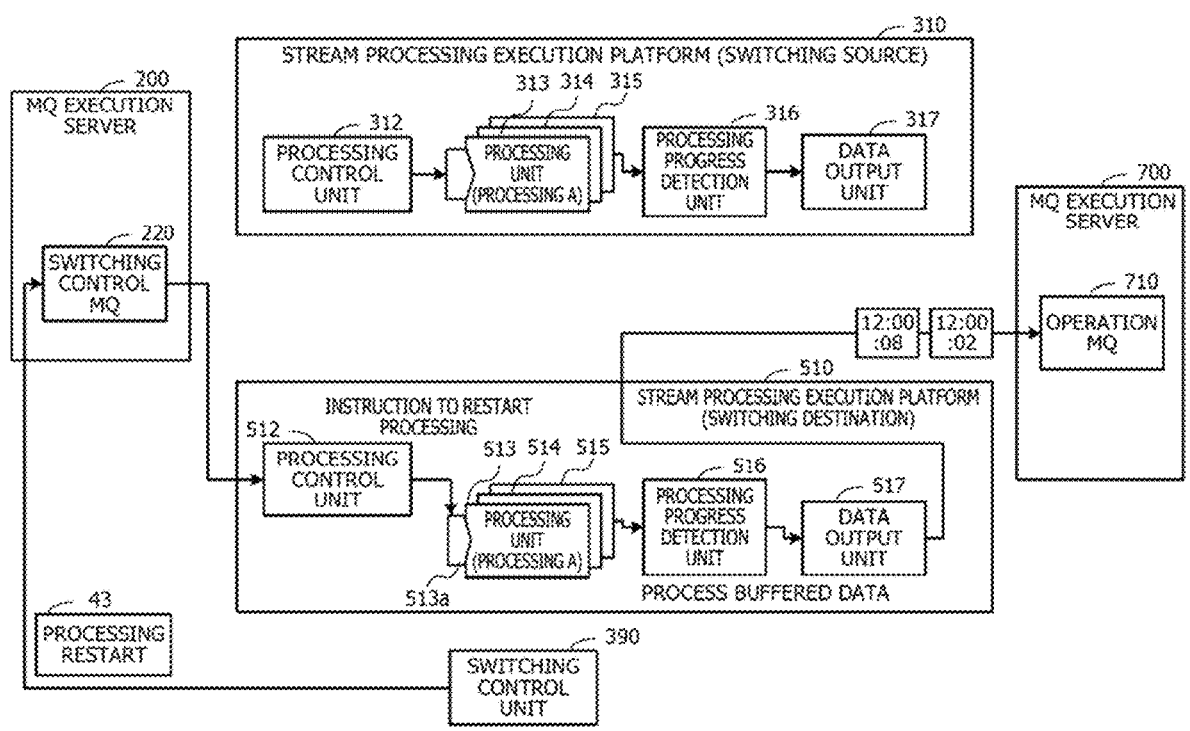
FIG. 11 is a diagram (⅘) illustrating an example of the processing system switching processing.

FIG. 11 is a diagram (4/5) illustrating an example of the processing system switching processing. When receiving the processing completion notification, the switching control unit 390 stores a control message 43 indicating processing restart in the switching control MQ 220. The stored control message 43 is transmitted by the MQ execution server 200 to the processing control unit 512 in the stream processing execution platform 510 of the switching destination. The processing control unit 512 that has received the control message 43 transmits the processing restart instruction to the buffer unit 513a.

When receiving the processing restart instruction, the buffer unit 513a releases the IoT data having the buffered time stamp of or after the switching time, and restarts the processing in the processing units 513 to 515 using the corresponding IoT data.

In the data output unit 517, the internal output destination switching unit compares the time stamp given to the processing result of the IoT data with the switching time, and determines whether the time stamp is before or after the switching time. Note that, after the processing restart instruction is issued, the time stamp after the processing result is the time of or after the switching time. The data output unit 517 stores the processing result with the time stamp of or after the switching time in the operation MQ 710.

Figure 12:
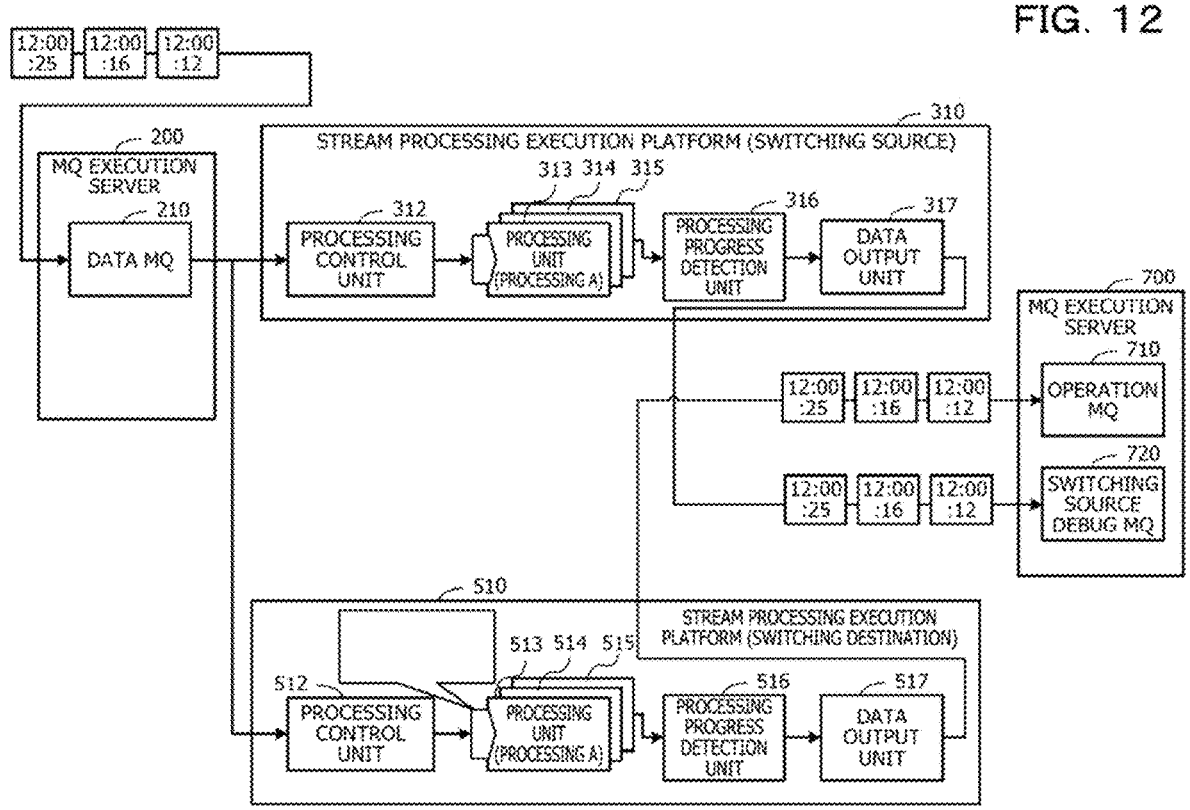
FIG. 12 is a diagram (5/5) illustrating an example of the processing system switching processing.

FIG. 12 is a diagram (5/5) illustrating an example of the processing system switching processing. FIG. 12 illustrates an operating state after the switching is completed. After the switching is completed, the data output unit 317 of the stream processing execution platform 310 of the switching source stores the message indicating the processing result in the switching source debug MQ 720. Furthermore, the buffer unit 513a of the stream processing execution platform 510 of the switching destination does not buffer the IoT data, and uses the input IoT data as it is as an input to the processing unit 513. The data output unit 517 stores the message indicating the processing result in the operation MQ 710.

In this way, when switching the processing system, duplicate storage of the processing results with the same time stamp in the operation MQ 710 is suppressed, and omission of some processing results with the time stamp is also suppressed.

Next, a processing system switching processing procedure will be described in time series with reference to FIGS. 13 and 14.

Figure 13:
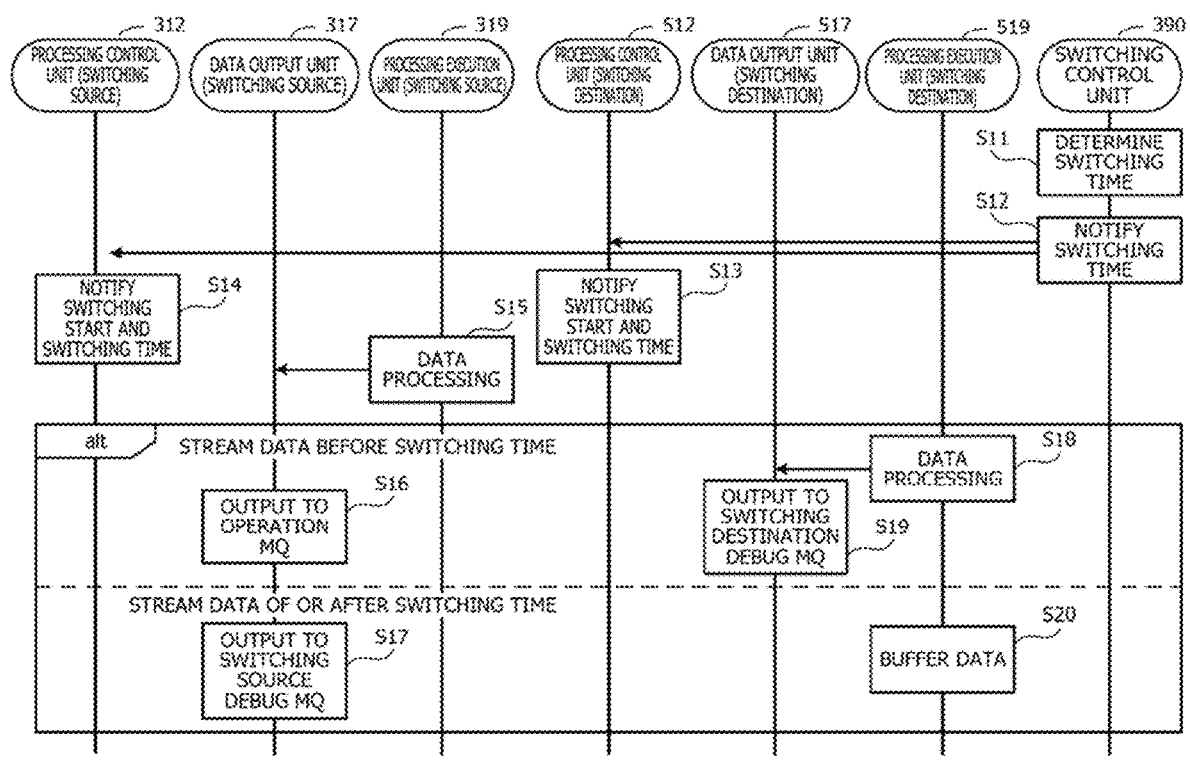
FIG. 13 is the first half of a sequence diagram illustrating a processing system switching processing procedure.

FIG. 13 is a first half of a sequence diagram illustrating the processing system switching processing procedure. The switching control unit 390 that has received the input of the switching start instruction determines the switching time (step S11). Next, the switching control unit 390 notifies the processing control unit 312 of the switching source and the processing control unit 512 of the switching destination of the switching time (step S12).

The processing control unit 312 of the switching source notifies the buffer units in the respective processing units 313 to 315, the processing progress detection unit 316, and the output destination switching unit 317a (see FIG. 7) in the data output unit 317 of switching start and the switching time (step S13), for example. The processing control unit 512 of the switching destination notifies the buffer units in the respective processing units 513 to 515, the processing progress detection unit 516, and the output destination switching unit in the data output unit 517 of the switching start and the switching time (step S14), for example.

The processing execution unit 319 of the switching source executes the stream data processing (step S15). The data output unit 317 outputs the processing result of the stream data before the switching time to the operation MQ 710 (step S16). Furthermore, the data output unit 317 outputs the processing result of the stream data of or after the switching time to the switching source debug MQ 720 (step S17).

The processing execution unit 519 (including the processing units 513 to 515) of the switching destination executes the processing for the stream data before the switching time (step S18). The data output unit 517 outputs the processing result of the stream data before the switching time to the switching destination debug MQ 730 (step S19). Furthermore, the buffer unit 513a (see FIG. 9) of the processing unit 513 on the uppermost stream side holds each IoT data of the stream data of or after the switching time in the buffer (step S20).

Figure 14:
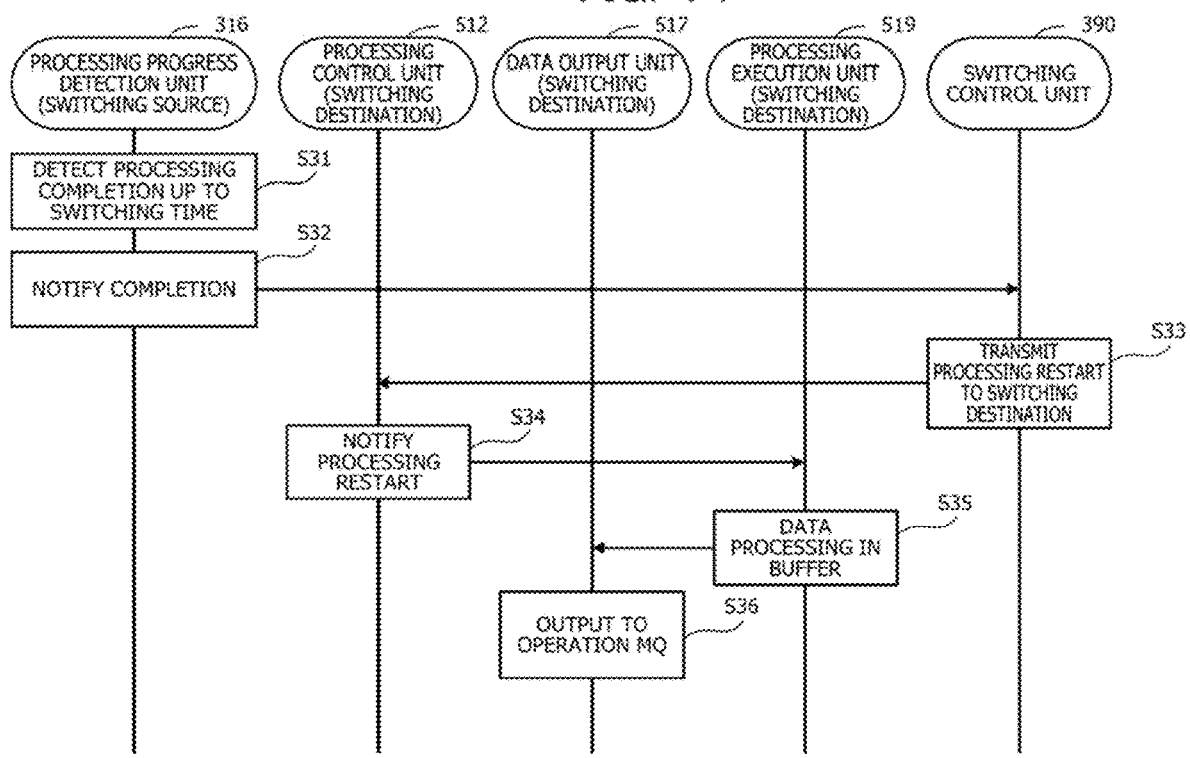
FIG. 14 is the latter half of the sequence diagram illustrating a processing system switching processing procedure.

FIG. 14 is a latter half of the sequence diagram illustrating the processing system switching processing procedure. The processing progress detection unit 316 detects completion of the processing up to the switching time on the basis of the watermark (step S31). The processing progress detection unit 316 notifies the switching control unit 390 of the completion of the processing via the notification MQ 740 (see FIG. 7) (step S32). The switching control unit 390 transmits the control message indicating processing restart to the processing control unit 512 of the switching destination via the switching control MQ 220 (see FIG. 7) (step S33). The processing control unit 512 of the switching destination notifies the buffer unit 513a (see FIG. 9) of the first processing unit 513 in the processing execution unit 519 of the restart of the processing (step S34). Then, each of the processing units 513 to 515 (see FIG. 7) of the processing execution unit 519 processes the IoT data held in the buffer unit 513a (step S35). The data output unit 517 that has received the processing result outputs a message indicating the processing result to the operation MQ 710 (step S36).

The above is an overall processing flow of switching the processing system. Next, processing for each functional block in the stream processing execution server 300 illustrated in FIG. 7 will be described in detail. In the following description, the functions in the stream processing execution platform 310 will be described as execution entities, but the same processing is performed in the functions of the same names in the other stream processing execution platforms 320, 410, 510, 520, 610, and 620.

First, details of the stream data processing in each processing unit will be described with reference to FIGS. 15 and 16 with the processing unit 313 as the execution entity.

Figure 15:
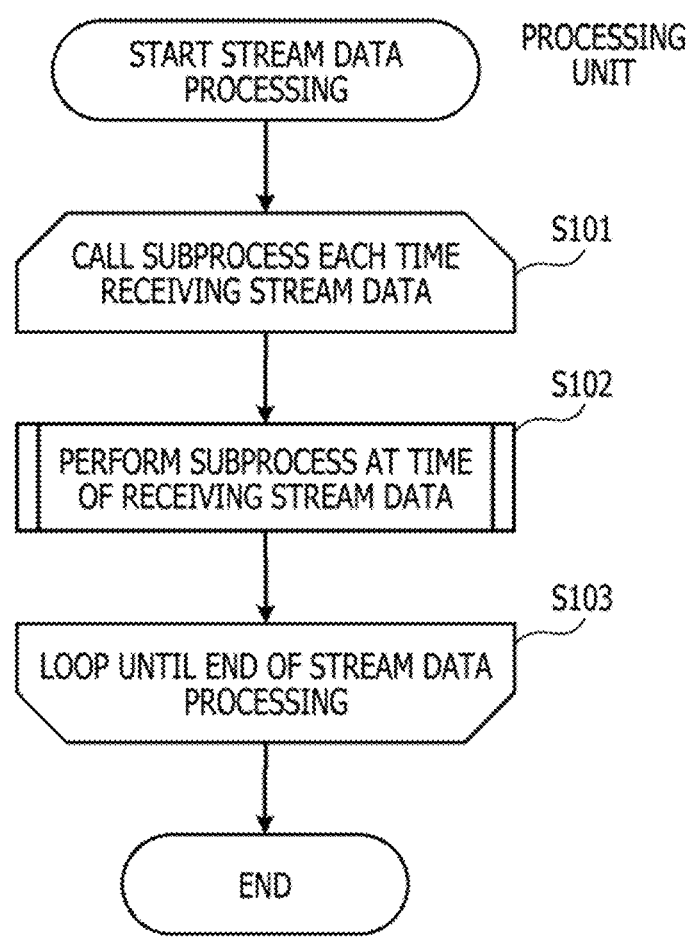
FIG. 15 is a flowchart illustrating an example of a procedure of stream data processing in a processing unit.

FIG. 15 is a flowchart illustrating an example of a procedure of stream data processing in the processing unit. Hereinafter, processing illustrated in FIG. 15 will be described in accordance with step numbers.

[step S101] Each time when each IoT data constituting the stream data is received, the processing unit 313 calls a subprocess at the time of receiving stream data illustrated in step S102.

[step S102] The processing unit 313 executes the subprocess at the time of receiving stream data. Details of the processing for the subprocess will be described below (see FIG. 16).

[step S103] The processing unit 313 repeats the processing of step S102 for each stream data reception until the end of the stream data processing (continues loop processing). The end of stream data is, for example, when an input to stop the service of the system is given.

Figure 16:
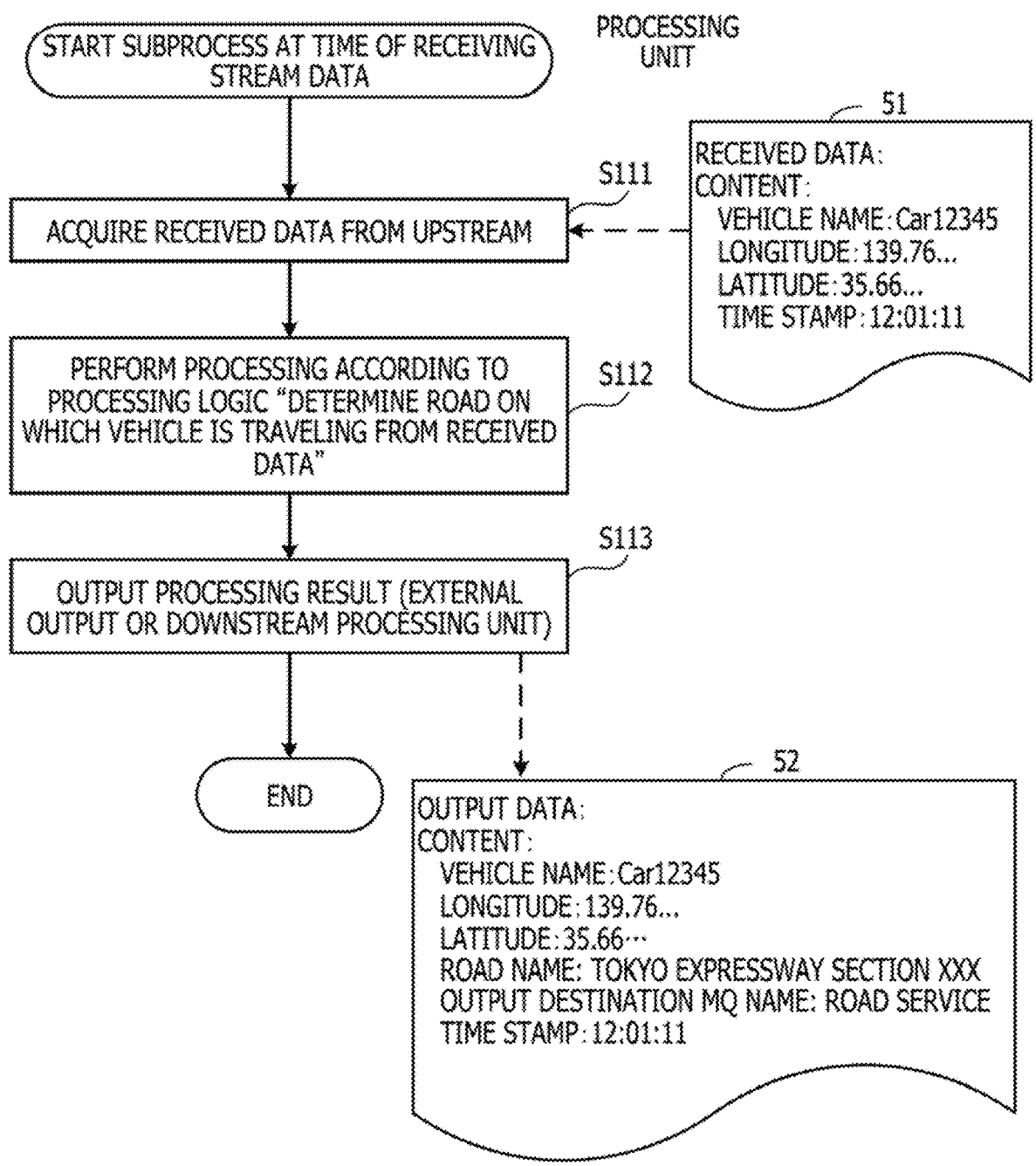
FIG. 16 is a flowchart illustrating an example of a processing procedure of a subprocess at the time of receiving stream data in the processing unit.

FIG. 16 is a flowchart illustrating an example of a processing procedure of the subprocess at the time of receiving stream data in the processing unit. Hereinafter, processing illustrated in FIG. 16 will be described in accordance with step numbers.

[step S111] The processing unit 313 acquires the IoT data (received data 51) received from the processing control unit 312 on the upstream side. Note that, in the case where there is another processing unit upstream of the processing unit 313, the processing unit 313 reads the received data 51 from the processing unit on the upstream side. The received data 51 includes information such as vehicle name, latitude, longitude, and time stamp of the connected car, for example.

[step S112] The processing unit 313 executes processing using the received data 51 according to a processing logic defined in the processing unit 313 in advance. For example, the processing unit 313 determines a road on which the vehicle is traveling from the latitude and longitude of the received data 51. Specifically, the processing unit 313 refers to map data illustrating the position of the road, and determines that the road existing at the position of the latitude and longitude of the vehicle is the road on which the vehicle is traveling.

[step S113] The processing unit 313 outputs the processing result to another downstream processing unit or the processing progress detection unit 316. For example, in the case where there is another processing to be executed in the stream processing execution platform, the processing unit 313 outputs the processing result to another processing unit. If the processing executed by the processing unit 313 is the last processing of the processing route in the stream processing execution platform, the processing unit 313 outputs the processing result to the processing progress detection unit 316.

Output data 52 to be output includes, for example, the vehicle name, latitude, longitude, road name, output destination MQ name, and time stamp. The output destination MQ name is a name indicating the operation MQ 710 corresponding to the service using the output data in the case where a plurality of operation MQs 710 is provided for each service content.

The processing illustrated in FIGS. 15 and 16 is an example of the stream data processing executed by the processing unit 313, and other processing units may execute another processing using, for example, the processing result of the processing unit 313. For example, processing of calculating the degree of congestion for each road on the basis of the name of the road on which each connected car is traveling is possible.

Next, details of processing executed by the processing control unit 312 will be described with reference to FIGS. 17 to 20.

Figure 17:
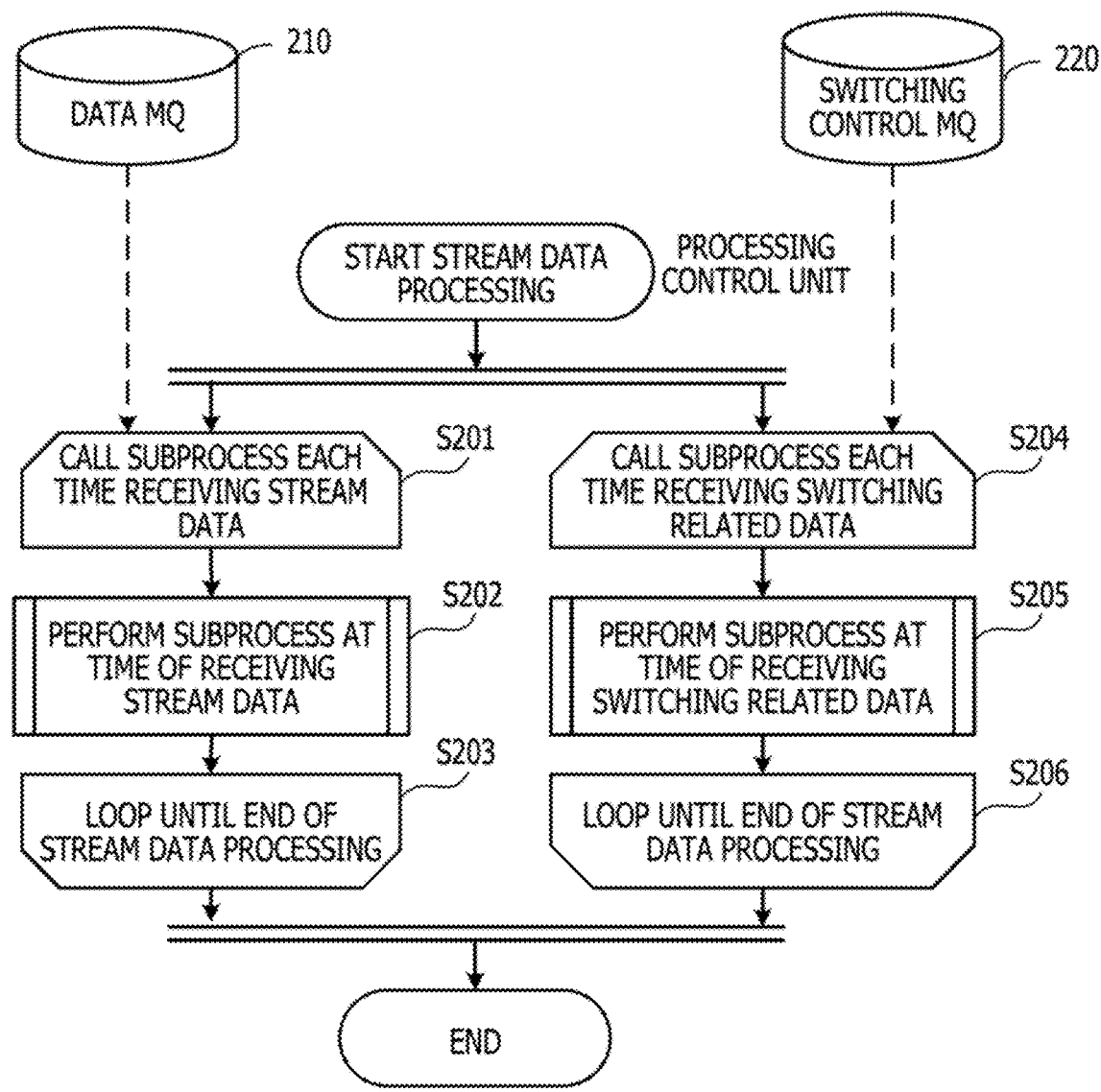
FIG. 17 is a flowchart illustrating an example of a procedure of stream data processing in a processing control unit.

FIG. 17 is a flowchart illustrating an example of a procedure of the stream data processing in the processing control unit. Hereinafter, processing illustrated in FIG. 17 will be described in accordance with step numbers. Note that the double lines in FIG. 17 represent asynchronous parallel processing (corresponding to a fork node and a join node in an activity diagram of unified modeling language (UML)). That is, the processing of steps S201 to S203 and the processing of steps S204 to S206 are executed asynchronously and in parallel.

[step S201] The processing control unit 312 calls the subprocess at the time of receiving stream data in step S202 each time when the stream data (each IoT data) from the data MQ 210 is received.

[step S202] The processing control unit 312 executes the subprocess at the time of receiving stream data. Details of the processing of the subprocess will be described below (see FIGS. 18 and 19).

[step S203] The processing control unit 312 repeats the processing of step S202 for each stream data reception until the end of the stream data processing.

[step S204] The processing control unit 312 calls the subprocess at the time of receiving switching related data in step S205 each time when switching related data is received from the switching control MQ 220. The switching related data is data indicating the switching time or data indicating processing restart indicated in the control message stored in the switching control MQ 220.

[step S205] The processing control unit 312 executes a subprocess at the time of receiving switching related data. Details of the processing of the subprocess will be described below (see FIG. 20).

[step S206] The processing control unit 312 repeats the processing of step S205 for each switching related data reception until the end of the stream data processing.

Figure 18:
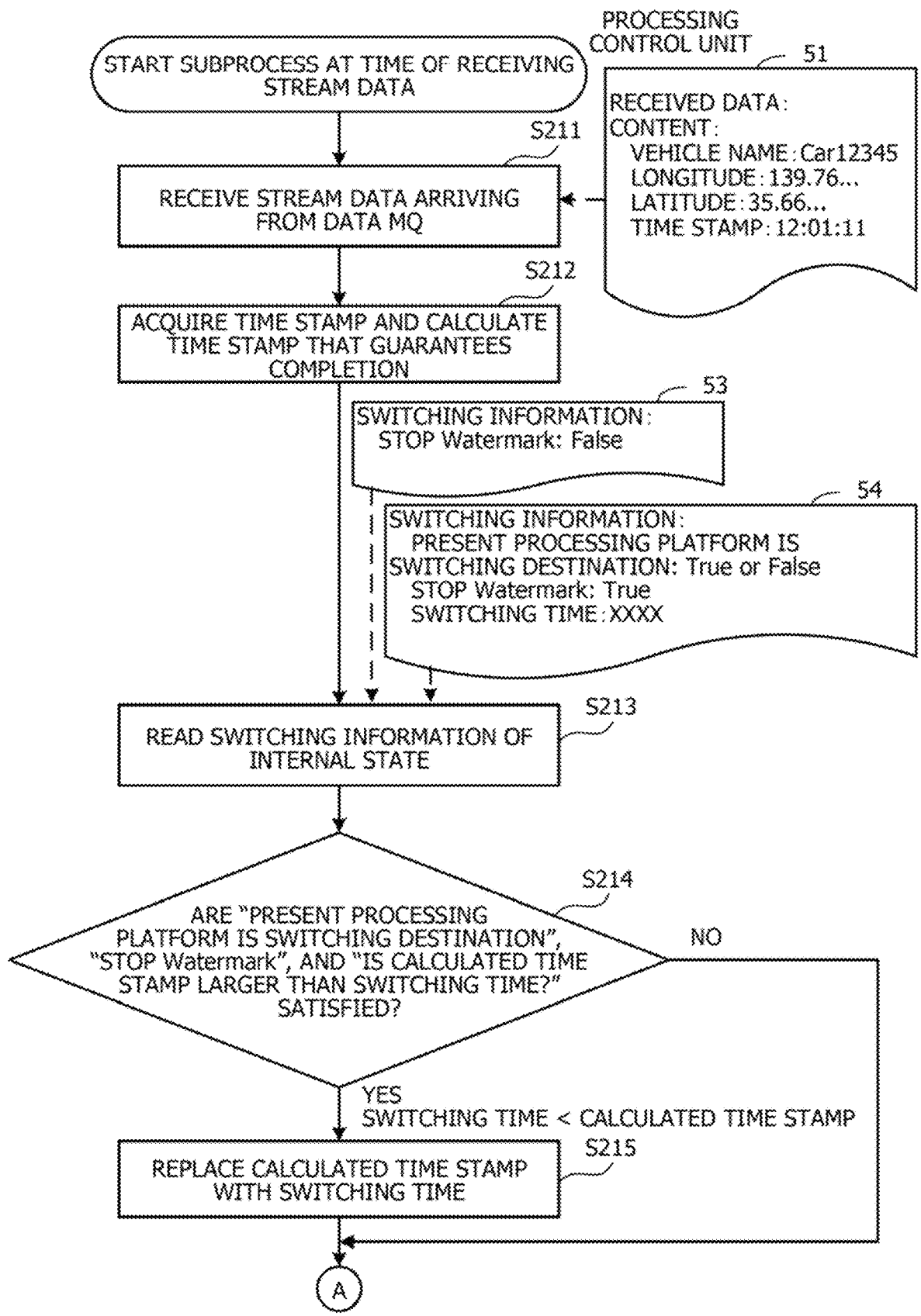
FIG. 18 is the first half of the flowchart illustrating an example of the processing procedure of the subprocess at the time of receiving stream data in the processing control unit.

FIG. 18 is the first half of the flowchart illustrating an example of the processing procedure of the subprocess at the time of receiving stream data in the processing control unit. Hereinafter, processing illustrated in FIG. 18 will be described in accordance with step numbers.

[step S211] The processing control unit 312 receives the IoT data (received data 51) constituting the stream data arriving from the data MQ 210.

[step S212] The processing control unit 312 acquires the time stamp of the received data 51, and calculates a calculated time stamp indicating the time at which completion of the processing progress in the stream data can be guaranteed. For example, the processing control unit 312 sets the time went back by a predetermined time (for example, the time obtained by subtracting several minutes or several tens of seconds) from the time stamp of the data as a calculated time stamp.

[step S213] The processing control unit 312 reads out switching information of an internal state. The internal state is information indicating an operating state in the processing system. The internal states are stored in a memory or a storage device. The switching information indicates, for example, whether the watermark is stopped. For example, switching information 53 indicating that the watermark is not stopped is described as "stop watermark: false". The switching information 54 indicating that the watermark is stopped includes information as to whether the present processing platform is the switching destination (the present processing platform is the switching destination: true or false), the switching time, and the like, in addition to "stop watermark: true".

[step S214] The processing control unit 312 determines whether conditions that "the present processing platform is the switching destination", "stop the watermark", and "the calculated time stamp is larger than the switching time" are satisfied. The processing control unit 312 advances the processing to step S215 in the case where all the conditions are satisfied. Furthermore, the processing control unit 312 advances the processing to step S221 (see FIG. 19) in the case where any one of the conditions is not satisfied.

[step S215] The processing control unit 312 replaces the time of the calculated time stamp with the switching time of the processing system. Thereafter, the processing control unit 312 advances the processing to step S221 (see FIG. 19).

Figure 19:
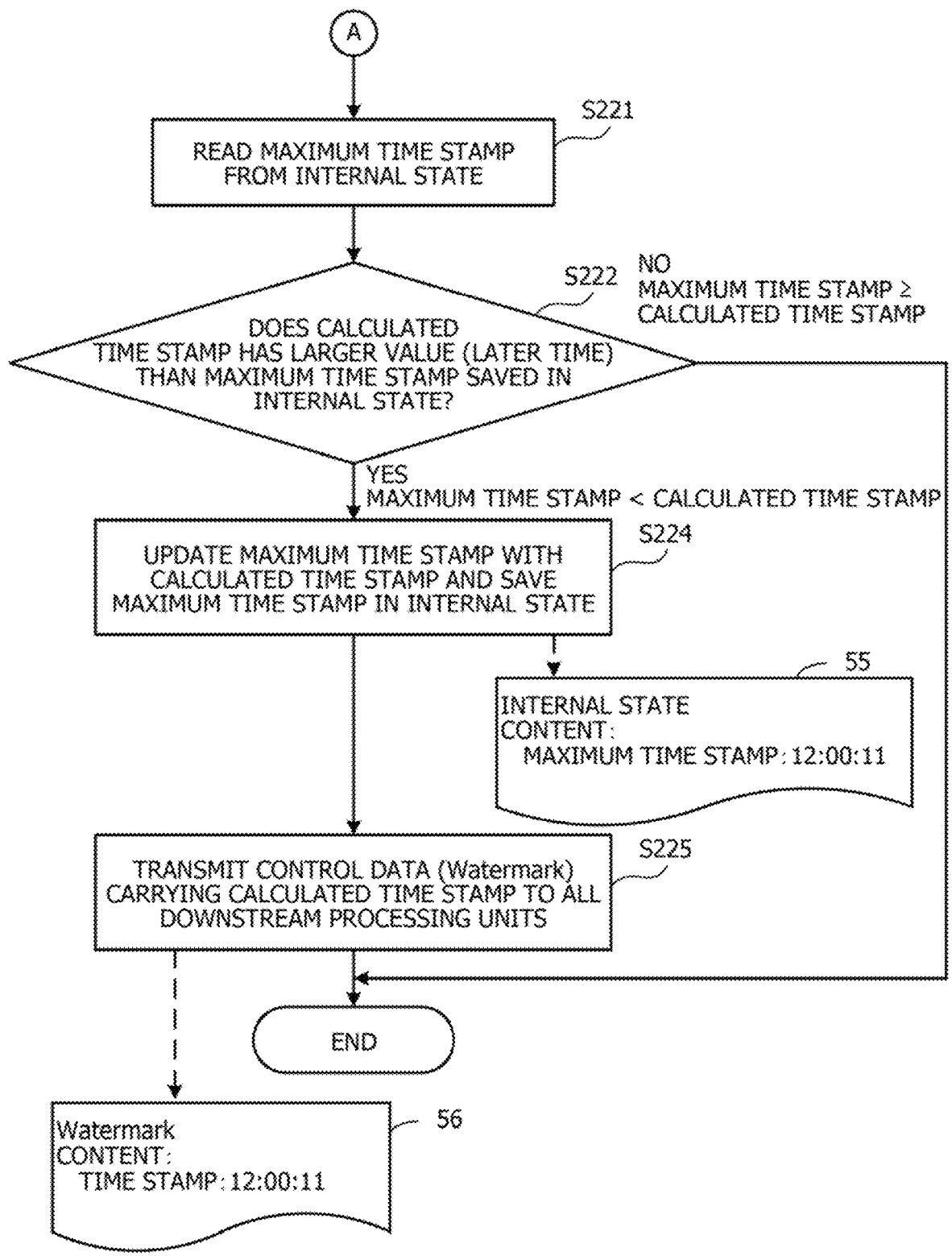
FIG. 19 is the latter half of the flowchart illustrating an example of the processing procedure of the subprocess at the time of receiving stream data in the processing control unit.

FIG. 19 is the latter half of the flowchart illustrating an example of the processing procedure of the subprocess at the time of receiving stream data in the processing control unit. Hereinafter, processing illustrated in FIG. 19 will be described in accordance with step numbers.

[step S221] The processing control unit 312 reads the maximum time stamp from the internal state.

[step S222] The processing control unit 312 determines whether the calculated time stamp has a value larger (later time) than the maximum time stamp saved in the internal state. In the case where the calculated time stamp has a larger value, the processing control unit 312 advances the processing to step S224. Furthermore, in the case where the calculated time stamp is equal to or less than the maximum time stamp, the processing control unit 312 terminates the subprocess at the time of receiving stream data.

[step S223] The processing control unit 312 updates the maximum time stamp with the calculated time stamp, and saves the updated maximum time stamp in an internal state 55 of the processing control unit 312.

[step S225] The processing control unit 312 transmits a watermark 56 carrying the calculated time stamp to all the processing units on the downstream side.

In this way, the processing control unit 312 transmits the watermark including an appropriate time stamp. That is, in the case where the watermark is not being stopped and the calculated time stamp indicating the time stamp of the IoT data that guarantees the completion of processing is larger than the maximum time stamp, the watermark including the calculated time stamp is transmitted. The maximum time stamp is a maximum value of the time stamp of the transmitted watermark. Therefore, the watermark with the time before the transmitted watermark is not transmitted.

In the stream processing execution platform of the switching destination after setting "stop the watermark", in the case where the calculated time stamp is larger than the switching time ("Yes" in step S214 of FIG. 18), the calculated time stamp is replaced with the switching time (see step S215 in FIG. 18). As a result, when the calculated time stamp of or after the switching time is first calculated, the watermark including the switching time as the time stamp is transmitted. When the calculated time stamp that is or after the switching time is calculated twice or more, the "maximum time stamp (the switching time is saved at the first time)≥ the calculated time stamp (switching time)" is obtained from the second time onward (No in step S222). As a result, transmission of the watermark is suppressed. That is, the time stamp of the watermark is stopped at the switching time.

Note that, in FIGS. 18 and 19, whether to transmit the watermark is determined each time when the received data 51 is received, but the determination may be made at different timing. For example, the processing control unit 312 can determine whether to transmit the watermark periodically at regular time intervals as well as at the time of receiving the stream data as a variation of the watermark transmission timing. In this case, the processing control unit 312 calculates the time stamp at the time of receiving the stream data, and transmits the watermark of the time stamp calculated in the past at transmission timing at regular time intervals.

Figure 20:
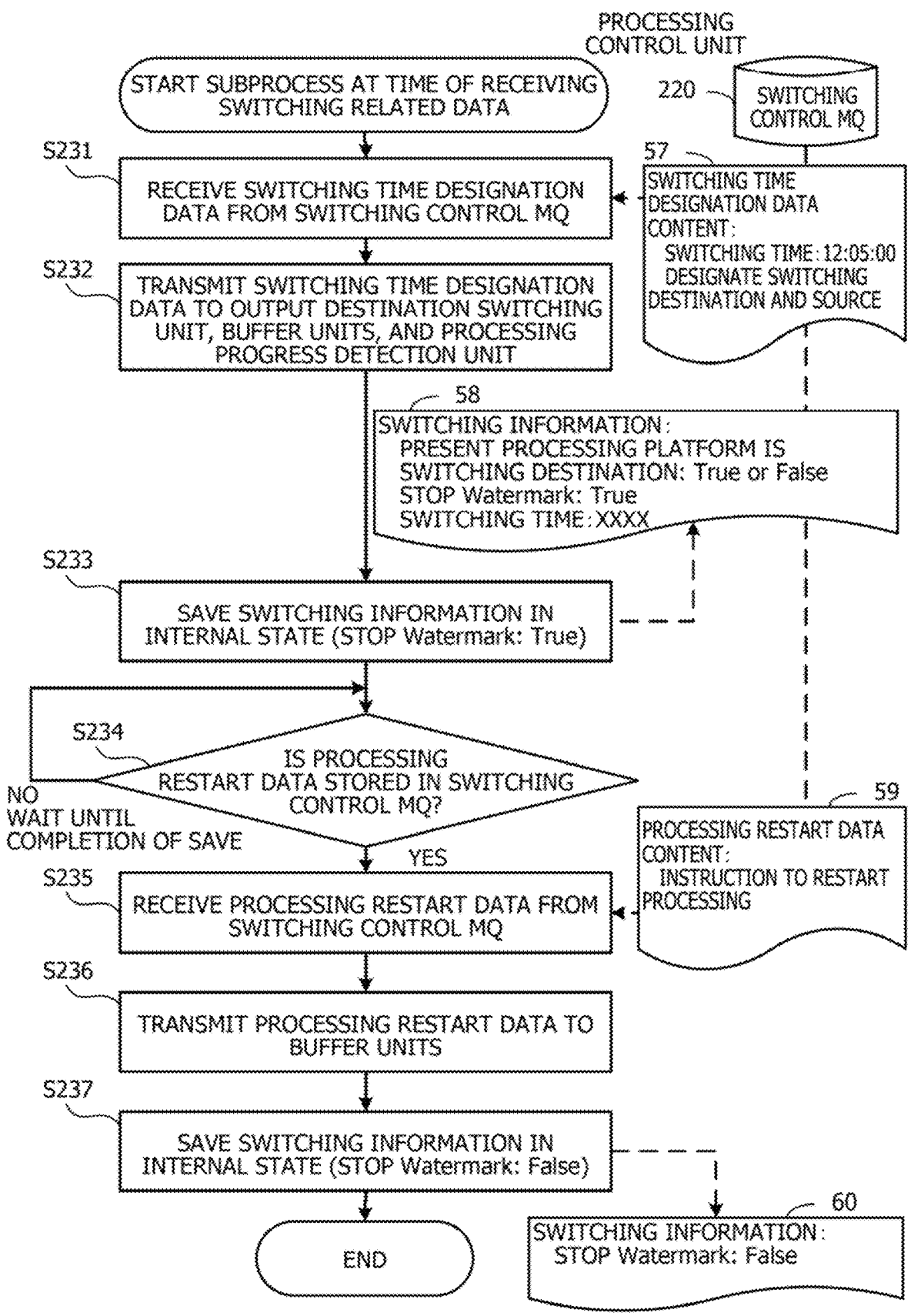
FIG. 20 is a flowchart illustrating an example of a processing procedure of a subprocess at the time of receiving switching related data in the processing control unit.

FIG. 20 is a flowchart illustrating an example of a processing procedure of the subprocess at the time of receiving switching related data in the processing control unit. Hereinafter, processing illustrated in FIG. 20 will be described in accordance with step numbers.

[step S231] The processing control unit 312 receives switching time designation data 57 from the switching control MQ 220. The switching time designation data 57 includes the switching time and information for designating whether the present control platform is the switching destination or the switching source.

[step S232] The processing control unit 312 transmits the switching time designation data 57 to the output destination switching unit 317a, the buffer units 313a, 314a, and 315a of the respective processing units 313 to 315, and the processing progress detection unit 316.

[step S233] The processing control unit 312 saves switching information 58 in the internal state. The saved switching information 58 includes the information indicating whether the control platform is the switching destination, the information indicating that the watermark is stopped, and the information indicating the switching time.

[step S234] The processing control unit 312 determines whether processing restart data 59 is stored in the switching control MQ 220. In the case where the processing restart data 59 is stored, the processing control unit 312 advances the processing to step S235. Furthermore, in the case where the processing restart data 59 is not stored, the processing control unit 312 repeats the processing in step S234 and waits for the processing restart data 59 to be stored.

[step S235] The processing control unit 312 receives the processing restart data 59 from the switching control MQ 220. The processing restart data indicates an instruction to restart the processing.

[step S236] The processing control unit 312 transmits the processing restart data 59 to the buffer units 313a, 314a, and 315a of the respective processing units 313 to 315.

[step S237] The processing control unit 312 saves switching information 60 in the internal state. The switching information 60 includes information indicating that stop of the watermark is released (stop the watermark: false).

In this way, when the switching time is designated, the setting to stop the watermark of or after the switching time is saved in the internal state, and when the processing restart is instructed, the setting not to stop the watermark is saved in the internal state. A value of the internal state indicating whether to stop the watermark is referred to in the subprocess at the time of receiving stream data (see FIGS. 18 and 19), and the watermark is controlled according to the setting.

The above is the details of the processing of the processing control unit 312. Next, processing executed by the data output unit 317 will be described in detail with reference to FIGS. 21 to 23.

Figure 21:
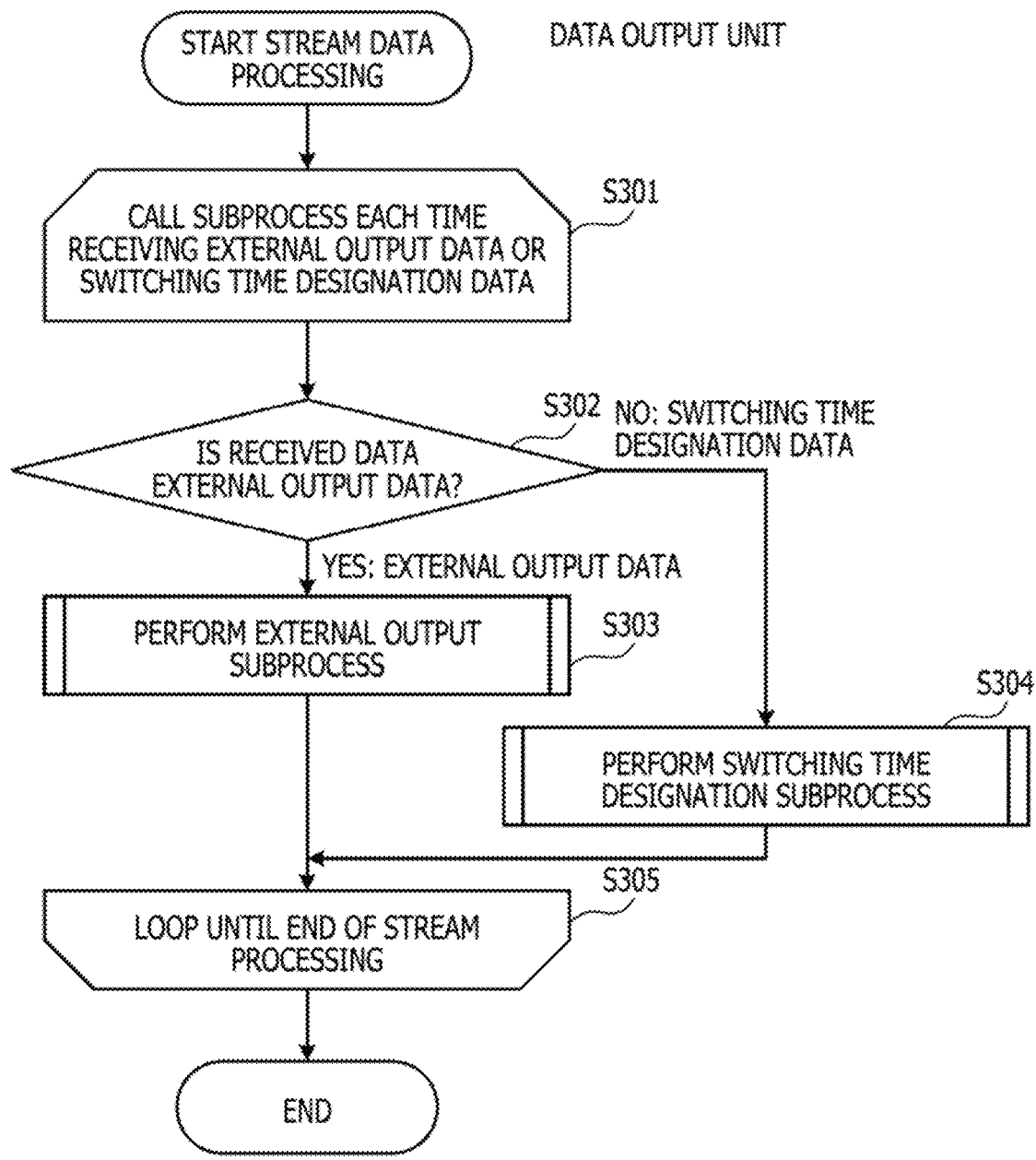
FIG. 21 is a flowchart illustrating an example of a procedure of stream data processing in a data output unit.

FIG. 21 is a flowchart illustrating an example of a procedure of stream data processing in the data output unit. Hereinafter, processing illustrated in FIG. 21 will be described in accordance with step numbers.

[step S301] The data output unit 317 calls the subprocess by the processing of steps S302 to S304 each time when external output data or switching time designation data is received.

[step S302] The data output unit 317 determines whether the received data is the external output data. The external output data is data indicating the processing result of the stream data. When the received data is the external output data, the data output unit 317 advances the processing to step S303. Furthermore, when the received data is the switching time designation data, the data output unit 317 advances the processing to step S304.

[step S303] The data output unit 317 executes an external output subprocess. Details of the external output subprocess will be described below (see FIG. 22). Thereafter, the data output unit 317 advances the processing to step S305.

[step S304] The data output unit 317 executes a switching time designation subprocess. Details of the switching time designation subprocess will be described below (see FIG. 23).

[step S305] The data output unit 317 repeats the processing of steps S302 to S304 for each reception of the external output data or the switching time designation data until the end of the stream data processing.

Figure 22:
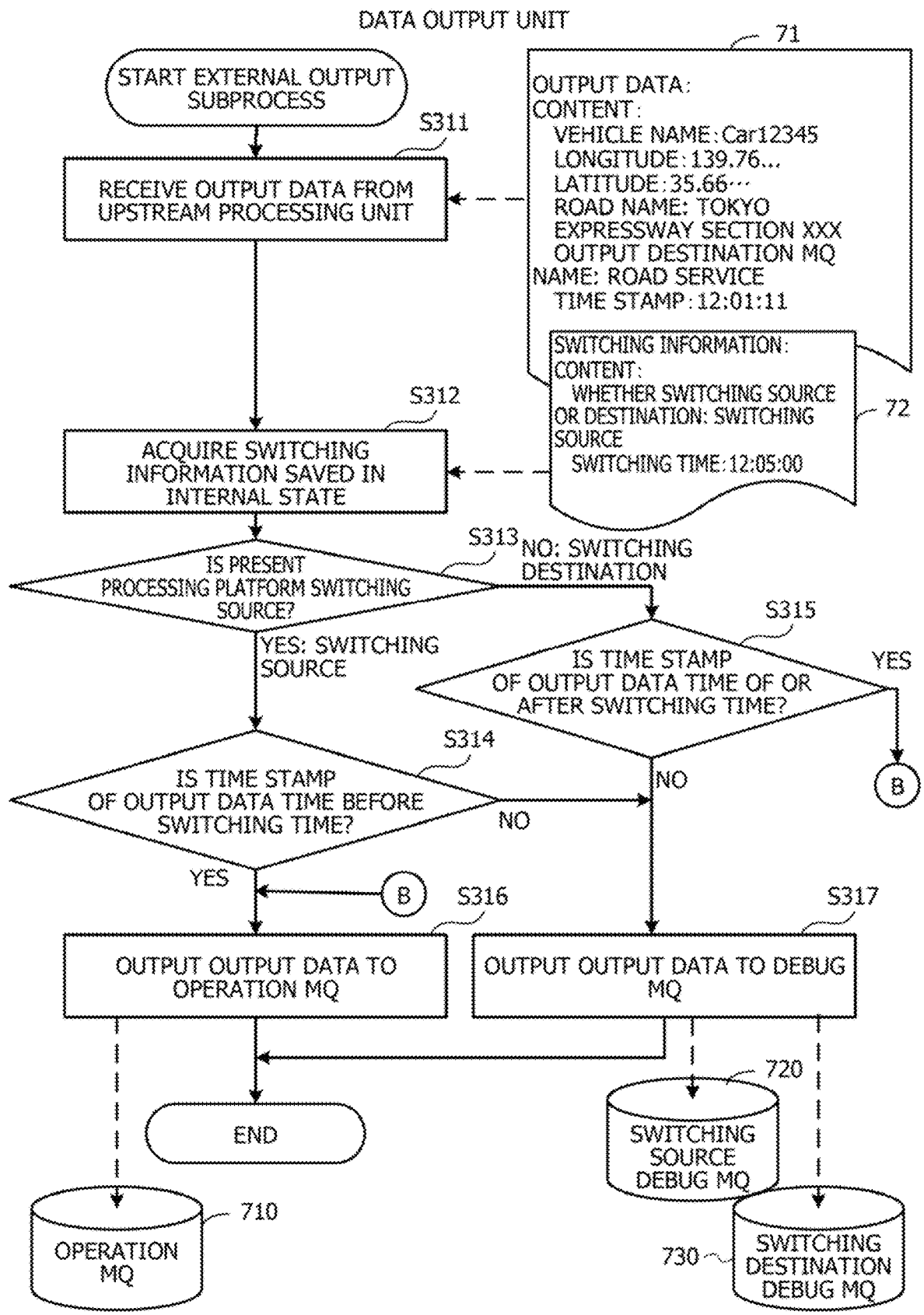
FIG. 22 is a flowchart illustrating an example of a processing procedure of an external output subprocess in the data output unit.

FIG. 22 is a flowchart illustrating an example of a processing procedure of the external output subprocess in the data output unit.

Hereinafter, processing illustrated in FIG. 22 will be described in accordance with step numbers.

[step S311] The data output unit 317 receives external output data (output data 71) from the upstream processing unit. The output data 71 includes the processing result by the processing execution unit 319 (see FIG. 7) of the stream processing execution platform 310.

[step S312] The output destination switching unit 317a in the data output unit 317 acquires switching information 72 saved in the internal state. The switching information 72 includes the information indicating whether the present processing platform is the switching source or the switching destination, and the switching time.

[step S313] The output destination switching unit 317a determines whether the present processing platform is the switching source. In the case where the present processing platform is the switching source, the output destination switching unit 317a advances the processing to step S314. Furthermore, in the case where the present processing platform is the switching destination, the output destination switching unit 317a advances the processing to step S315.

[step S314] The output destination switching unit 317a determines whether the time stamp of the output data is the time before the switching time. The output destination switching unit 317a advances the processing to step S316 in the case where the time is before the switching time. Furthermore, the output destination switching unit 317a advances the processing to step S317 in the case where the time is or after the switching time.

[step S315] The output destination switching unit 317a determines whether the time stamp of the output data is the time of or after the switching time. The output destination switching unit 317a advances the processing to step S316 in the case where the time is or after the switching time. Furthermore, the output destination switching unit 317a advances the processing to step S317 in the case where the time is before the switching time.

[step S316] The data output unit 317 outputs a message including the output data 71 to the operation MQ 710, and terminates the processing of the external output subprocess.

[step S317] The data output unit 317 outputs the message including the output data 71 to the debug MQ (switching source debug MQ 720 or switching destination debug MQ 730) according to whether the present processing platform is the switching source or the switching destination, and terminates the processing of the external output subprocess.

In the case where the switching time setting instruction has not been given and the switching information 72 is not present, the output destination switching unit 317a outputs the message including the output data to the operation MQ 710.

Figure 23:
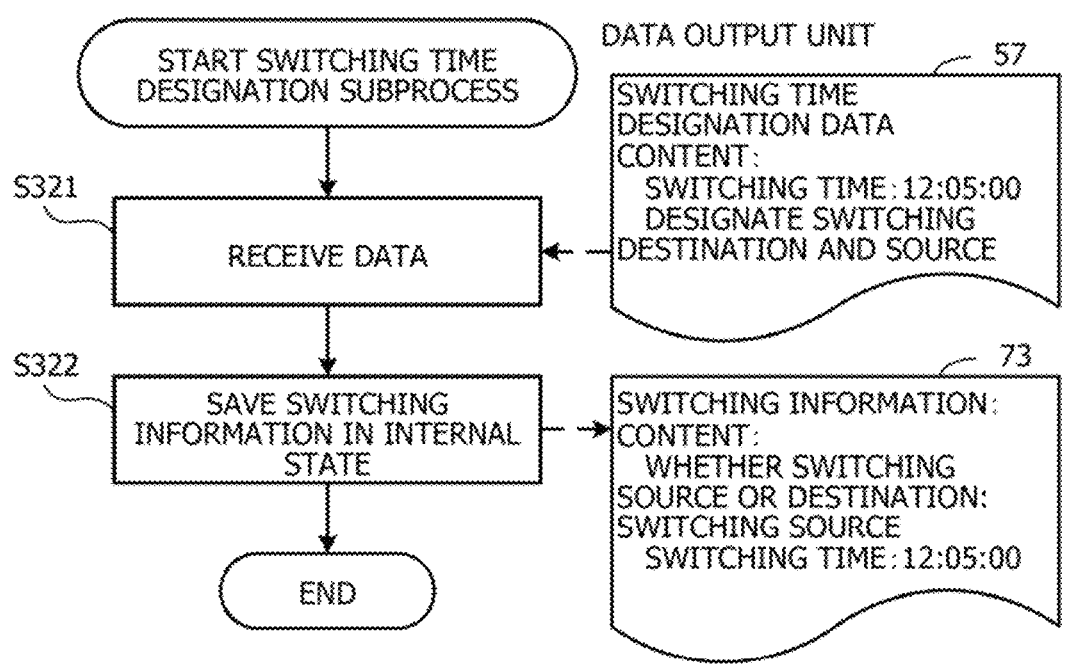
FIG. 23 is a flowchart illustrating an example of a processing procedure of a switching time designation subprocess in the data output unit.

FIG. 23 is a flowchart illustrating an example of a processing procedure of the switching time designation subprocess in the data output unit. Hereinafter, the processing illustrated in FIG. 23 is described along step numbers.

[step S321] The output destination switching unit 317a in the data output unit 317 receives the switching time designation data 57.

[step S322] The output destination switching unit 317a saves switching information 73 in the internal state. The switching information 73 to be saved includes the information indicating whether the present processing platform is the switching source or the switching destination, and the switching time.

In this way, the data output unit 317 can output the output data to an appropriate MQ on the basis of the time stamp of the output data.

The above is the details of the processing of the data output unit 317. Next, processing executed by the buffer unit 313a will be described in detail with reference to FIGS. 24 to 26.

Figure 24:
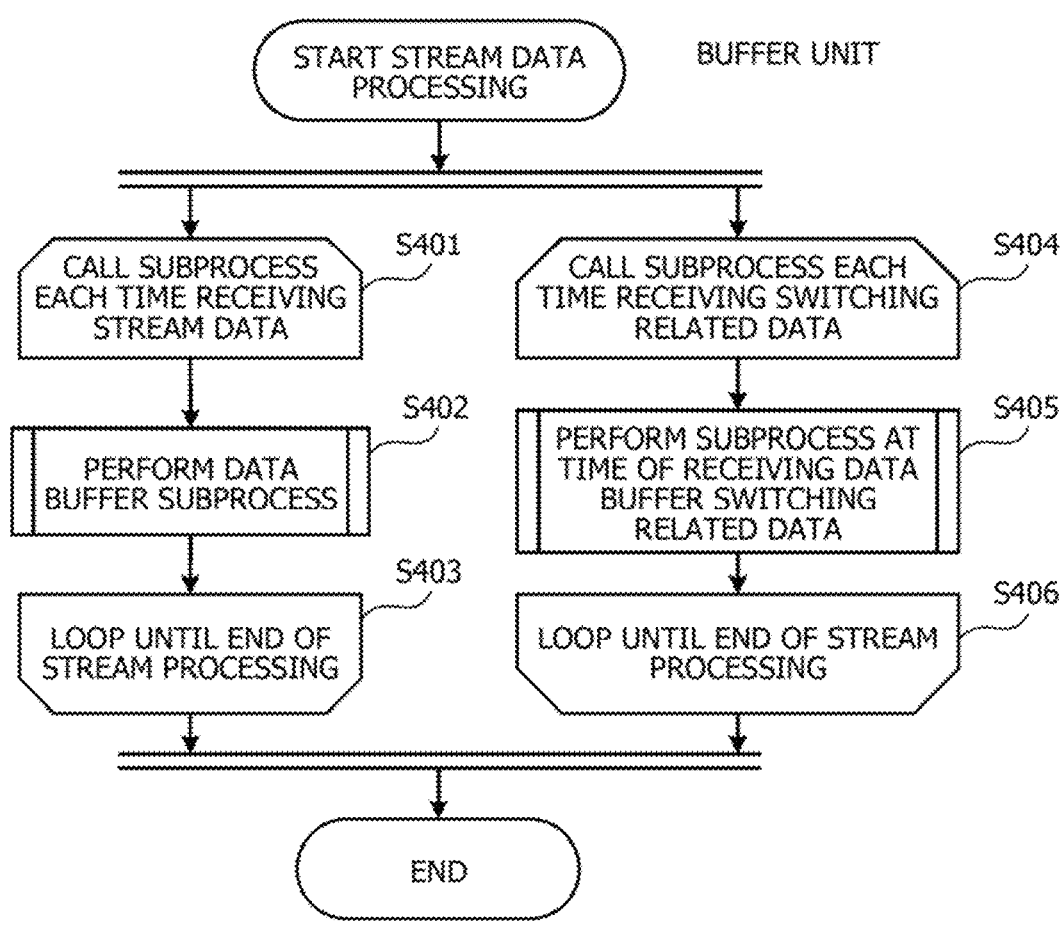
FIG. 24 is a flowchart illustrating an example of a procedure of stream data processing in a buffer unit.

FIG. 24 is a flowchart illustrating an example of a procedure of stream data processing in the buffer unit. Hereinafter, the processing illustrated in FIG. 24 is described along the step number. The processing of steps S401 to S403 and the processing of steps S404 to S406 are executed asynchronously and in parallel.

[step S401] The buffer unit 313a calls a data buffer subprocess of step S402 each time when the stream data (each IoT data) read from the data MQ 210 is received.

[step S402] The buffer unit 313a executes the data buffer subprocess. Details of the processing of the subprocess will be described below (see FIG. 25).

[step S403] The processing control unit 312 repeats the processing of step S402 for each stream data reception until the end of the stream data processing.

[step S404] The buffer unit 313a calls a subprocess at the time of receiving data buffer switching related data of step S405 each time receiving the switching related data read from the switching control MQ 220.

[step S405] The buffer unit 313a executes the subprocess at the time of receiving data buffer switching related data. Details of the processing of the subprocess will be described below (see FIG. 26).

[step S406] The buffer unit 313a repeats the processing of step S406 for each switching related data reception until the end of the stream data processing.

Figure 25:
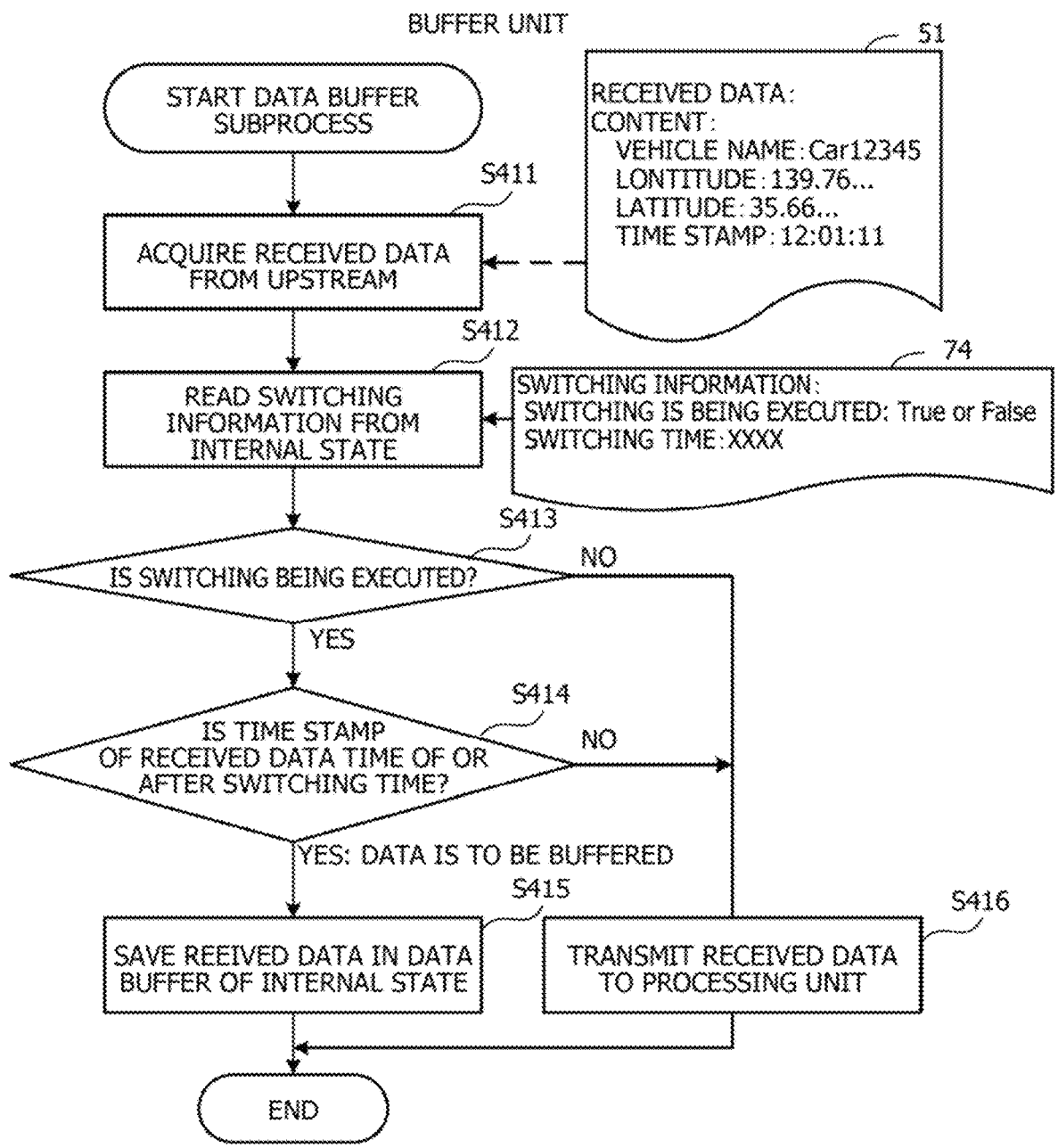
FIG. 25 is a flowchart illustrating an example of a processing procedure of a data buffer subprocess in the buffer unit.

FIG. 25 is a flowchart illustrating an example of a processing procedure of the data buffer subprocess in the buffer unit. Hereinafter, the processing illustrated in FIG. 25 is described along step numbers.

[step S411] The buffer unit 313a acquires the received IoT data (received data 51) from the processing control unit 312 on the upstream side.

[step S412] The buffer unit 313a reads switching information 74 from the internal state. The switching information 74 to be read includes information indicating whether switching of the processing system is being executed and the switching time.

[step S413] The buffer unit 313a determines whether switching is being executed. The buffer unit 313a advances the processing to step S414 in the case where the switching is being executed. Furthermore, the buffer unit 313a advances the processing to step S416 in the case where the switching is not being executed.

[step S414] The buffer unit 313a determines whether the time stamp of the received data 51 is the time of or after the switching time. The buffer unit 313a advances the processing to step S415 in the case where the time is or after the switching time. Furthermore, the buffer unit 313a advances the processing to step S416 in the case where the time is before the switching time.

[step S415] The buffer unit 313a saves the received data 51 in the data buffer in the internal state. Thereafter, the buffer unit 313a terminates the processing of the data buffer subprocess.

[step S416] The buffer unit 313a transmits the received data 51 to the processing unit 313.

Figure 26:
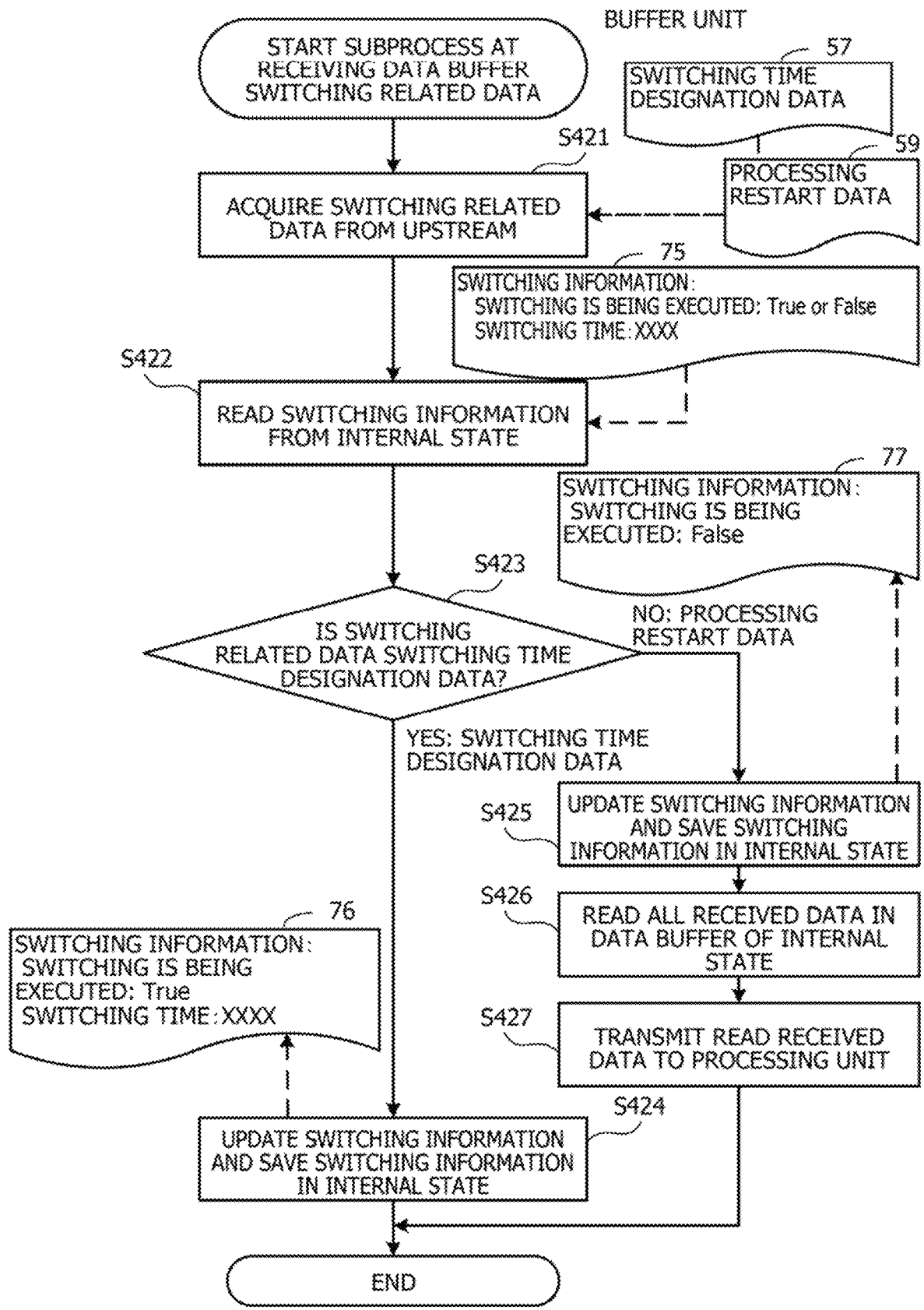
FIG. 26 is a flowchart illustrating an example of a processing procedure of a subprocess at the time of receiving data buffer switching related data in the buffer unit.

FIG. 26 is a flowchart illustrating an example of a processing procedure of the subprocess at the time of receiving data buffer switching related data in the buffer unit. Hereinafter, a processing illustrated in FIG. 26 is described along step numbers.

[step S421] The buffer unit 313a acquires the switching related data (switching time designation data 57 or processing restart data 59) from the processing control unit 312 on the upstream side.

[step S422] The buffer unit 313a reads switching information 75 from the internal state. The switching information 75 to be read includes the information indicating whether switching of the processing system is being executed and the switching time.

[step S423] The buffer unit 313a determines whether the acquired switching related data is the switching time designation data 57. The buffer unit 313a advances the processing to step S424 in the case where the switching related data is the switching time designation data 57. Furthermore, the buffer unit 313a advances the processing to step S425 in the case where the switching related data is the processing restart data 59.

[step S424] The buffer unit 313a updates the switching information and saves the switching information in the internal state. In switching information 76 after the update, information indicating that switching is being executed is set in the information indicating whether switching is being executed (switching is being executed: true). Thereafter, the buffer unit 313a terminates the subprocess at the time of receiving data buffer switching related data.

[step S425] The buffer unit 313a updates the switching information and saves the switching information in the internal state. In switching information 77 after the update, information indicating that switching is not being executed is set in the information indicating whether switching is being executed (switching is being executed: false).

[step S426] The buffer unit 313a reads all the received data in the data buffer of the internal state.

[step S427] The buffer unit 313a transmits the received data read from the data buffer to the processing unit 313.

In this way, the buffer unit 313a holds the IoT data with the time stamp of or after the switching time in the data buffer until an instruction to restart the processing is given. Then, the processing for the buffered IoT data is started in response to the instruction to restart the processing.

The above is the details of the processing of the buffer unit 313a. Next, processing executed by the processing progress detection unit 316 will be described in detail with reference to FIGS. 27 and 28.

Figure 27:
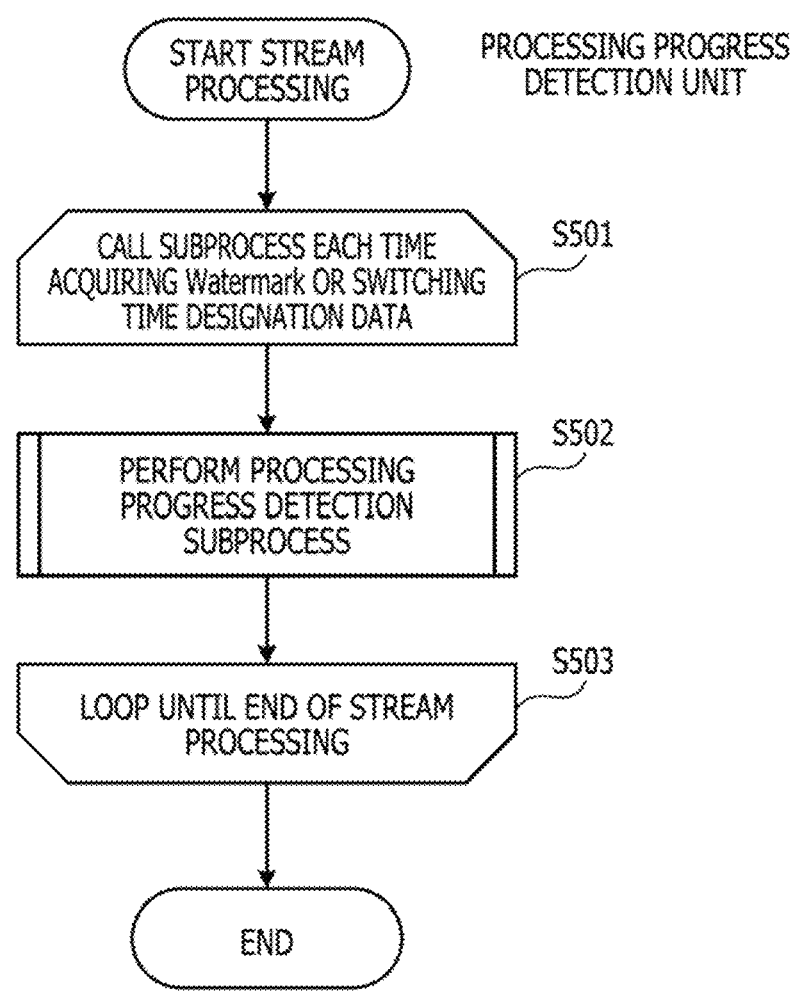
FIG. 27 is a flowchart illustrating an example of a procedure of stream data processing in a processing progress detection unit.

FIG. 27 is a flowchart illustrating an example of a procedure of stream data processing in the processing progress detection unit. Hereinafter, the processing illustrated in FIG. 27 is described along the step number.

[step S501] The processing progress detection unit 316 calls a processing progress detection subprocess of step S502 each time acquiring the watermark or the switching time designation data.

[step S502] The processing progress detection unit 316 executes the processing progress detection subprocess. Details of the processing of the subprocess will be described below (see FIG. 28).

[step S503] The processing progress detection unit 316 repeats the processing of step S502 each time acquiring the watermark or the switching time designation data until the end of the stream data processing.

Figure 28:
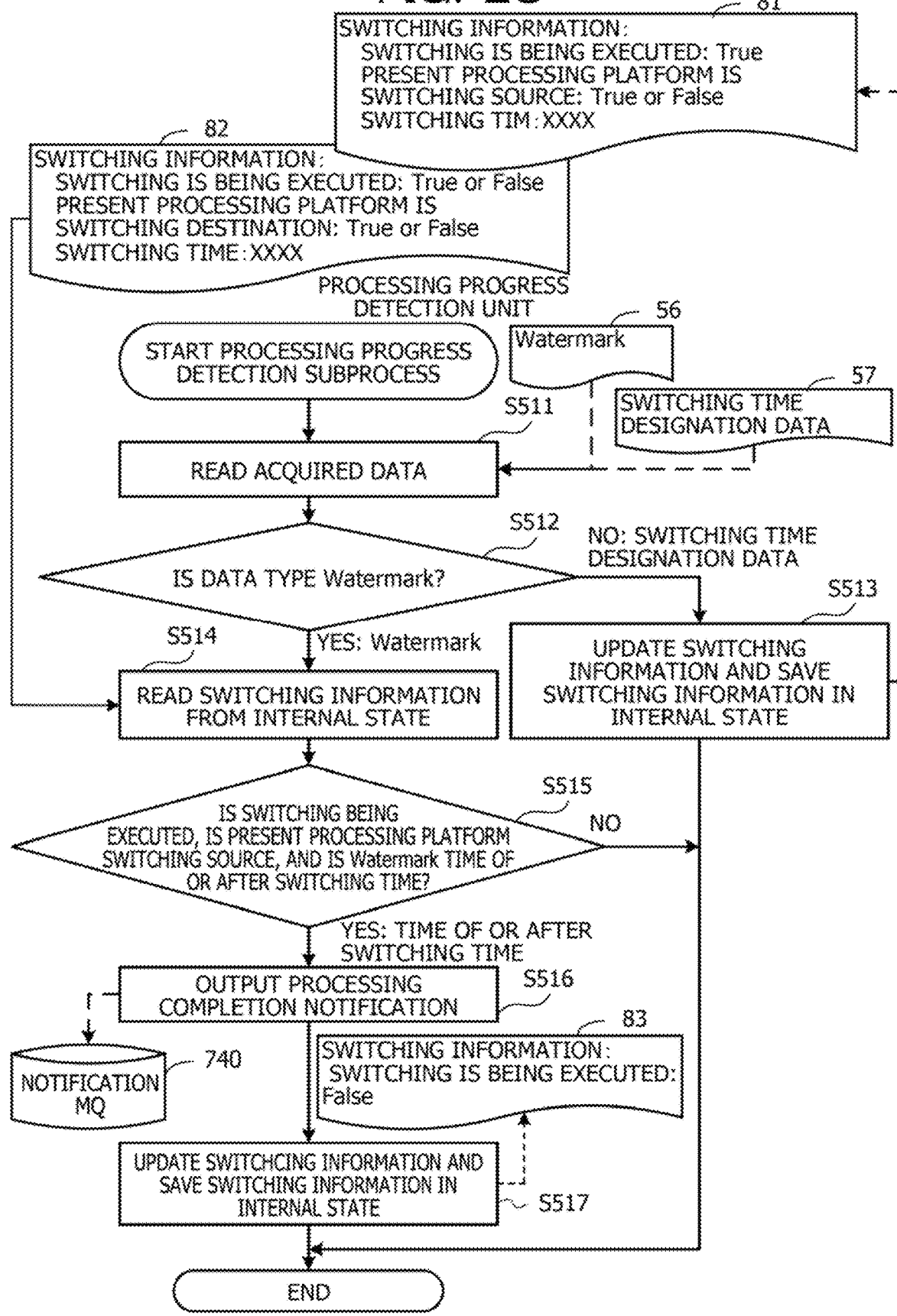
FIG. 28 is a flowchart illustrating an example of a processing procedure of a processing progress detection subprocess in the processing progress detection unit.

FIG. 28 is a flowchart illustrating an example of a processing procedure of a processing progress detection subprocess in the processing progress detection unit. Hereinafter, the processing illustrated in FIG. 28 is described along the step number.

[step S511] The processing progress detection unit 316 reads the acquired data (the watermark 56 or the switching time designation data 57).

[step S512] The processing progress detection unit 316 determines whether the data type is the watermark 56. The processing progress detection unit 316 advances the processing to step S514 in the case where the data type is the watermark 56. Furthermore, the processing progress detection unit 316 advances the processing to step S513 in the case where the data type is the switching time designation data 57.

[step S513] The processing progress detection unit 316 updates the switching information on the basis of the switching time designation data 57 and saves the switching information in the internal state. In switching information 81 after the update, the information indicating that switching is being executed, the information indicating whether the present processing platform is the switching source or the switching destination, and the switching time are set. Thereafter, the processing progress detection unit 316 terminates the processing progress detection subprocess.

[step S514] The processing progress detection unit 316 reads switching information 82 from the internal state.

[step S515] The processing progress detection unit 316 determines whether conditions that the switching is being executed, the present processing platform is the switching source, and the watermark is the time of or after the switching time are satisfied. The processing progress detection unit 316 advances the processing to step S516 in the case where the conditions are satisfied. Furthermore, the processing progress detection unit 316 terminates the processing progress detection subprocess in the case where the conditions are not satisfied.

[step S516] The processing progress detection unit 316 outputs the message indicating the processing completion notification to the notification MQ 740.

[step S517] The processing progress detection unit 316 updates the switching information and saves the switching information in the internal state. In switching information 83 after the update, information indicating that the switching is not being executed is set.

In this way, the processing progress detection unit 216 detects that the processing for the stream data with the time stamp up to the switching time has been completed by the arrival of the watermark of or after the switching time. Then, when the completion of the processing up to the switching time is detected, the processing completion notification is output.

The above is the details of the processing of the processing progress detection unit 316. Next, processing executed by the switching control unit 390 will be described in detail with reference to FIGS. 29 to 31.

Figure 29:
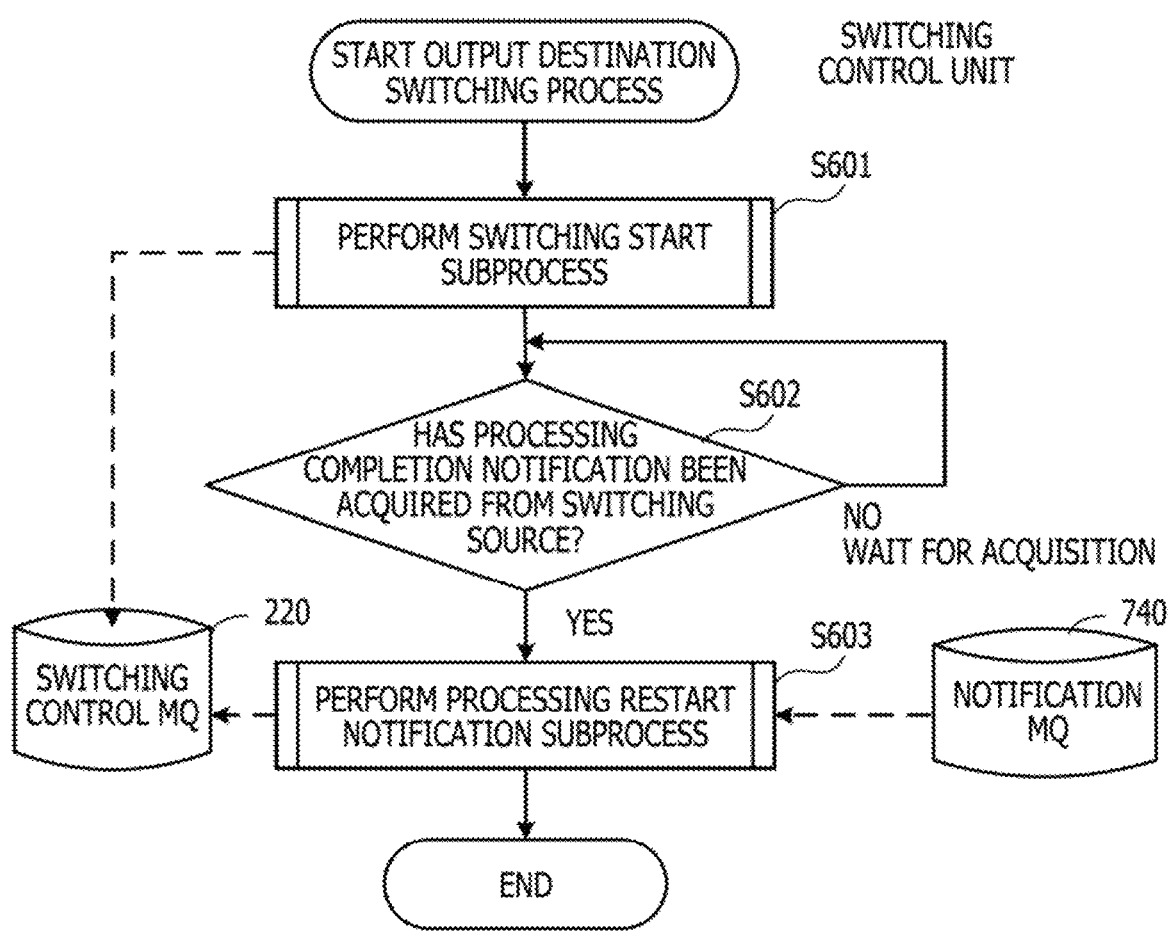
FIG. 29 is a flowchart illustrating an example of a procedure of an output destination switching process in a switching control unit.

FIG. 29 is a flowchart illustrating an example of a procedure of an output destination switching process in the switching control unit. Hereinafter, processing illustrated in FIG. 29 will be described in accordance with step numbers.

[step S601] The switching control unit 390 executes a switching start subprocess. Details of the subprocess will be described below (see FIG. 30).

[step S602] The switching control unit 390 determines whether the processing completion notification has been obtained from the switching source. For example, in the case where the message indicating the processing completion notification is stored in the notification MQ 740, the switching control unit 390 acquires the processing completion notification from the notification MQ 740. The switching control unit 390 advances the processing to the process in step S603 in the case of acquiring the processing completion notification. Furthermore, the switching control unit 390 repeats the processing of step S602 and waits for acquisition of the processing completion notification in the case of not acquiring the processing completion notification.

[step S603] The switching control unit 390 executes a processing restart notification subprocess. Details of the subprocess will be described below (see FIG. 31).

Figure 30:
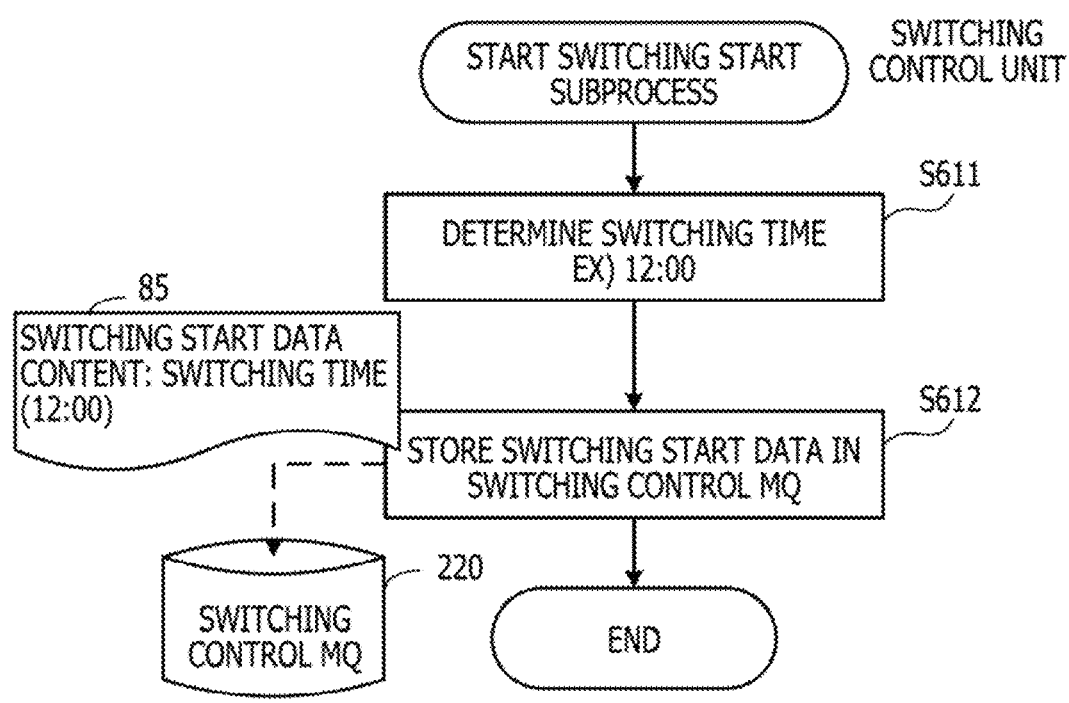
FIG. 30 is a flowchart illustrating an example of a processing procedure of a switching start subprocess in the switching control unit.

FIG. 30 is a flowchart illustrating an example of a processing procedure of the switching start subprocess in the switching control unit. Hereinafter, processing illustrated in FIG. 30 will be described in accordance with step numbers.

[step S611] The switching control unit 390 determines the switching time. For example, when receiving an input instructing switching of the processing system, the switching control unit 390 determines time after the time of reception by a predetermined time as the switching time.

[step S612] The switching control unit 390 stores a message including switching start data 85 in the switching control MQ 220.

Figure 31:
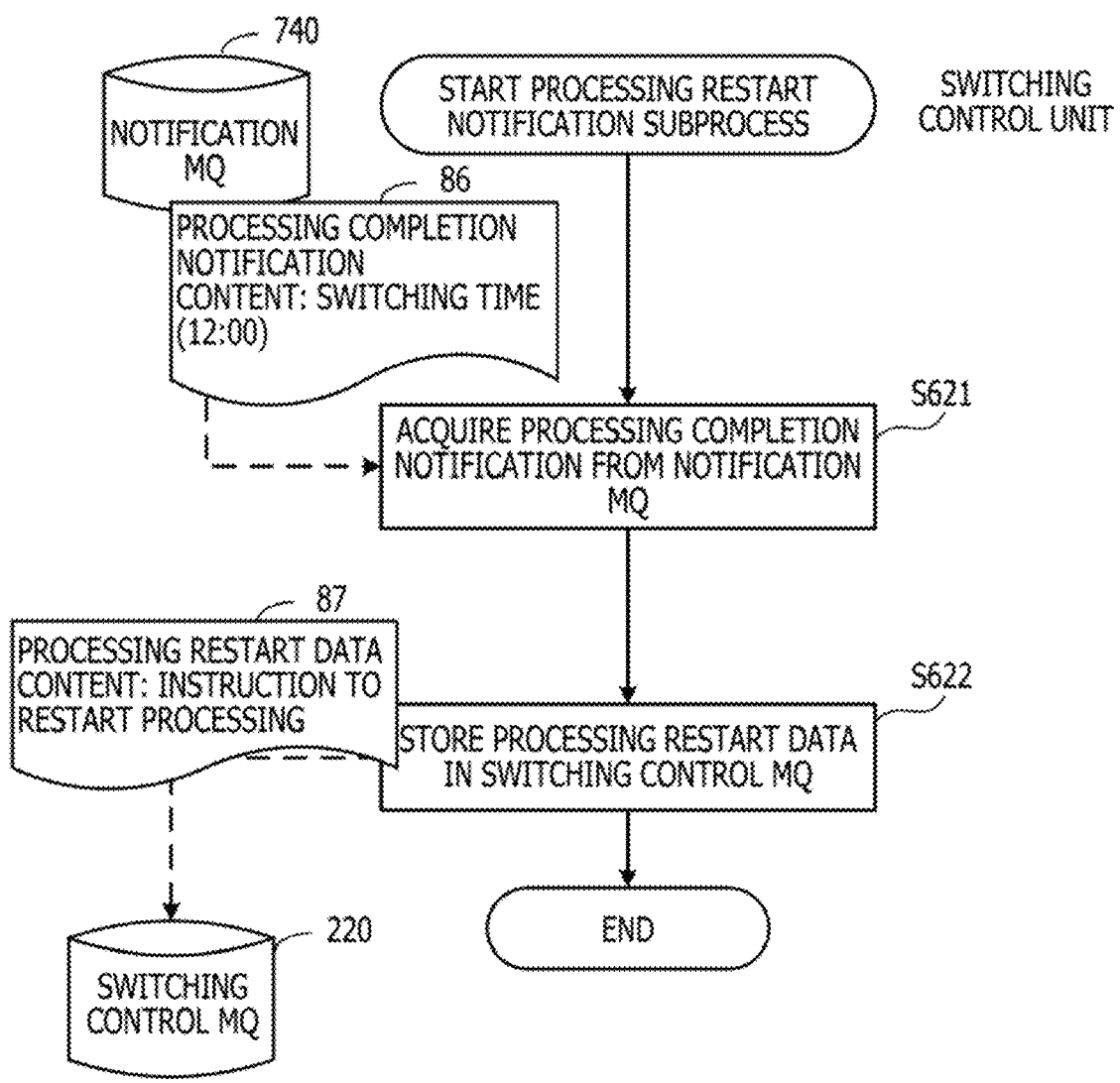
FIG. 31 is a flowchart illustrating an example of a processing procedure of a processing restart notification subprocess in the switching control unit.

FIG. 31 is a flowchart illustrating an example of a processing procedure of the processing restart notification subprocess in the switching control unit. Hereinafter, processing illustrated in FIG. 31 will be described in accordance with step numbers.

[step S621] The switching control unit 390 acquires a processing completion notification 86 from the notification MQ 740. The processing completion notification 86 includes the switching time designated in the switching of the processing system.

[step S622] The switching control unit 390 stores processing restart data 87 instructing restart of the processing in the switching control MQ 220.

In this way, the switching control unit 390 performs the start of switching for which the switching time is designated and the processing restart instruction to the stream processing execution platform of the switching destination in the case where the processing up to the switching time is completed. As a result, the stream processing execution platform of the switching source and the stream processing execution platform of the switching destination are appropriately linked, and the processing system is switched without causing duplication and omission of the processing results.

That is, according to the second embodiment, in the stream processing execution platform of the conversion destination, whether each IoT data is to be buffered in the buffer unit is controlled immediately before the processing unit according to whether the time stamp of the IoT data is before or after the switching time. For example, the processing control unit of the stream processing execution platform of the switching destination stops issuance of the watermark of or after the switching time until receiving the instruction to restart the processing so that each processing unit does not perform processing of or after the time of stop. That is, each processing unit is set to process the IoT data having the time stamp within a predetermined period up to the time indicated by the watermark, and when the issuance of the watermark of or after the switching time is stopped, the processing for the IoT data of or after the switching time in each processing unit is stopped. The processing unit buffers, in the buffer unit, the IoT data that is not able to be processed because the watermark does not arrive.

Furthermore, the processing progress detection unit of the switching source monitors the progress status of the watermark on the downmost stream side of the processing unit, and thereby detecting that all the processing units of the switching source have completed the processing up to the switching time. When the processing progress detection unit of the switching source detects the completion of the processing up to the switching time, the processing completion is notified to the stream processing execution platform of the switching destination via the switching control unit 390. In response to the notification, the processing control unit restarts issuance of the watermark of or after the switching time in the stream processing execution platform of the switching destination. Thereby, the processing of the switching destination is restarted.

In this way, the absence of data being processed having the time stamp of or before the switching time is checked in the middle of a route using the watermark comprehensively flowing in all the routes of all the processing units from the processing control unit of the switching destination.

Note that not all the processing units output the processing result data to the processing progress detection unit, and there is a possibility that a processing unit terminates the series of flows. Therefore, it is not sufficient to simply check the output data by the processing progress detection unit, and management using the watermark becomes useful.

Furthermore, the processing control unit can determine appropriate timing for issuing the watermark by statistically processing the time stamp of the message flowing through the processing control unit itself. For example, the processing control unit calculates the degree of variation (dispersion, standard deviation, or the like) of the acquisition time of the IoT data having the time stamp within a certain period on the basis of the past IoT data. Then, the processing control unit calculates a waiting time before arrival of the IoT data in the percentage (for example, 90% or more) that enables the data processing with a certain degree of accuracy or higher from the degree of variation. The processing control unit outputs the watermark of the time obtained by subtracting the waiting time calculated from the time indicated by the time stamp, for example.

By the above processing, it is guaranteed that the processing result of the IoT data before the switching time is output and the processing result of the IoT data of or after the switching time is not output from the stream processing execution platform of the switching source. Furthermore, it is guaranteed that the processing result of the IoT data before the switching time is not output and the processing result of the IoT data of or after the switching time is output from the stream processing execution platform of the switching destination. As a result, there is no omission or duplication in the output data, and the consistency of the processing results is maintained.

Note that the downtime of the stream data processing due to switching is a period from the output of the notification at the switching source to the start of the processing at the switching destination, which is minimized.

As illustrated in FIGS. 5 and 6, in the case where there is a plurality of stream processing execution platforms of the switching source, the switching control unit 390 outputs the processing restart data after checking the processing completion notifications from all the stream processing execution platforms of the switching source. Thereby, it is possible to appropriately switch the plurality of processing systems while maintaining the consistency of the processing results.

Furthermore, since the stream processing execution platform of the switching destination stores the IoT data of or after the switching time in the buffer without processing the IoT data until there is an instruction to restart the processing, it is guaranteed that the output order of the processing results is the time stamp order by the switching the processing system. Thereby, for example, even in the case where the processing is performed on the downstream side such as the information provision server 800 on the assumption that the output data is in time series, adverse effects on the downstream processing due to switching of the processing system can be suppressed.

For example, in the case where the output data time is not in order, the information provision server 800 that provides a downstream service may discard the output data even if the information provision server receives the output data with the time stamp before the acquired output data. Then, the output data at certain time will be omitted. As illustrated in the second embodiment, after checking that the data processing of or before the switching time has been completed in the stream processing execution platform of the switching source, the processing of or after the switching time is restarted in the stream processing execution platform of the switching destination, whereby the processing result can be output without losing the time series.

Furthermore, in the second embodiment, the progress status of the processing using the watermark is managed. The processing control unit 312 that outputs the watermark is at the beginning of the data flow of the processing system. Therefore, the progress status of an event at the transmission source of the IoT data can be statistically and accurately grasped using the time stamp included in the IoT data periodically transmitted from a device. Then, by monitoring the watermark comprehensively flowing inside the processing execution unit 319 by the processing progress detection unit 316 located at the downmost stream of the stream processing, it can be checked that the watermark has flown though all the processing units even in the case where the data of or before the switching time is executed in a distributed manner. That is, it is possible to accurately determine that the processing for the IoT data at the time before the switching time has been completed.

Third Embodiment

Next, a third embodiment will be described. The third embodiment introduces a safety margin up to a switching time. Hereinafter, differences of the third embodiment from the second embodiment will be described.

When switching a processing system according to the procedure illustrated in the second embodiment, it is desirable to complete switching time designation (the processing illustrated in FIG. 8) before processing in each processing unit in stream data proceeds to the switching time. That is, there is a possibility that switching of a data output destination according to a time stamp is not properly performed if the current time reaches the switching time before the switching time is notified from a processing control unit to a buffer unit and a processing progress detection unit in a processing unit and an output destination switching unit in a data output unit at the time of designating the switching time. If switching is not properly performed, unnecessary downtime may occur.

To suppress occurrence of the above inconvenience, each stream processing execution platform checks that there is a sufficient margin (grace time) to the switching time at the time of designating the switching time in the processing control unit. The processing control unit fails in destination of the switching time and cancels an output destination switching process itself in the case where the margin is insufficient.

Figure 32:
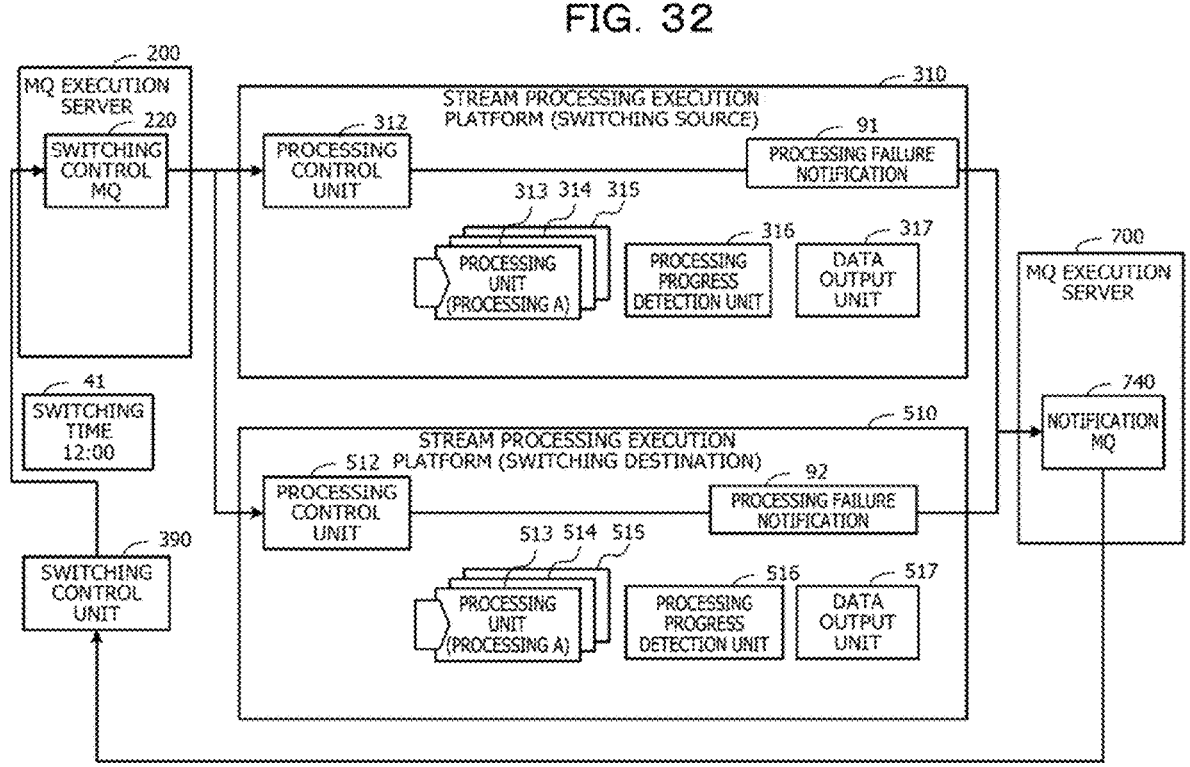
FIG. 32 is a diagram illustrating an example of safety margin checking processing for designating switching time.

FIG. 32 is a diagram illustrating an example of safety margin checking processing for designating switching time. For example, a switching control unit 390 transmits a control message 41 in which the switching time is designated. In the example of FIG. 32, the designated switching time is "12:00".

Each of processing control units 312 and 512 of each of stream processing execution platforms 310 and 510 acquire the control message 41 for designating the switching time via a switching control MQ 220. The processing control unit 312 determines whether a margin from current time to the switching time (a value obtained by subtracting the current time from the switching time) is equal to or larger than a predetermined value. In a case of determining that the margin is equal to or larger than the predetermined value, the processing control unit 312 transmits a switching time designation instruction to an output destination switching unit 317a (see FIG. 7) in a data output unit 317, buffer units 313a, 314a, and 315a, and a processing progress detection unit 316.

In a case where the margin is less than the predetermined value, the processing control unit 312 outputs a control message 91 of time designation failure notification to a notification MQ 740. Similarly, in a case where the margin is less than the predetermined value, the processing control unit 512 outputs a control message 92 of time designation failure notification to the notification MQ 740.

The control message 92 of the time specification failure notification is sent to the switching control unit 390 via the notification MQ 740. By receiving the time designation failure notification, the switching control unit 390 recognizes that the switching of a processing system has failed, and notifies, for example, a user who has instructed the switching of the switching failure.

Note that, in a case where there is a possibility that the switching time designation fails as illustrated in FIG. 32, there is a possibility that only one of a switching destination and a switching source fails in switching time designation. In the case where only one of them fails and the processing proceeds to the switching time without stop, there is a possibility that inconsistency occurs in a processing result of stream data.

Therefore, in the case where the switching time designation fails for either one of the switching source or the switching destination, for example, the switching control unit 390 cancels an entire output destination switching process in order to suppress occurrence of inconsistency in the processing result of stream data.

Figure 33:
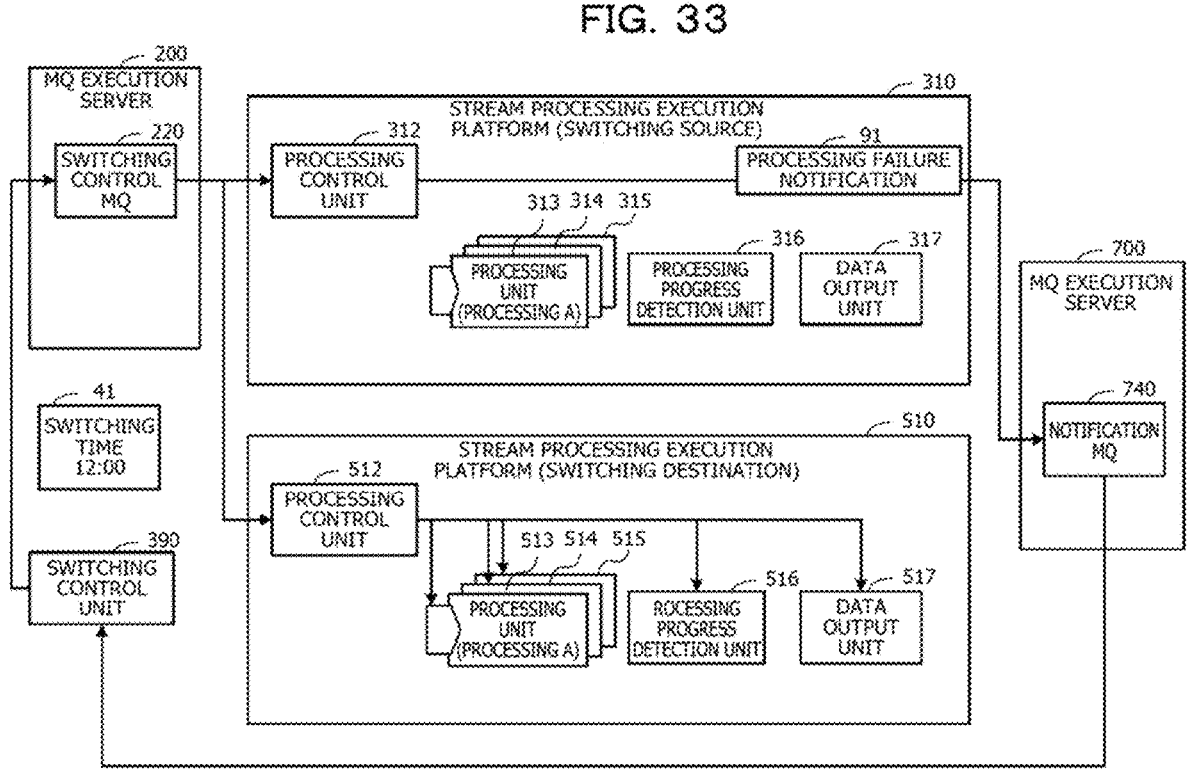
FIG. 33 is a diagram illustrating an example in which switching time designation fails in some stream processing execution platforms.

FIG. 33 is a diagram illustrating an example in which switching time designation fails in some stream processing execution platforms. In the example of FIG. 33, the switching time designation has failed in the stream processing execution platform 310, but the switching time designation has succeeded in the stream processing execution platform 510. In this case, the control message 91 indicating the processing failure notification is output only from the processing control unit 312 of the stream processing execution platform 310.

The switching control unit 390 that has received the control message 91 of the processing failure notification instructs all the stream processing execution platforms 310 and 510 to cancel the switching of the processing system, for example.

Figure 34:
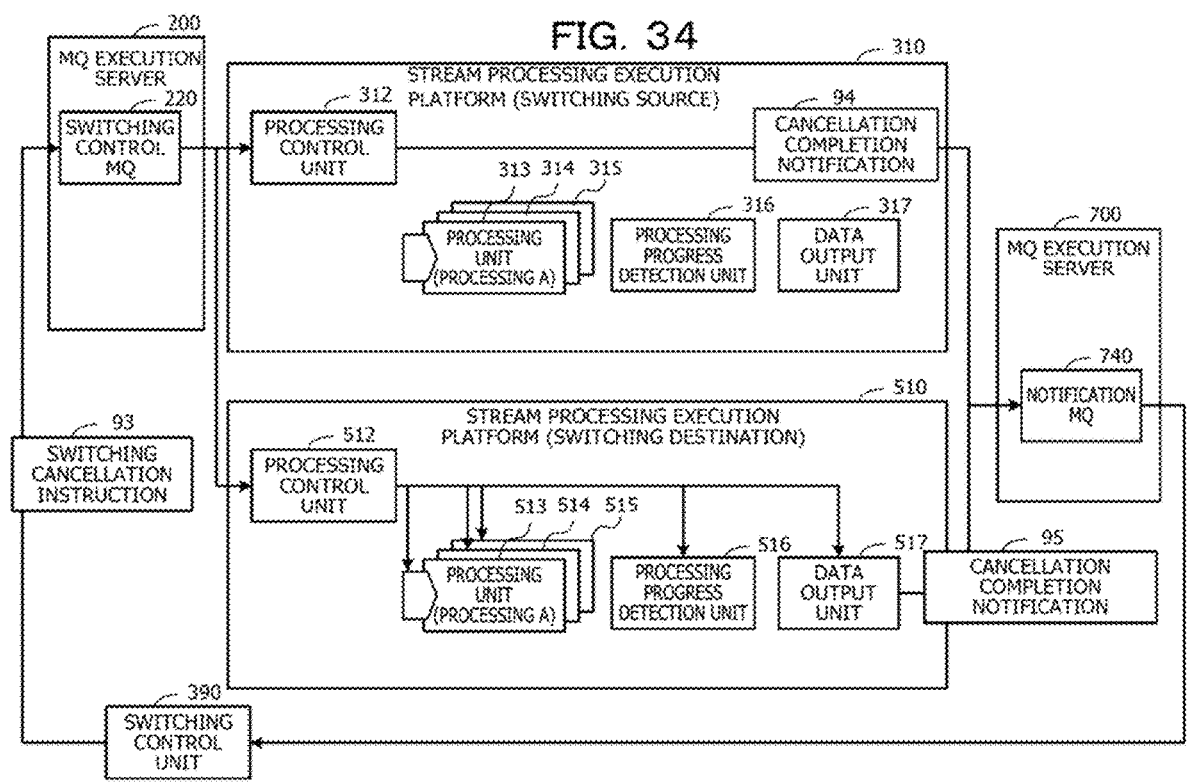
FIG. 34 is a diagram illustrating an example of a switching cancellation instruction at the time of switching time designation failure.

FIG. 34 is a diagram illustrating an example of a switching cancellation instruction at the time of switching time designation failure. The switching control unit 390 that has received a switching time designation failure notification outputs a control message 93 indicating a switching cancellation instruction to the switching control MQ 220.

When receiving the switching cancellation instruction, the processing control unit 512 of the stream processing execution platform 510 that has succeeded in the switching time designation transmits the switching cancellation instruction to an output destination switching unit in a data output unit 517, buffer units in processing units 513 to 515, and a processing progress detection unit 516. The output destination switching unit, the buffer units, and the processing progress detection unit 516 that have received the switching cancellation instruction delete information such as the switching time from internal states because of succeeding in the switching time designation. The data output unit 517 checks completion of deletion of the information such as the switching time, and stores a control message 95 of a cancellation completion notification in the notification MQ 740.

The stream processing execution platform 310 that has failed in the switching time designation does not have information such as the switching time. Therefore, when receiving the switching cancellation instruction, the processing control unit 312 of the stream processing execution platform 310 stores a control message 94 of the cancellation completion notification in the notification MQ 740.

The switching control unit 390 acquires the control messages 94 and 95 of the cancellation completion notification via the notification MQ 740. Then, the switching control unit 390 recognizes that the switching of the processing system has been correctly canceled by the control messages 94 and 95.

Hereinafter, processing in the third embodiment, which is different from that of the second embodiment, be described in detail.

First, the processing of the processing control unit 312 in the third embodiment will be described in detail. In the processing control unit 312 in the third embodiment, processing of a subprocess at the time of receiving switching related data as illustrated in FIG. 20, among the processing of the processing control unit 312 illustrated in FIGS. 17 to 20, is different from the second implementation.

Figure 35:
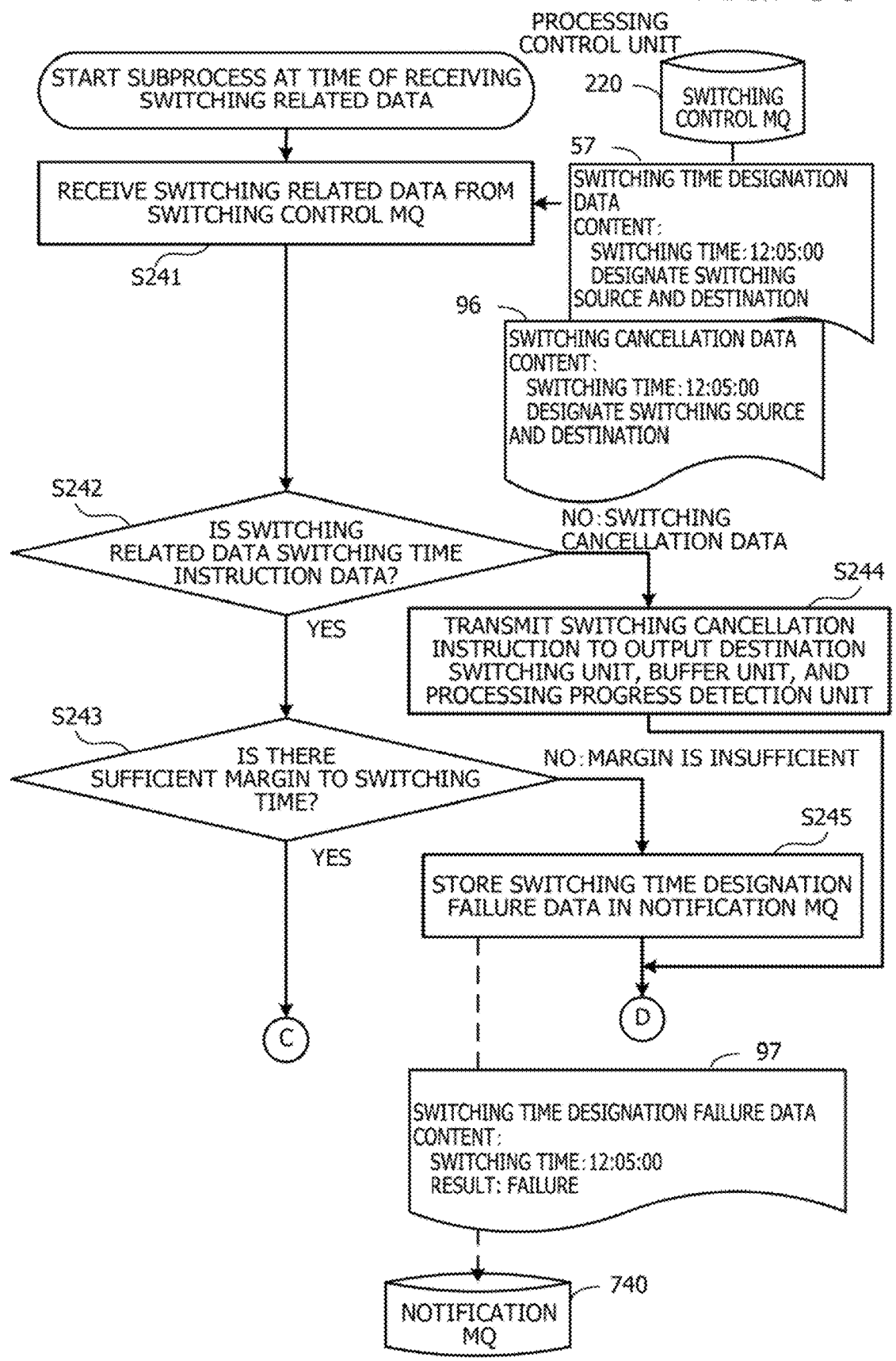
FIG. 35 is the first half of a flowchart illustrating an example of a processing procedure of a subprocess at the time of receiving switching related data in the processing control unit capable of canceling switching.

FIG. 35 is a first half of a flowchart illustrating an example of a processing procedure of a subprocess at the time of receiving switching related data in the processing control unit capable of canceling switching. Hereinafter, processing illustrated in FIG. 35 will be described in accordance with step numbers.

[step S241] The processing control unit 312 receives switching related data from the switching control MQ 220. The switching related data is switching time designation data 57 or switching cancellation data 96. The switching cancellation data 96 includes the switching time and the switching cancellation instruction.

[step S242] The processing control unit 312 determines whether the received switching related data is the switching time designation data 57. The processing control unit 312 advances the processing to step S243 in the case where the switching related data is the switching time designation data 57. Furthermore, the processing control unit 312 advances the processing to step S244 in the case where the switching related data is the switching cancellation data 96.

[step S243] The processing control unit 312 determines whether there is a sufficient margin to the switching time. For example, the processing control unit 312 determines that there is a sufficient margin when a value obtained by subtracting the current time from the switching time is equal to or larger than a predetermined value. The processing control unit 312 advances the processing to step S251 (see FIG. 36) in the case where there is a sufficient margin. Furthermore, the processing control unit 312 advances the processing to step S245 in the case where the margin is insufficient.

[step S244] The processing control unit 312 transmits the switching cancellation instruction to the output destination switching unit 317a, the buffer units 313a, 314a, and 315a, and the processing progress detection unit 316. Thereafter, the processing control unit 312 terminates the subprocess at the time of receiving switching related data.

[step S245] The processing control unit 312 stores switching time designation failure data 97 in the notification MQ 740. The switching time designation failure data 97 includes, for example, the switching time and information indicating that the switching time designation has failed. Thereafter, the processing control unit 312 terminates the subprocess at the time of receiving switching related data.

Figure 36:
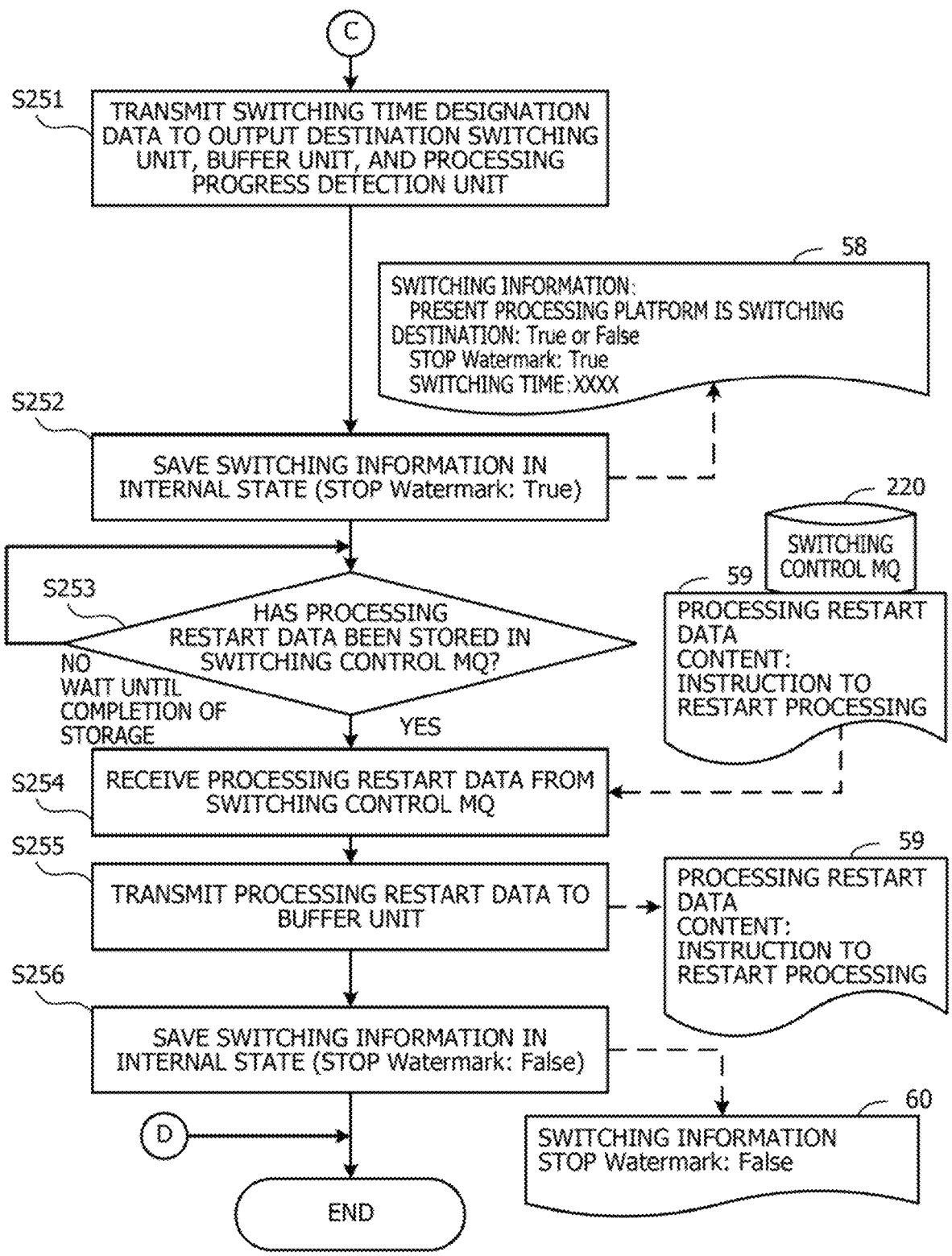
FIG. 36 is the latter half of the flowchart illustrating an example of a processing procedure of a subprocess at the time of receiving switching related data in the processing control unit capable of canceling switching.

FIG. 36 is a latter half of the flowchart illustrating an example of a processing procedure of a subprocess at the time of receiving switching related data in the processing control unit capable of canceling switching. Each of processing of steps S251 to S256 illustrated in FIG. 36 is similar to the processing of steps S232 to S237 in the second embodiment respectively illustrated in FIG. 20.

Next, the processing of the data output unit 317 in the third embodiment will be described in detail.

Figure 37:
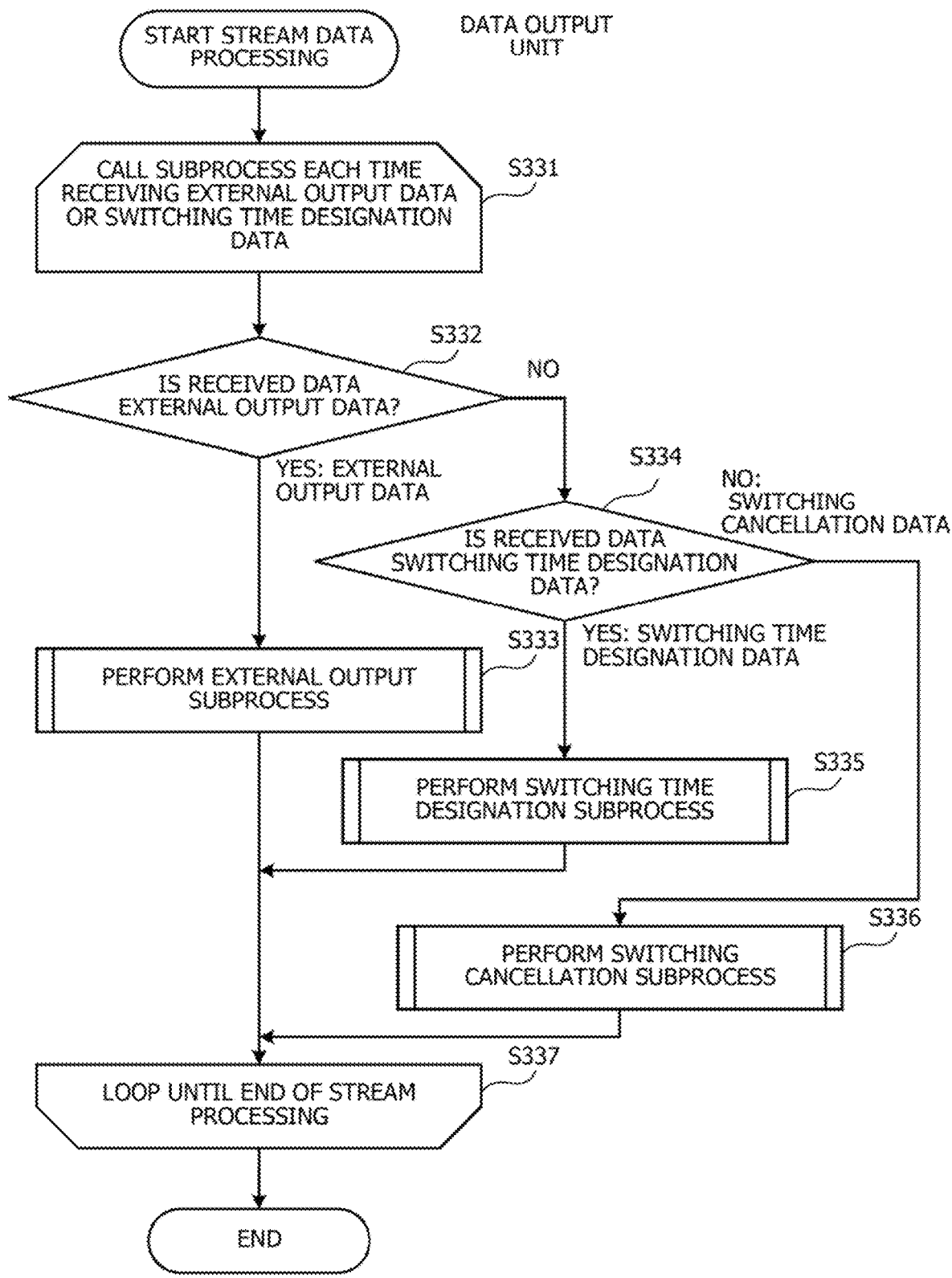
FIG. 37 is a flowchart illustrating an example of a procedure of stream data processing in a data output unit capable of canceling switching.

FIG. 37 is a flowchart illustrating an example of a procedure of stream data processing in the data output unit capable of canceling switching. Hereinafter, processing illustrated in FIG. 37 will be described in accordance with step numbers.

[step S331] The data output unit 317 calls a subprocess by the processing of steps S332 to S336 each time receiving external output data or switching time designation data.

[step S332] The data output unit 317 determines whether the received data is the external output data. When the received data is the external output data, the data output unit 317 advances the processing to step S333. Furthermore, when the received data is not the external output data, the data output unit 317 advances the processing to step S334.

[step S333] The data output unit 317 executes an external output subprocess. Details of the external output subprocess are as illustrated in FIG. 22. Thereafter, the data output unit 317 advances the processing to step S337.

[step S334] The data output unit 317 determines whether the received data is the switching time designation data. When the received data is the switching time designation data, the data output unit 317 advances the processing to step S335. Furthermore, when the received data is the switching cancellation data, the data output unit 317 advances the processing to step S336.

[step S335] The data output unit 317 executes a switching time designation subprocess. Details of the switching time designation subprocess are as illustrated in FIG. 23. Thereafter, the data output unit 317 advances the processing to step S337.

[step S336] The data output unit 317 executes a switching cancellation subprocess. Details of the switch cancellation subprocess will be described below (see FIG. 38).

[step S337] The data output unit 317 repeats the processing of steps S332 to S236 for each reception of the external output data or the switching time designation data until the end of the stream data processing.

Figure 38:
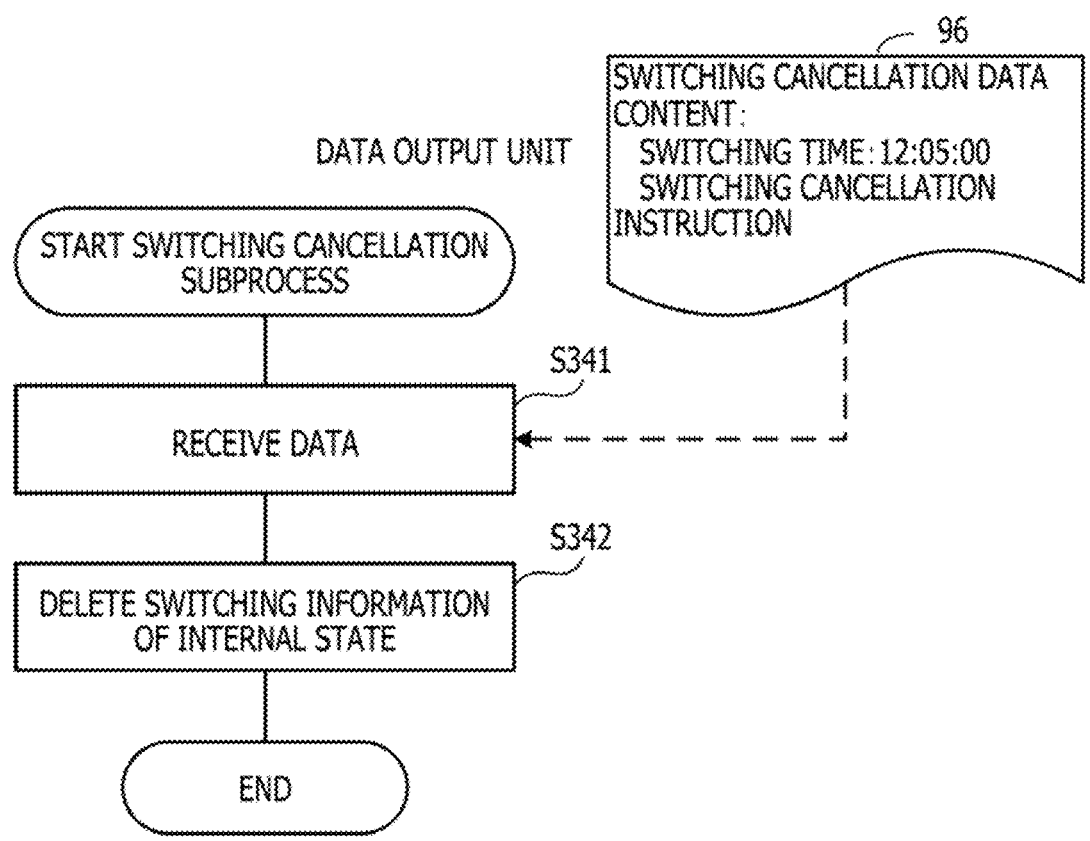
FIG. 38 is a flowchart illustrating an example of a processing procedure of a switching cancellation subprocess in the data output unit.

FIG. 38 is a flowchart illustrating an example of a processing procedure of a switching cancellation subprocess in the data output unit. Hereinafter, processing illustrated in FIG. 38 will be described in accordance with step numbers.

[step S341] The output destination switching unit 317a in the data output unit 317 receives the switching cancellation data 96.

[step S342] The output destination switching unit 317a deletes switching information 73 (see FIG. 23) in the internal state.

In this way, the data output unit 317 cancels the instruction to switch the processing system.

Next, the processing of the buffer unit 313a in the third embodiment will be described in detail. In the buffer unit 313a of the third embodiment, processing of a subprocess at the time of receiving data buffer switching related data illustrated in FIG. 26, among the processing of the buffer unit 313a illustrated in FIGS. 24 to 26, is different from the processing of the second embodiment.

Figure 39:
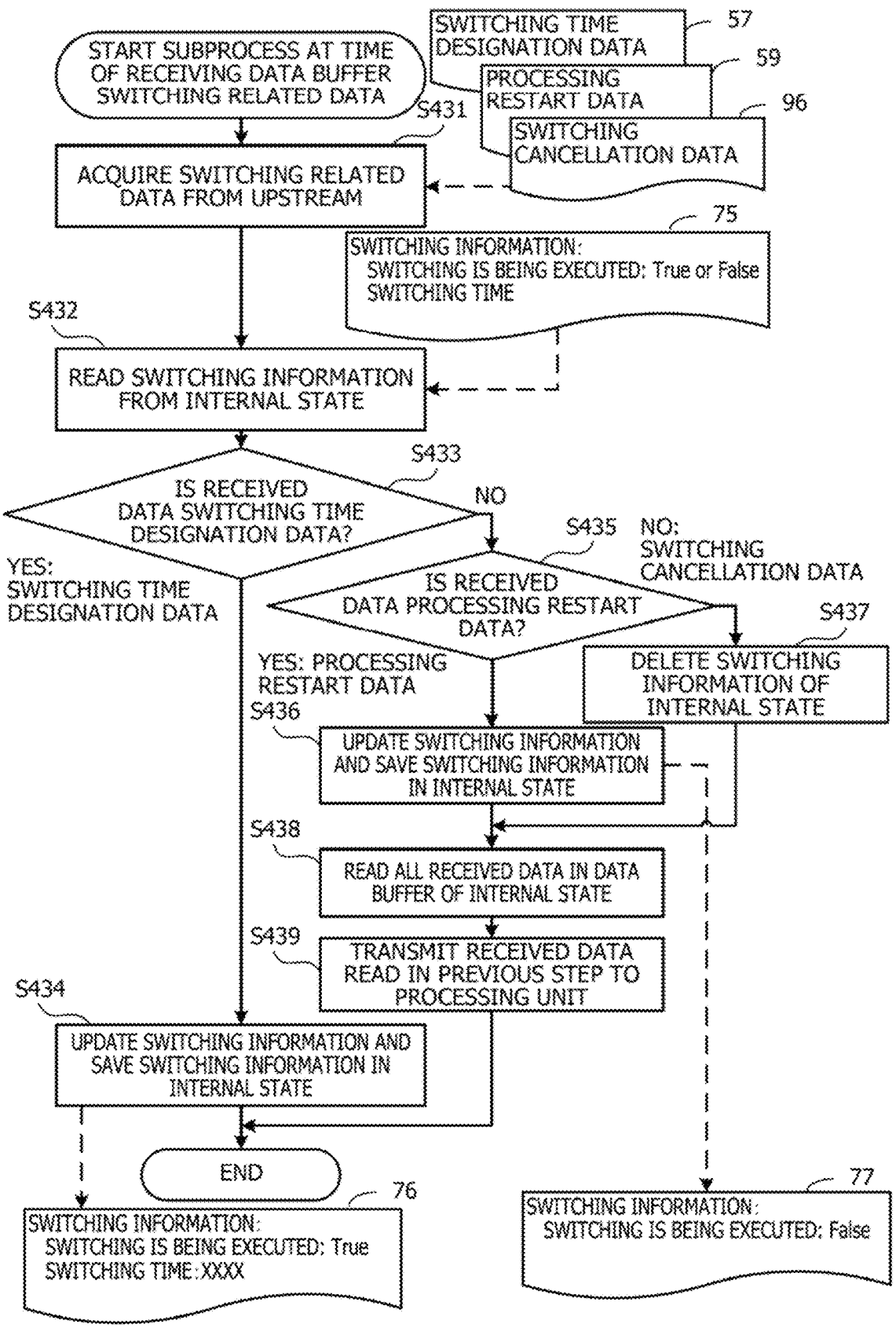
FIG. 39 is a flowchart illustrating an example of a processing procedure of a subprocess at the time of receiving data buffer switching related data in the buffer unit capable of canceling switching.

FIG. 39 is a flowchart illustrating an example of a processing procedure of a subprocess at the time of receiving data buffer switching related data in the buffer unit capable of canceling switching. Hereinafter, processing illustrated in FIG. 39 will be described in accordance with step numbers.

[step S431] The buffer unit 313a acquires the switching related data (switching time designation data 57, processing restart data 59, or switching cancellation data 96) from the processing control unit 312 on an upstream side.

[step S432] The buffer unit 313a reads the switching information 75 from the internal state.

[step S433] The buffer unit 313a determines whether the acquired switching related data is the switching time designation data 57. The buffer unit 313a advances the processing to step S434 in the case where the switching related data is the switching time designation data 57. Furthermore, the buffer unit 313a advances the processing to step S435 in the case where the switching related data is not the switching time designation data 57.

[step S434] The buffer unit 313a updates the switching information and saves the switching information in the internal state. In switching information 76 after the update, information indicating that switching is being executed is set in the information indicating whether switching is being executed (switching is being executed: true). Thereafter, the buffer unit 313a terminates the subprocess at the time of receiving data buffer switching related data.

[step S435] The buffer unit 313a determines whether the acquired switching related data is the processing restart data 59. The buffer unit 313a advances the processing to step S436 in the case where the switching related data is the processing restart data 59. Furthermore, the buffer unit 313a advances the processing to step S437 in the case where the switching related data is the switching cancellation data 96.

[step S436] The buffer unit 313a updates the switching information and saves the switching information in the internal state. In switching information 77 after the update, information indicating that switching is not being executed is set in the information indicating whether switching is being executed (switching is being executed: false). Thereafter, the buffer unit 313a advances the processing to step S438.

[step S437] The buffer unit 313a deletes the switching information in the internal state.

[step S438] The buffer unit 313a reads all the received data in the data buffer of the internal state.

[step S439] The buffer unit 313a transmits the received data read from the data buffer to the processing unit 313.

In this way, the instruction to switch the processing system is canceled in the buffer unit 313a.

Next, the processing of the processing progress detection unit 316 in the third embodiment will be described in detail. In the processing progress detection unit 316 in the third embodiment, processing of a processing progress detection subprocess illustrated in FIG. 28, among the processing of the processing progress detection unit 316 illustrated in FIGS. 27 and 28, is different from the processing of the second embodiment.

Figure 40:
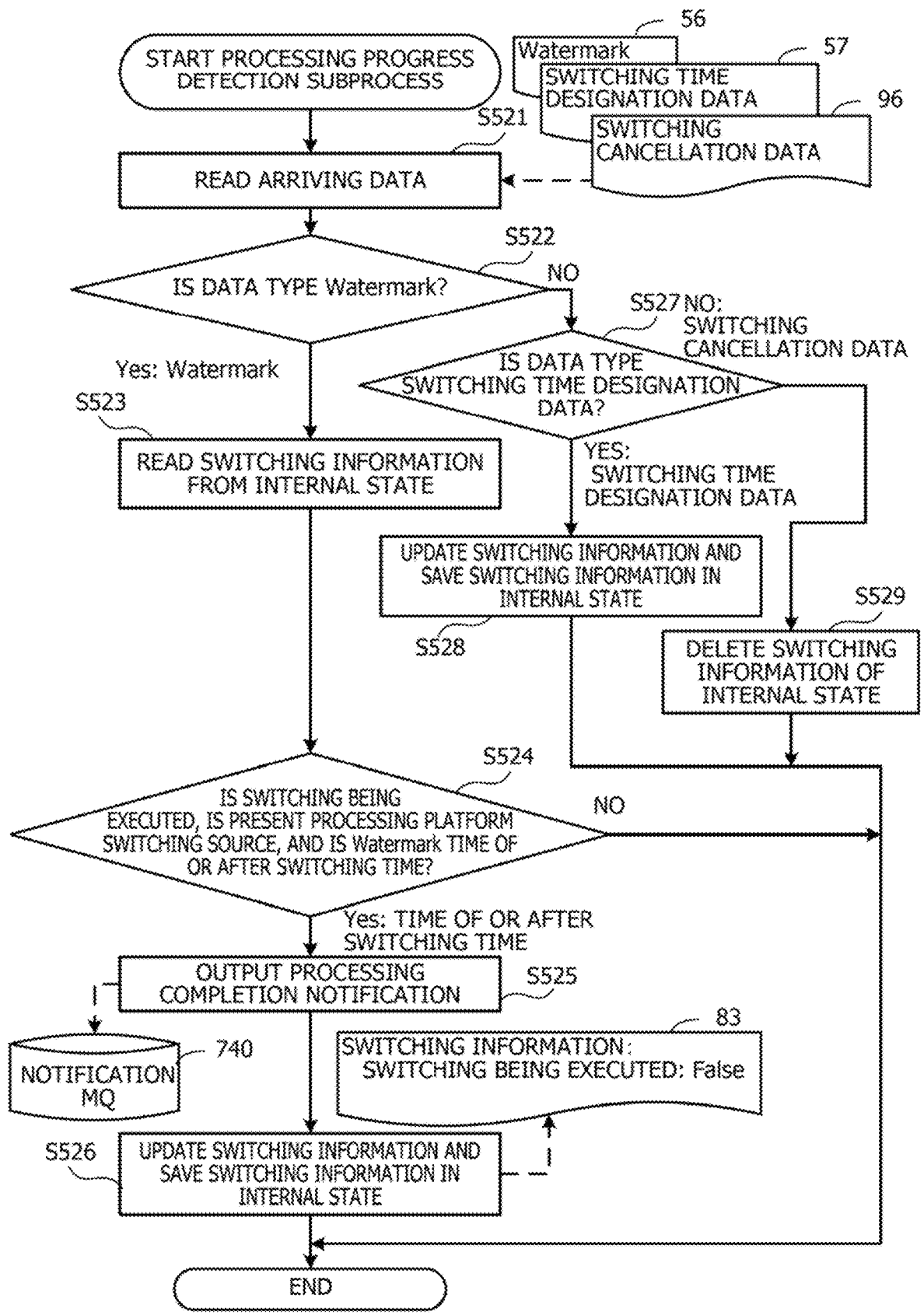
FIG. 40 is a flowchart illustrating an example of a processing procedure of a processing progress detection subprocess in the processing progress detection unit capable of canceling switching.

FIG. 40 is a flowchart illustrating an example of a processing procedure of the processing progress detection subprocess in the processing progress detection unit capable of canceling switching. Hereinafter, processing illustrated in FIG. 40 will be described in accordance with step numbers.

[step S521] The processing progress detection unit 316 reads the acquired data (watermark 56, switching time designation data 57, or switching cancellation data 96).

[step S522] The processing progress detection unit 316 determines whether the data type is the watermark 56. The processing progress detection unit 316 advances the processing to step S523 in the case where the data type is the watermark 56. Furthermore, the processing progress detection unit 316 advances the processing to step S527 in the case where the data type is not the watermark 56.

[step S523] The processing progress detection unit 316 reads the switching information 82 (see FIG. 28) from the internal state.

[step S524] The processing progress detection unit 316 determines whether conditions that the switching is being executed, the present processing platform is the switching source, and the watermark 56 is the time of or after the switching time are satisfied. The processing progress detection unit 316 advances the processing to step S525 in the case where the conditions are satisfied. Furthermore, the processing progress detection unit 316 terminates the processing progress detection subprocess in the case where the conditions are not satisfied.

[step S525] The processing progress detection unit 316 outputs the message indicating the processing completion notification to the notification MQ 740.

[step S526] The processing progress detection unit 316 updates the switching information and saves the switching information in the internal state. In switching information 83 after the update, information indicating that the switching is not being executed is set.

[step S527] The processing progress detection unit 316 determines whether the data type is the switching time designation data 57. The processing progress detection unit 316 advances the processing to step S528 in the case where the data type is the switching time designation data 57. Furthermore, the processing progress detection unit 316 advances the processing to step S529 in the case where the switching related data is the switching cancellation data 96.

[step S528] The processing progress detection unit 316 updates the switching information on the basis of the switching time designation data 57 and saves the switching information in the internal state. In switching information 81 after the update (see FIG. 28), the information indicating that switching is being executed, the information indicating whether the present processing platform is the switching source or the switching destination, and the switching time are set. Thereafter, the processing progress detection unit 316 terminates the processing progress detection subprocess.

[step S529] The processing progress detection unit 316 deletes the switching information of the internal state.

In this way, the processing progress detection unit 316 cancels the instruction to switch the processing system.

Next, the processing of the switching control unit 390 in the third embodiment will be described in detail.

Figure 41:
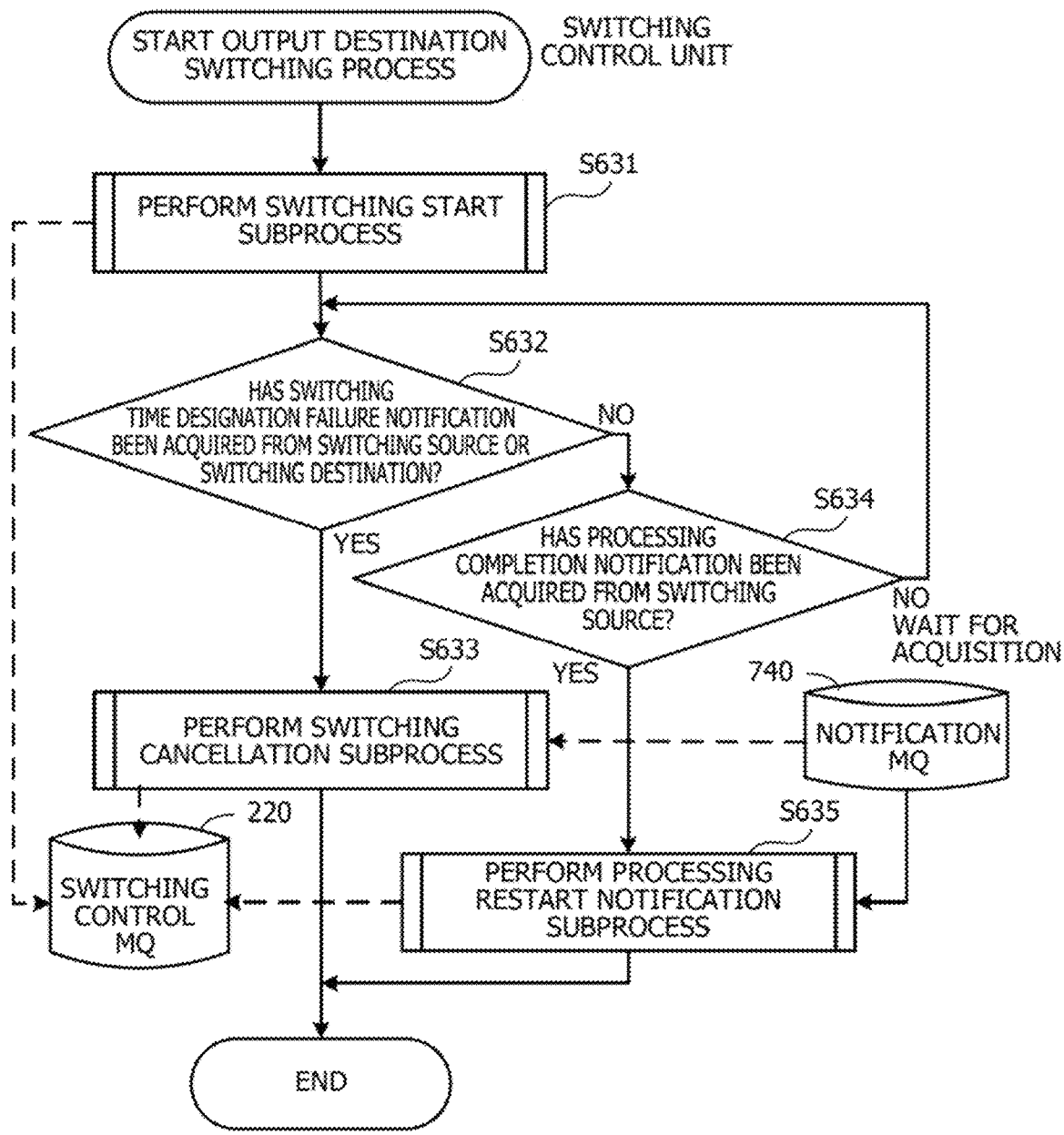
FIG. 41 is a flowchart illustrating an example of a processing procedure of an output destination switching process in a switching control unit capable of canceling switching.

FIG. 41 is a flowchart illustrating an example of a processing procedure of an output destination switching process in the switching control unit capable of canceling switching. Hereinafter, processing illustrated in FIG. 41 will be described in accordance with step numbers.

[step S631] The switching control unit 390 executes a switching start subprocess. Details of the subprocess are as illustrated in FIG. 30.

[step S632] The switching control unit 390 determines whether the switching time designation failure notification has been acquired from the switching source or switching destination. For example, in the case where the control message indicating the switching time designation failure is stored in the notification MQ 740, the switching control unit 390 acquires the switching time designation failure notification from the notification MQ 740. When acquiring the switching time designation failure notification, the switching control unit 390 advances the processing to step S633. Furthermore, when not acquiring the switching time designation failure notification, the switching control unit 390 advances the processing to step S634.

[step S633] The switching control unit 390 executes a switching cancellation subprocess. Details of the subprocess will be described below (see FIG. 42). The switching control unit 390 terminates the output destination switching process after executing the switching cancellation subprocess.

[step S634] The switching control unit 390 determines whether the processing completion notification has been obtained from the switching source. The switching control unit 390 advances the processing to the process in step S635 in the case of acquiring the processing completion notification. Furthermore, the switching control unit 390 advances the processing to step S632 in the case of not acquiring the processing completion notification, and waits for arrival of the switching time designation failure notification or the processing completion notification.

[step S635] The switching control unit 390 executes a processing restart notification subprocess. Details of the processing restart notification subprocess are as illustrated in FIG. 31.

Figure 42:
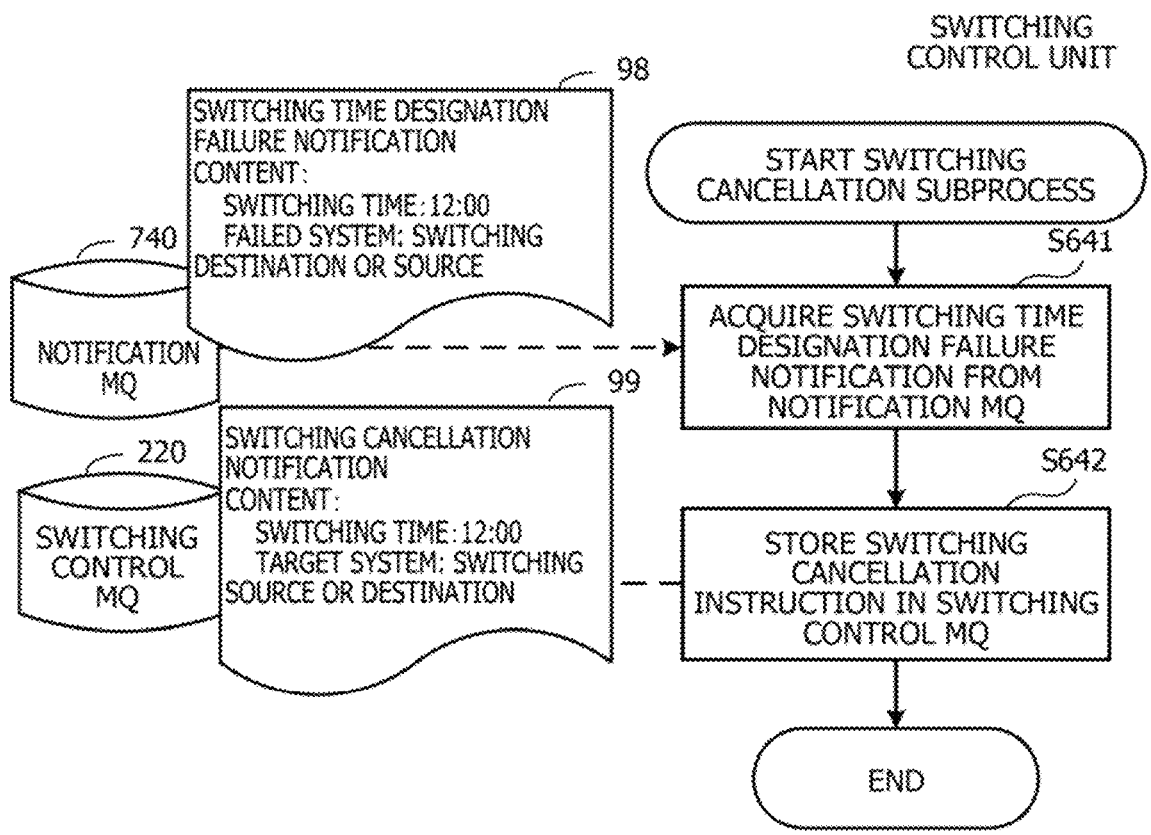
FIG. 42 is a flowchart illustrating an example of a processing procedure of a switching cancellation subprocess.

FIG. 42 is a flowchart illustrating an example of a processing procedure of a switching cancellation subprocess. Hereinafter, processing illustrated in FIG. 42 will be described in accordance with step numbers.

[step S641] The switching control unit 390 acquires a switching time designation failure notification 98 from the notification MQ 740. The switching time designation failure notification 98 includes the switching time and information indicating whether the processing system that has failed in the switching time designation is the switching destination or the switching source.

[step S642] The switching control unit 390 stores a switching cancellation instruction 99 in the switching control MQ 220. The switching cancellation instruction 99 includes the switching time and information indicating whether the processing system for which switching is canceled is the switching destination or the switching source.

In this way, in the case where designation of the switching time fails, inconsistency of the processing between the processing systems can be suppressed by canceling the entire switching of the processing system.

Fourth Embodiment

Next, a fourth embodiment will be described. In the fourth embodiment, a processing system is switched in consideration of occurrence of a failure.

In a case where a failure occurs in stream data processing, the failure can be recovered by reloading a message already processed before the failure from a data MQ 210 and reprocessing the message. However, there is a possibility that a result of margin determination changes before and after the failure recovery in a case of designating switching time including margin determination as described in the third embodiment.

For example, even if the switching time is successfully designated before the failure, designation of the switching time may fail after the failure and the switching may be canceled. In particular, if a failure occurs after a procedure proceeds up to restart of processing at a switching destination, and the switching time is designated again and margin determination fails, an output message becomes inconsistent. That is, if a failure occurs at the switching destination under a situation that a switching source performs output to a debug MQ as switching has been performed, and margin determination after recovery fails, the processing system of the switching destination also outputs a processing result to the debug MQ. In this case, a state in which none of processing systems performs output to an operation MQ 710 occurs.

To avoid the above inconsistency, in the fourth embodiment, a processing state of a stream processing execution platform of the switching destination is first saved as a snapshot at the time of completion of the switching time designation. After checking that the snapshot has been saved at the switching destination, a switching control unit 390 advances the processing to the next procedure of switching the processing system. Note that snapshots are sometimes called checkpoints.

Figure 43:
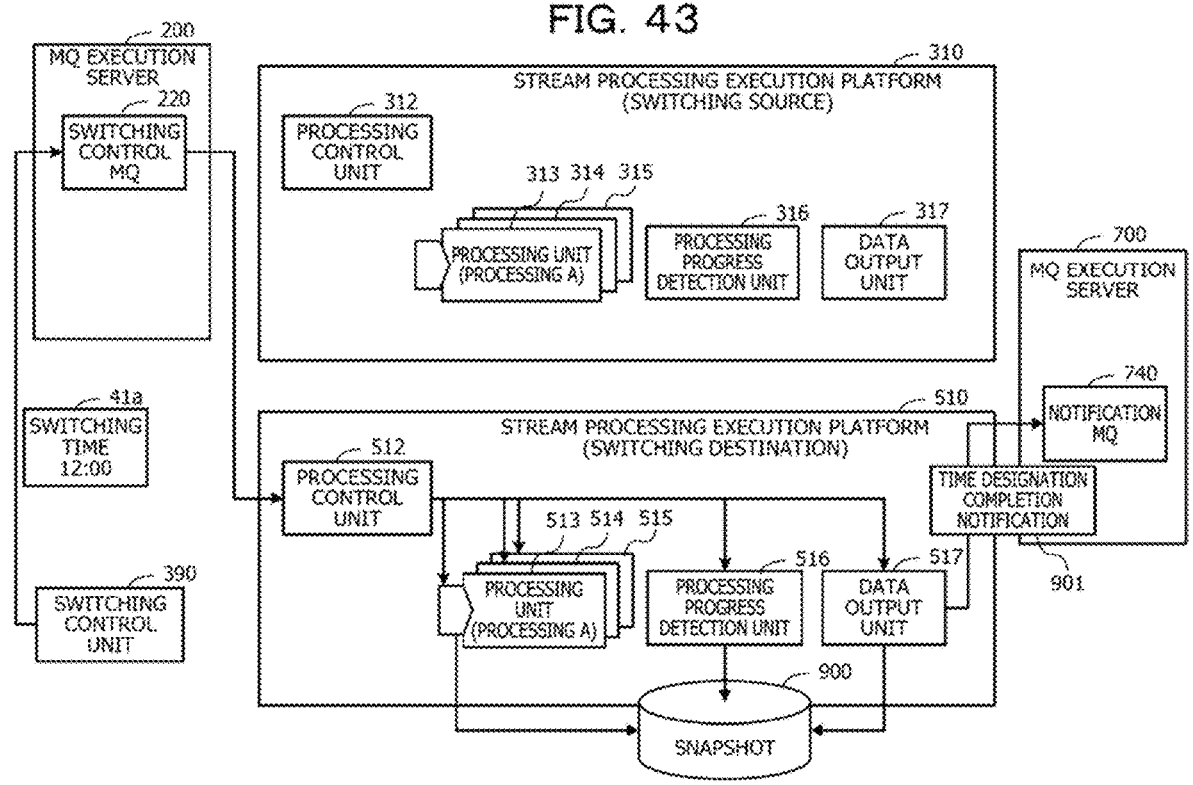
FIG. 43 is a diagram (⅓) illustrating an example of switching time designation processing in consideration of occurrence of a failure.

FIG. 43 is a diagram (⅓) illustrating an example of switching time designation processing in consideration of occurrence of a failure. The switching control unit 390 transmits a control message 41a in which the switching time is designated to a stream processing execution platform 510 of the switching destination, limiting the destination thereto. A processing control unit 512 of the stream processing execution platform 510 of the switching destination receives the control message 41a via a switching control MQ 220. In a case where the margin is equal to or larger than a predetermined value, the processing control unit 512 transmits a switching time designation instruction to an output destination switching unit in a data output unit 517, respective buffer units of processing units 513 to 515, and a processing progress detection unit 516. The output destination switching unit, the buffer units, and the processing progress detection unit 516 store the switching information in internal state, and then save a snapshot 900 of the internal state in a storage device.

After checking that the snapshot 900 has been saved, the data output unit 517 stores a control message 901 of a switching time designation completion notification in a notification MQ 740.

Figure 44:
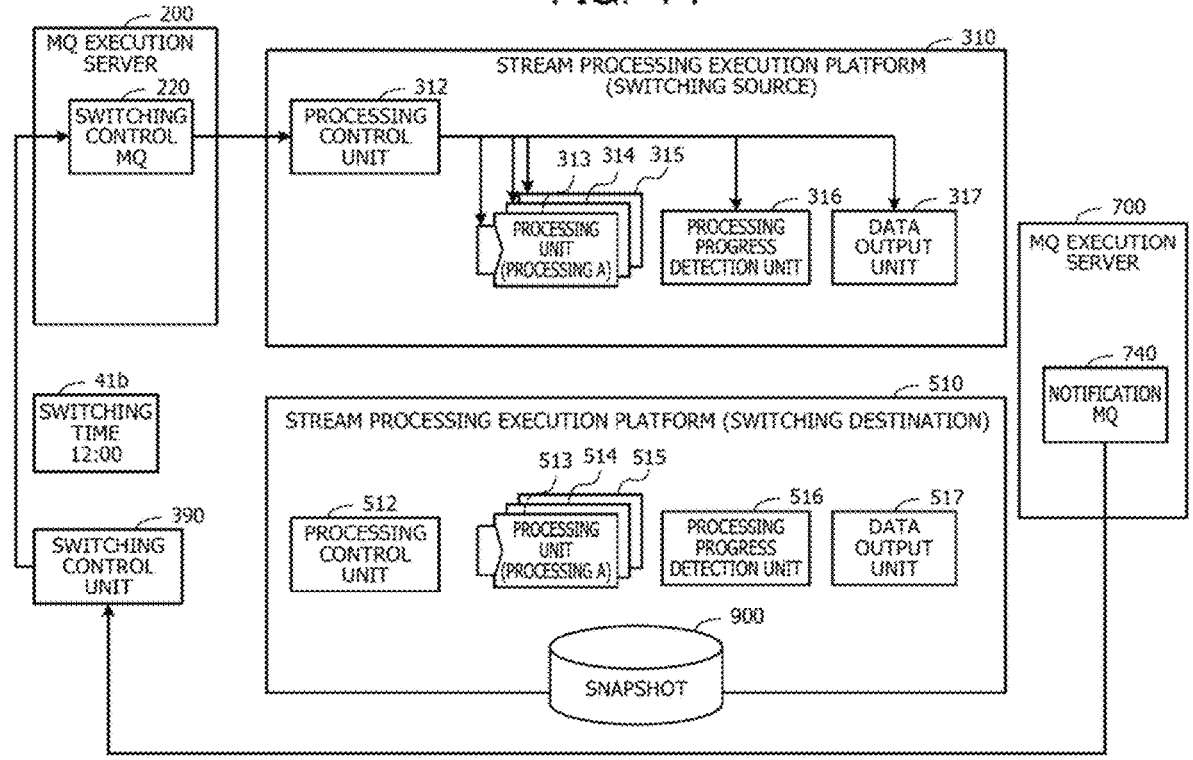
FIG. 44 is a diagram (⅔) illustrating an example of the switching time designation processing in consideration of occurrence of a failure.

FIG. 44 is a diagram (⅔) illustrating an example of the switching time designation processing in consideration of occurrence of a failure. The switching control unit 390 acquires the switching time designation completion notification via the notification MQ 740. When receiving the switching time designation completion notification from the switching destination, the switching control unit 390 transmits a control message 41b in which the switching time is designated to a stream processing execution platform 310 of the switching source, limiting the destination thereto. A processing control unit 312 of the stream processing execution platform 310 of the switching source receives the control message 41b via the switching control MQ 220. In a case where the margin is equal to or larger than a predetermined value, the processing control unit 312 transmits a switching time designation instruction to an output destination switching unit in a data output unit 317, respective buffer units of processing units 313 to 315, and a processing progress detection unit 316.

Figure 45:
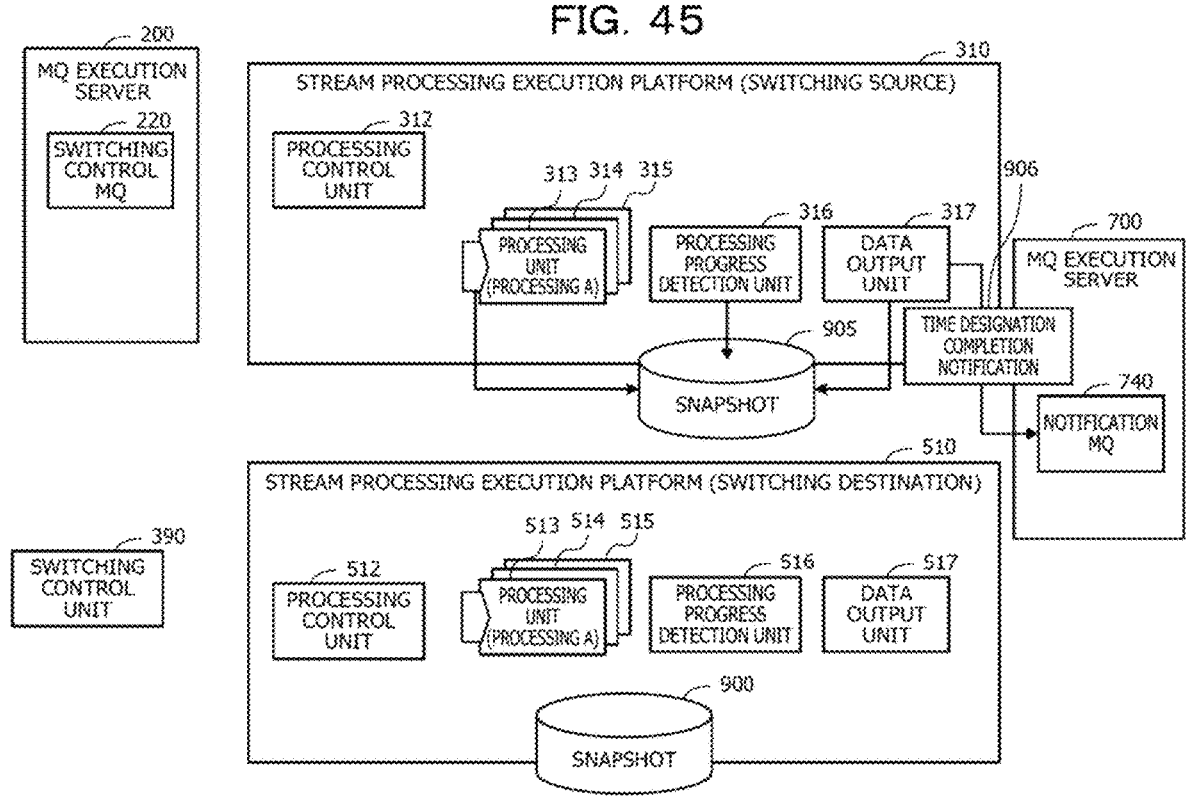
FIG. 45 is a diagram (3/3) illustrating an example of the switching time designation processing in consideration of occurrence of a failure.

FIG. 45 is a diagram (3/3) illustrating an example of the switching time designation processing in consideration of occurrence of a failure. The output destination switching unit, the buffer units, and the processing progress detection unit 316 store the switching information in internal state, and then save a snapshot 905 of the internal state in a storage device. After checking that the snapshot 905 has been saved, the data output unit 317 stores a control message 906 of the switching time designation completion notification in the notification MQ 740. Subsequent processing is similar to the processing in the third embodiment.

In this way, in the stream processing execution platform of the switching destination, the state after the switching time is designated can be saved as the snapshot 900. By saving the state as the snapshot 900, the state can be restored to the state of the point of time when the snapshot 900 has been taken even if a failure occurs thereafter.

Figure 46:
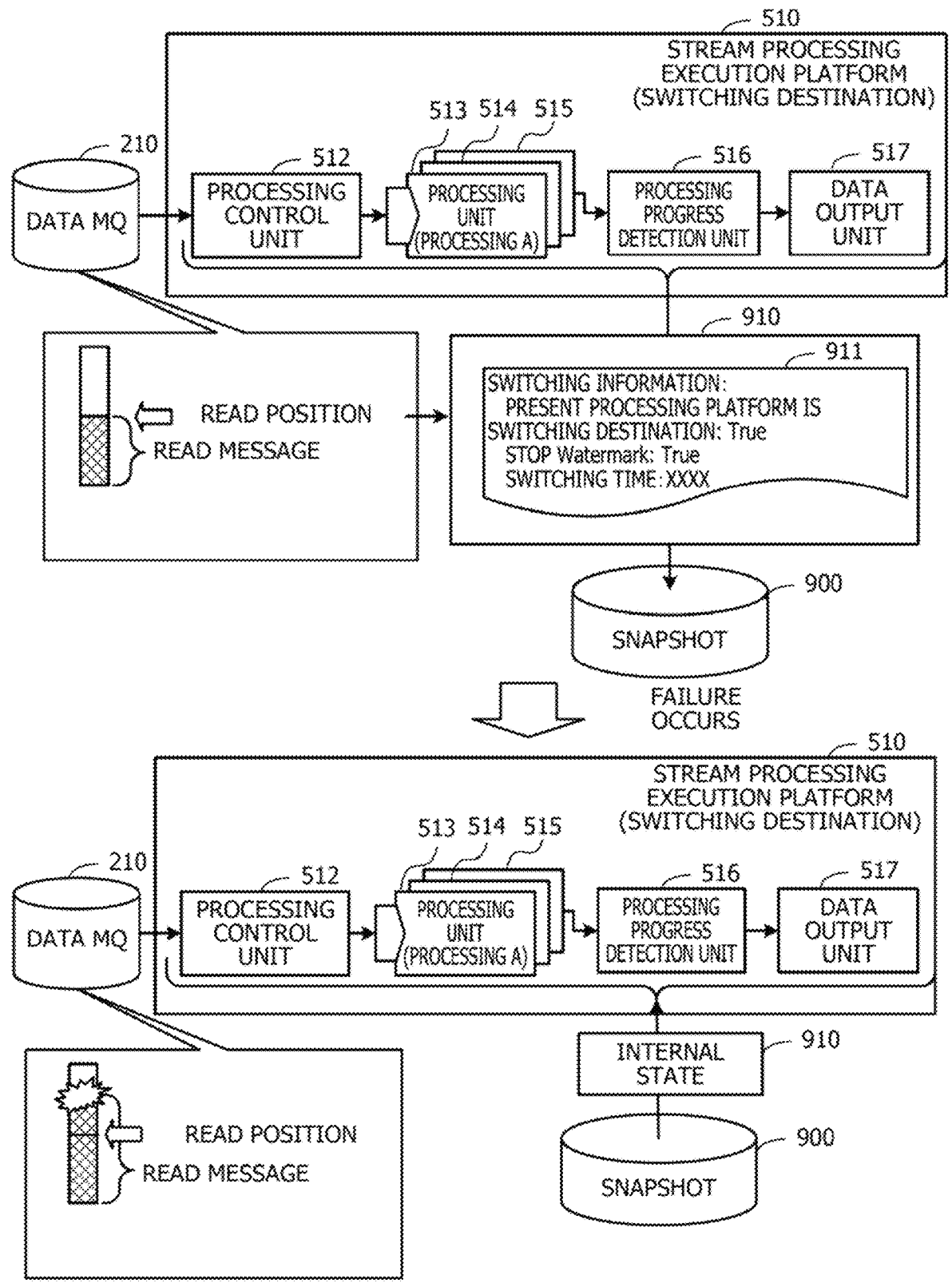
FIG. 46 is a diagram illustrating an example of failure recovery processing using snapshots.

FIG. 46 is a diagram illustrating an example of failure recovery processing using snapshots. The stream processing execution platform 510 performs stream data processing in a stateful manner. In stateful stream data processing, failure recovery is performed as illustrated in FIG. 46.

A data MQ 210 stores messages containing IoT data in order of reception of the messages. When timing of creating the snapshot 900 comes in the stream processing execution platform 510, the snapshot 900 is saved in the storage device in association with a read position of the data MQ 210 at that point of timing. By creating the snapshot 900 after executing the switching designation processing, switching information 911 including the switching time and information indicating that a watermark is stopped is saved as a part of an internal state 910.

Thereafter, when a failure such as stop of the stream processing execution server 500 occurs, after removing a cause of the failure, the stream processing execution server 500 restores the internal state 910 to the stream processing execution platform 510 from the latest snapshot 900. Then, the stream processing execution platform 510 reads the IoT data from the read position of the data MQ 210 and executes the processing.

After recovery, the stream processing execution platform 510 is returned to the state after completion of the switching information designation. That is, return of the stream processing execution platform of the switching destination to a switching time undesignated state due to occurrence of a failure is suppressed. Thereby, even if a failure occurs after the switching time is set, the IoT data having a time stamp of or after the switching time is correctly buffered in the buffer unit in the stream processing execution platform 510. In other words, output of a processing result of the IoT data having a time stamp of or after the switching time is suppressed in the processing system of the switching destination before completion of the processing up to the switching time in the processing system of the switching source. Then, when receiving a processing restart notification, the stream processing execution platform 510 processes the IoT data having a time stamp of or after the switching time without omission, and outputs the processing result to an operation MQ 710. Thereby, occurrence of omission of the processing result is suppressed.

Next, a processing system switching processing procedure will be described in time series with reference to FIGS. 47 and 48.

Figure 47:
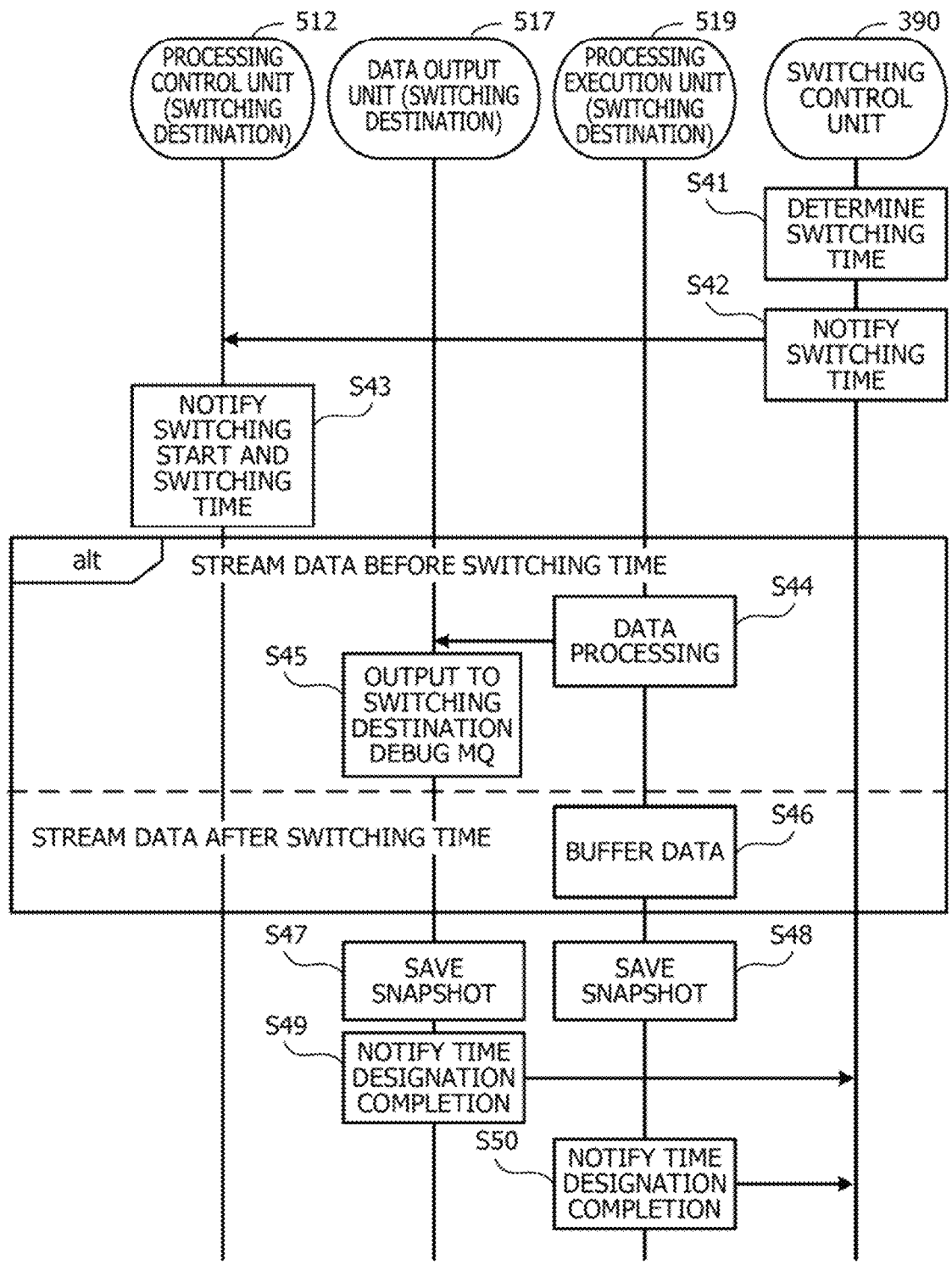
FIG. 47 is the first half of a sequence diagram illustrating a processing system switching processing procedure in consideration of occurrence of a failure.

FIG. 47 is a first half of a sequence diagram illustrating the processing system switching processing procedure in consideration of occurrence of a failure. The switching control unit 390 that has received an input of the switching start instruction determines the switching time (step S41). Next, the switching control unit 390 notifies the processing control unit 512 of the switching destination of the switching time (step S42).

The processing control unit 512 of the switching destination notifies the buffer unit in at least the processing unit 513 on the uppermost stream side in a processing execution unit 519, and the output destination switching unit in the data output unit 517 of the switching start and the switching time (step S43).

The processing execution unit 519 of the switching destination executes processing for stream data before the switching time (step S44). The data output unit 517 outputs the processing result of the stream data before the switching time to the switching destination debug MQ 730 (step S45). Furthermore, the buffer unit of the processing unit 513 on the uppermost stream side holds each IoT data of the stream data of or after the switching time in the buffer (step S46).

The data output unit 517 makes the current processing state persistent by saving a snapshot of the internal state (step S47). Even in the buffer unit of each processing unit in the processing execution unit 519, the current processing state is made persistent by saving a snapshot of the internal state (step S48). The data output unit 517 notifies the switching control unit 390 of time designation completion (step S49). The buffer unit of each processing unit in the processing execution unit 519 also notifies the switching control unit 390 of time designation completion (step S50).

Figure 48:
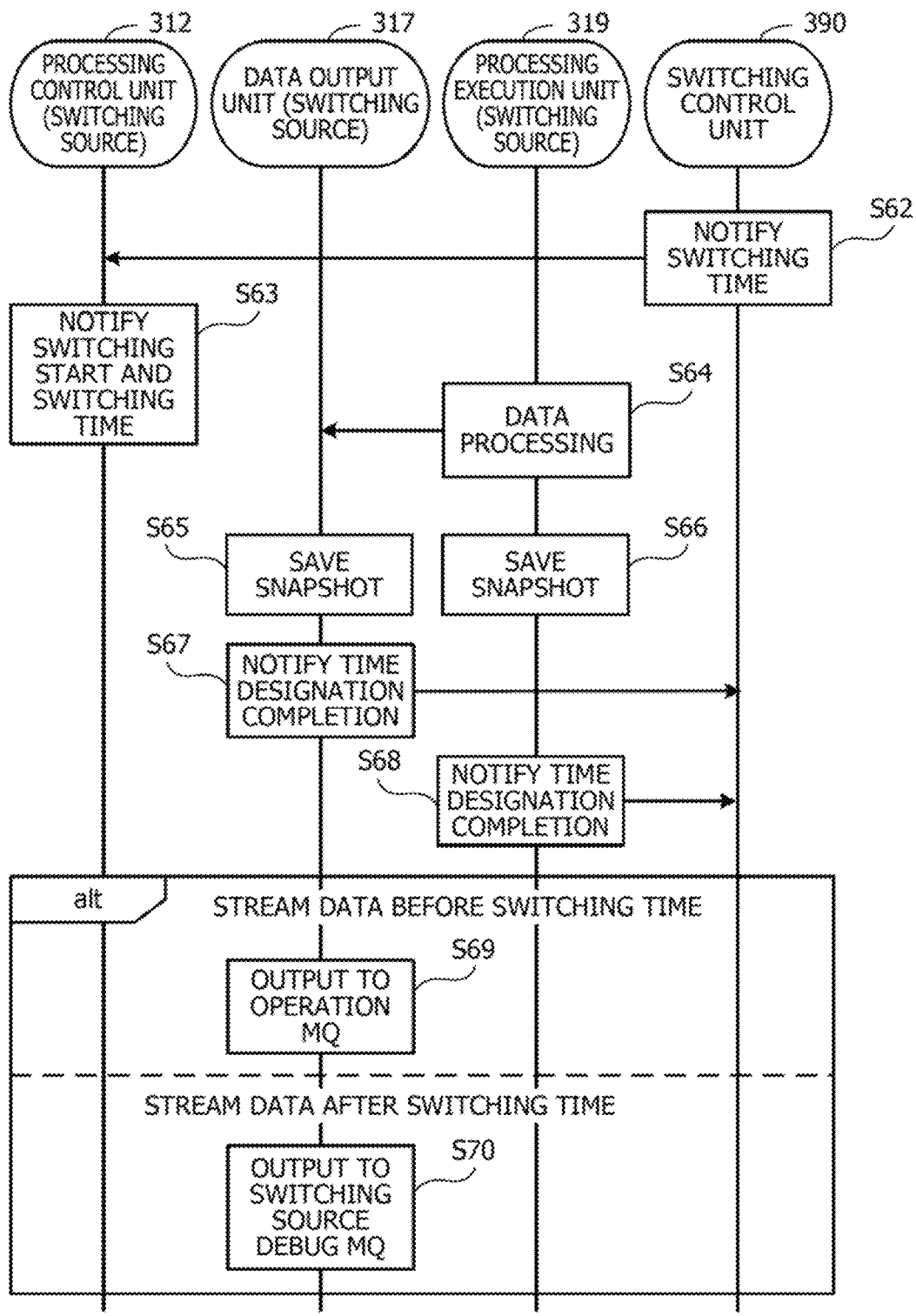
FIG. 48 is the latter half of the sequence diagram illustrating the switching processing procedure in consideration of occurrence of a failure.

FIG. 48 is a latter half of the sequence diagram illustrating the switching processing procedure in consideration of occurrence of a failure. The switching control unit 390 that has acquired the time designation completion notification from the switching destination notifies the processing control unit 312 of the switching source of the switching time (step S62).

The processing control unit 312 of the switching source notifies the buffer units in each of the processing units in the processing execution unit 519, the processing progress detection unit 316, and the output destination switching unit 317a (see FIG. 7) in the data output unit 317 of the switching start and the switching time (step S63). The processing execution unit 319 of the switching source executes the processing for the stream data (step S64).

The data output unit 317 makes the current processing state persistent by saving a snapshot of the internal state (step S65). Even in the buffer unit of each processing unit in the processing execution unit 319, the current processing state is made persistent by saving a snapshot of the internal state (step S66). The data output unit 317 notifies the switching control unit 390 of time designation completion (step S67). The buffer unit of each processing unit in the processing execution unit 319 also notifies the switching control unit 390 of time designation completion (step S68).

The data output unit 317 outputs the processing result of the stream data before the switching time to the operation MQ 710 (step S69). Furthermore, the data output unit 317 outputs the processing result of the stream data of or after the switching time to the switching source debug MQ 720 (step S70). Subsequent processing is similar to the processing of the second embodiment illustrated in FIG. 14.

Next, the processing of the switching control unit 390 in consideration of occurrence of a failure will be described in detail.

Figure 49:
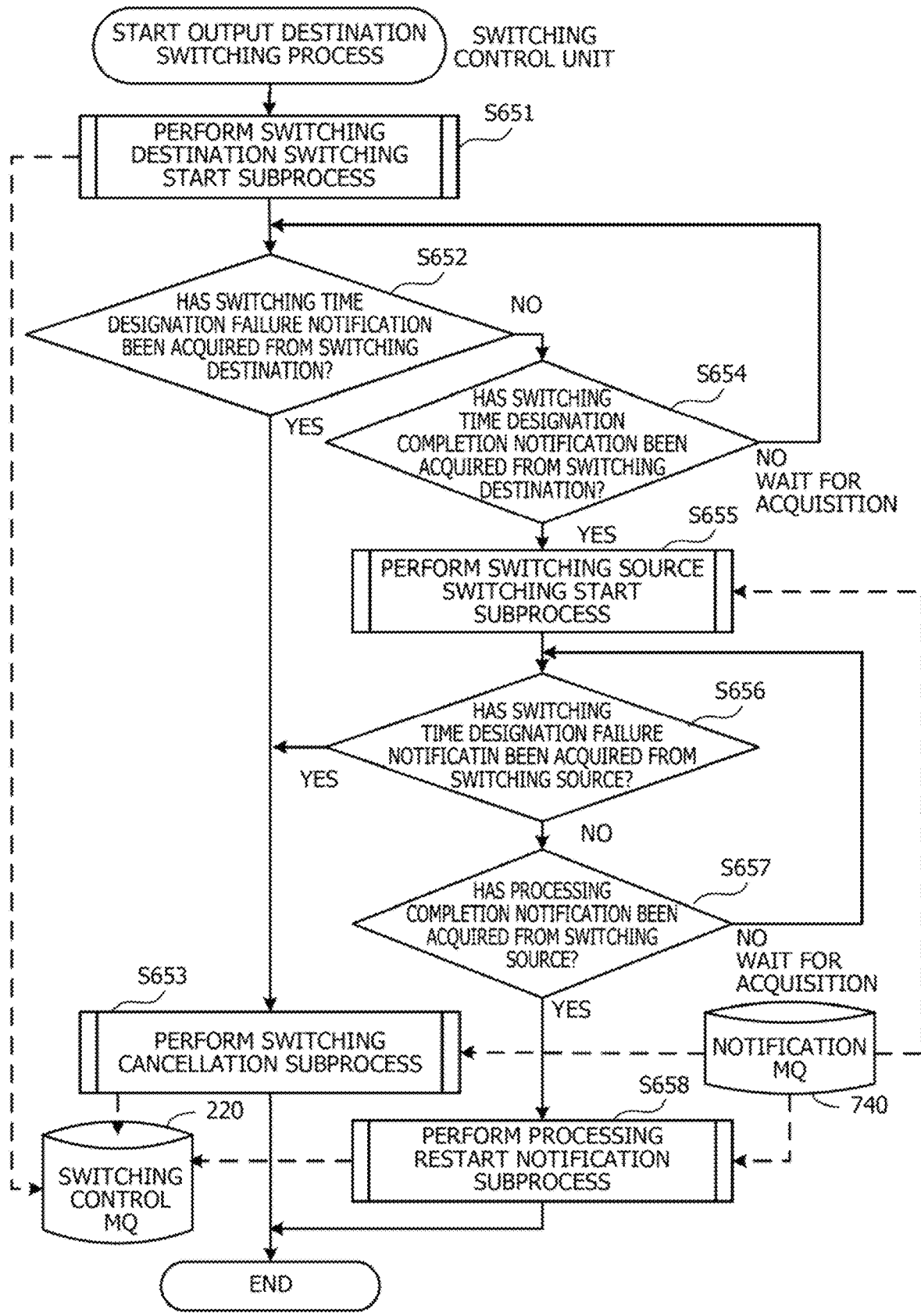
FIG. 49 is a flowchart illustrating an example of a processing procedure of an output destination switching process in a switching control unit in consideration of occurrence of a failure.

FIG. 49 is a flowchart illustrating an example of a processing procedure of an output destination switching process in a switching control unit in consideration of occurrence of a failure. Hereinafter, processing illustrated in FIG. 49 will be described in accordance with step numbers.

[step S651] The switching control unit 390 executes a switching destination switching start subprocess. Details of the subprocess will be described below (see FIG. 50).

[step S652] The switching control unit 390 determines whether the switching time designation failure notification has been acquired from the switching destination. When acquiring the switching time designation failure notification, the switching control unit 390 advances the processing to step S653. Furthermore, when not acquiring the switching time designation failure notification, the switching control unit 390 advances the processing to step S654.

[step S653] The switching control unit 390 executes a switching cancellation subprocess. Details of the subprocess are as illustrated in FIG. 42. The switching control unit 390 terminates the output destination switching process after executing the switching cancellation subprocess.

[step S654] The switching control unit 390 determines whether the switching time designation completion notification has been acquired from the switching destination. When acquiring the switching time designation completion notification, the switching control unit 390 advances the processing to step S655. Furthermore, the switching control unit 390 advances the processing to step S652 in the case of not acquiring the switching time designation completion notification, and waits for acquisition of the switching time designation failure notification or the switching time designation completion notification.

[step S655] The switching control unit 390 executes a switching source switching start subprocess. Details of the subprocess will be described below (see FIG. 51).

[step S656] The switching control unit 390 determines whether the switching time designation failure notification has been acquired from the switching source. When acquiring the switching time designation failure notification, the switching control unit 390 advances the processing to step S653. Furthermore, when not acquiring the switching time designation failure notification, the switching control unit 390 advances the processing to step S657.

[step S657] The switching control unit 390 determines whether the processing completion notification has been obtained from the switching source. The switching control unit 390 advances the processing to the process in step S658 in the case of acquiring the processing completion notification. Furthermore, the switching control unit 390 advances the processing to step S656 in the case of not acquiring the processing completion notification, and waits for arrival of the switching time designation failure notification or the processing completion notification.

[step S658] The switching control unit 390 executes the processing restart notification subprocess. Details of the processing restart notification subprocess are as illustrated in FIG. 31.

Next, the processing of the switching destination switching start subprocess (step S651) and the switching source switching start subprocess (step S655) will be described.

Figure 50:
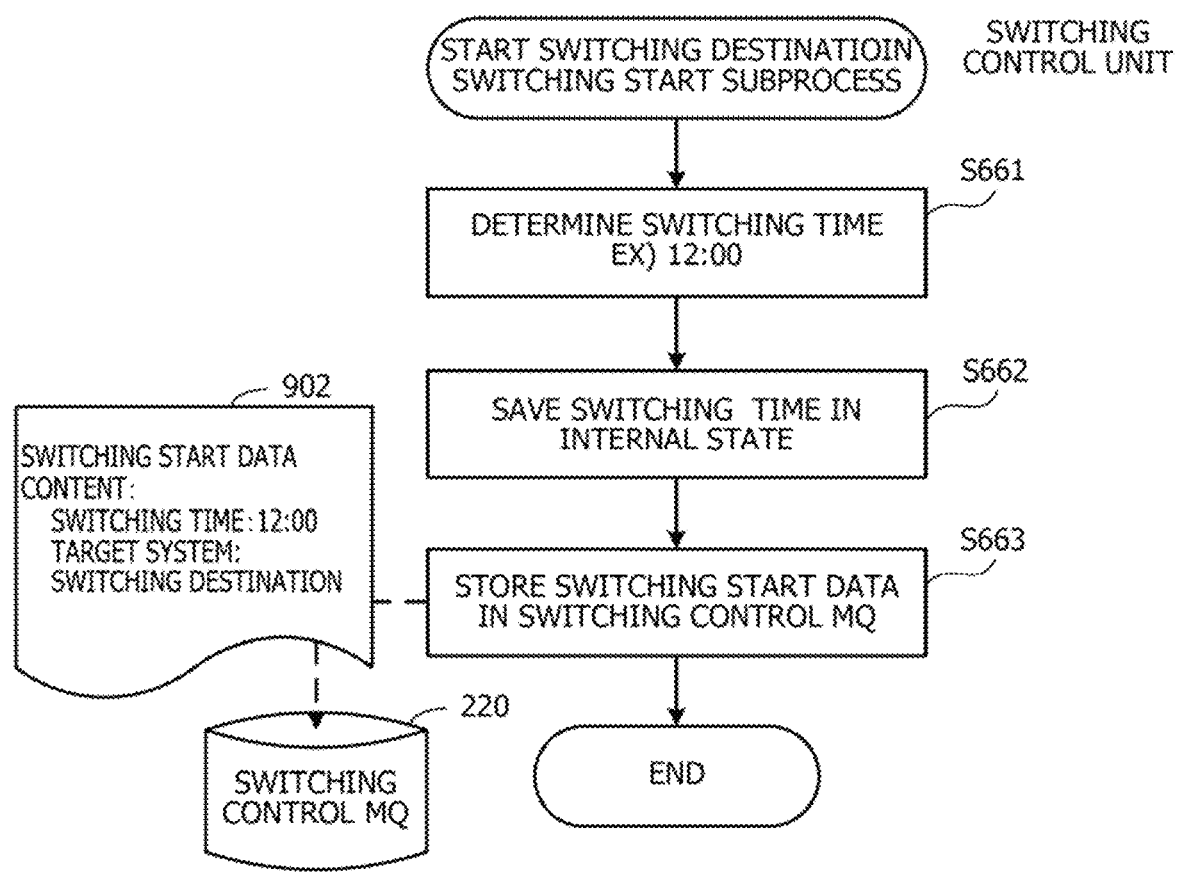
FIG. 50 is a flowchart illustrating an example of a processing procedure of a switching destination switching start subprocess in a switching control unit in consideration of occurrence of a failure.

FIG. 50 is a flowchart illustrating an example of a processing procedure of a switching destination switching start subprocess in a switching control unit in consideration of occurrence of a failure. Hereinafter, processing illustrated in FIG. 50 will be described in accordance with step numbers.

[step S661] The switching control unit 390 determines the switching time.

[step S662] The switching control unit 390 stores the switching time in the internal state.

[step S663] The switching control unit 390 stores switching start data 902 for the switching destination processing system in the switching control MQ 220. The switching start data 902 includes the switching time and information for designating the stream processing execution platform of the switching destination as the target system.

Figure 51:
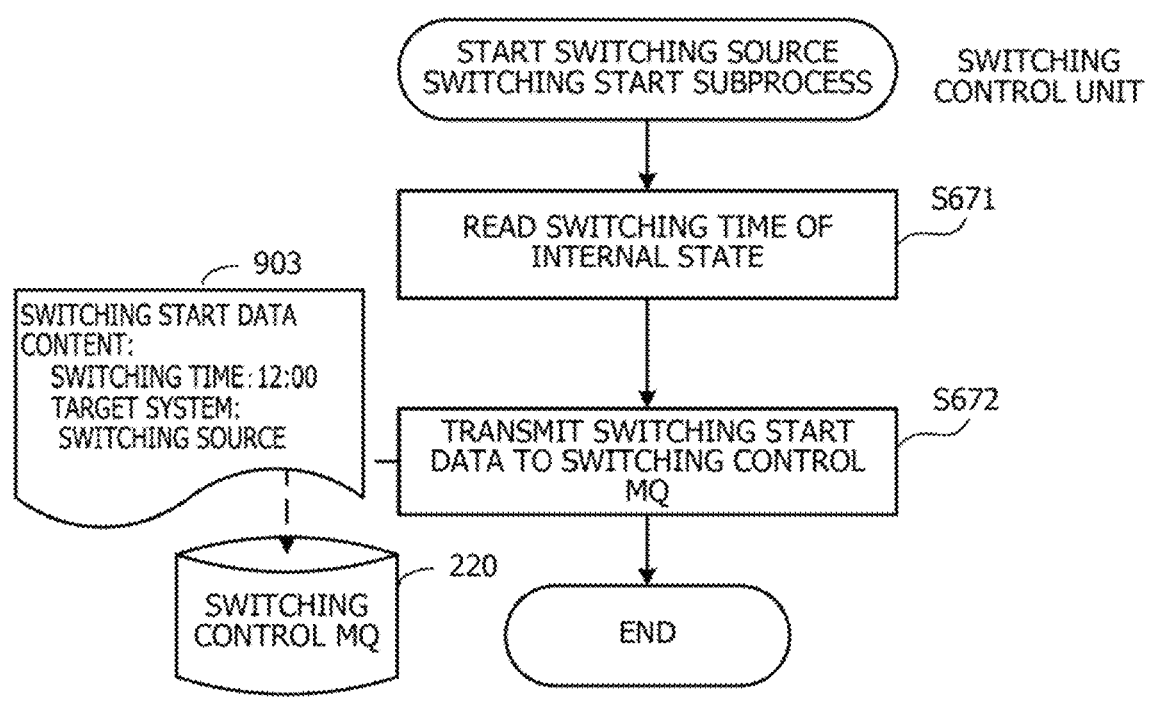
FIG. 51 is a flowchart illustrating an example of a processing procedure of a switching source switching start subprocess in a switching control unit in consideration of occurrence of a failure.

FIG. 51 is a flowchart illustrating an example of a processing procedure of a switching source switching start subprocess in a switching control unit in consideration of occurrence of a failure. Hereinafter, processing illustrated in FIG. 51 will be described in accordance with step numbers.

[step S671] The switching control unit 390 reads the switching time of the internal state.

[step S672] The switching control unit 390 stores switching start data 903 for the switching source processing system in the switching control MQ 220. The switching start data 903 includes the switching time and information for designating the stream processing execution platform of the switching source as the target system.

By saving the snapshot immediately after the switching time is designated in the stream processing execution platform of the switching destination in this way, the consistency of the processing result of the stream data processing can be maintained even if a failure occurs thereafter.

Other Embodiments

In the stream processing execution platform of the switching destination, the IoT data before the processing is executed is buffered. However, for example, the processing result of the IoT data of or after the switching time may be buffered, and the buffered processing result may be output to the operation MQ 710 after the processing restart instruction is given.

The embodiments have been described above by way of example, and the configuration of each portion described in the embodiments may be replaced with another configuration having a similar function. Furthermore, any other components and steps may be added. Moreover, any two or more configurations (features) of the above-described embodiments may be combined.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing a data processing program comprising instructions which, when the program is executed by a computer, cause the computer to execute processing, the processing comprising:

each time when data that includes time information is received, inputting the received data to each of a first processing system of a switching source and a second processing system of a switching destination;

comparing the time information of the data with a switching time set as time to switch a processing system in the first processing system;

outputting a processing result of processing that uses the data from the first processing system in a case where a time indicated by the time information is before the switching time; and comparing the time information of the data with the switching time in the second processing system; and outputting the processing result of processing that uses the data from the second processing system in a case where the time indicated by the time information is the switching time or time after the switching time, wherein the processing further comprises:

outputting a processing completion notification from the first processing system in a case where a determination condition is satisfied and processing for each of the received first data has been completed in the first processing system, the determination condition being a condition that first data that includes the time information of which the time is a time before the switching time that the first data is not to be received onward, stopping output of a processing result of processing that uses second data that includes the time information that indicates the time of or after the switching time, until the processing completion notification is output from the first processing system, and starting, in the second processing system, output of a processing result of processing that uses the second data from the second processing system, after the processing completion notification is output from the first processing system.

2. The non-transitory computer-readable recording medium according to claim 1, wherein, in the second processing system, the second data received before the processing completion notification is output is stored in a storage unit, and the second data is read from the storage unit and the processing that uses the second data is executed after the processing completion notification is output.

3. The non-transitory computer-readable recording medium according to claim 1, wherein, in the first processing system, in a case where the time information of the received data satisfies the determination condition that the first data is not to be received onward, control data that indicates that the first data is not to be received onward is transmitted to a processing route of the data, and when the control data is detected on an output side of the processing result of the data, the processing completion notification is output from the first processing system.

4. The non-transitory computer-readable recording medium according to claim 3, wherein,
in the first processing system, in a case where the time information of the received data is a time after the switching time by a predetermined time, the control data is transmitted.

5. The non-transitory computer-readable recording medium according to claim 1, the processing further comprising:
in each of the first processing system and the second processing system, calculating a grace time from a current time to the switching time according to an input to designate the switching time, setting the designated switching time as time to switch a processing system in a case where the grace time is equal to or larger than a predetermined value, and outputting a setting failure notification without setting the switching time in a case where the grace time is less than a predetermined value.

6. The non-transitory computer-readable recording medium according to claim 5, the processing further comprising:
in a case where the setting failure notification is output from one processing system of the first processing system and the second processing system, transmitting a switching cancellation instruction to the other processing system, and
in a case where the first processing system and the second processing system receive the switching cancellation instruction after setting the switching time, deleting the set switching time.

7. The non-transitory computer-readable recording medium according to claim 5, the processing further comprising:
issuing an instruction to set the switching time to the second processing system;
saving a first snapshot that includes the switching time after completion of setting the switching time in the second processing system;
issuing an instruction to set the switching time to the first processing system after checking the save of the first snapshot in the second processing system;
saving a second snapshot that includes the switching time after completion of setting the switching time in the first processing system; and
outputting a message of switching time setting completion after checking the save of the second snapshot in the first processing system.

8. A computer-implemented method of data processing, the method comprising:
each time when data that includes time information is received, inputting the received data to each of a first processing system of a switching source and a second processing system of a switching destination;
comparing the time information of the data with a switching time set as a time to switch a processing system in the first processing system;
outputting a processing result of processing that uses the data from the first processing system in a case where time indicated by the time information is before the switching time; and
comparing the time information of the data with the switching time in the second processing system; and
outputting the processing result of processing that uses the data from the second processing system in a case where the time indicated by the time information is the switching time or time after the switching time, wherein
the processing further comprises:
outputting a processing completion notification from the first processing system in a case where a determination condition is satisfied and processing for each of the received first data has been completed in the first processing system, the determination condition being a condition that first data that includes the time information of which the time is a time before the switching time that the first data is not to be received onward,
stopping output of a processing result of processing that uses second data that includes the time information that indicates the time of or after the switching time, until the processing completion notification is output from the first processing system, and
starting, in the second processing system, output of a processing result of processing that uses the second data from the second processing system after the processing completion notification is output from the first processing system.

9. A data processing system comprising:
a memory; and
processor circuitry coupled to the memory, the processor circuitry being configured to perform processing, the processing including:
each time when receiving data that includes time information is received, inputting the received data to each of a first processing system of a switching source and a second processing system of a switching destination;
comparing the time information of the data with a switching time set as a time to switch a processing system in the first processing system;
outputting a processing result of processing that uses the data from the first processing system in a case where a time indicated by the time information is before the switching time;
comparing the time information of the data with the switching time in the second processing system; and
outputting the processing result of processing that uses the data from the second processing system in a case where the time indicated by the time information is the switching time or time after the switching time, wherein
the processing further comprises:
outputting a processing completion notification from the first processing system in a case where a determination condition is satisfied and processing for each of the received first data has been completed in the first processing system, the determination condition being a condition that first data that includes the time information of which the time is a time before the switching time that the first data is not to be received onward,
stopping output of a processing result of processing that uses second data that includes the time information that indicates the time of or after the switching time, until the processing completion notification is output from the first processing system, and starting, in the second processing system, output of a processing result of processing that uses the second data from the second processing system after the processing completion notification is output from the first processing system.

* * * * *